(12) United States Patent
Fujii et al.

(10) Patent No.: US 7,031,040 B2
(45) Date of Patent: Apr. 18, 2006

(54) OPTICAL SCANNING APPARATUS, OPTICAL WRITING APPARATUS, IMAGE FORMING APPARATUS, AND METHOD OF DRIVING VIBRATION MIRROR

(75) Inventors: Mitsumi Fujii, Iwate (JP); Eiji Mochizuki, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 50 days.

(21) Appl. No.: 10/837,489

(22) Filed: May 3, 2004

(65) Prior Publication Data

US 2004/0263937 A1    Dec. 30, 2004

(30) Foreign Application Priority Data

May 16, 2003  (JP)  ............................. 2003-138964
Jun. 18, 2003  (JP)  ............................. 2003-172797

(51) Int. Cl.
*G02B 26/08*  (2006.01)

(52) U.S. Cl. ................... 359/224; 359/212; 310/309

(58) Field of Classification Search ........... 359/198, 359/212, 223, 224, 225, 226, 874, 875; 310/309
See application file for complete search history.

(56) References Cited

U.S. PATENT DOCUMENTS

| 5,543,956 | A | * | 8/1996 | Nakagawa et al. | ......... 359/225 |
| 5,959,760 | A | * | 9/1999 | Yamada et al. | ............. 359/224 |
| 6,198,565 | B1 | * | 3/2001 | Iseki et al. | .................. 359/224 |
| 6,331,052 | B1 | | 12/2001 | Murai et al. | |
| 6,352,333 | B1 | | 3/2002 | Matsumoto et al. | |
| 6,485,126 | B1 | | 11/2002 | Kato et al. | |
| 6,657,765 | B1 | | 12/2003 | Hayashi et al. | |
| 6,682,185 | B1 | | 1/2004 | Hashimoto et al. | |

FOREIGN PATENT DOCUMENTS

| JP | 7-92409 | 4/1995 |
| JP | 9-197334 | 7/1997 |
| JP | 2924200 | 5/1999 |
| JP | 2981600 | 9/1999 |
| JP | 3011144 | 12/1999 |
| JP | 2001-228428 | 8/2001 |
| JP | 2002-40353 | 2/2002 |
| JP | 2002-40355 | 2/2002 |
| JP | 2002-228965 | 8/2002 |
| JP | 2002-267995 | 9/2002 |
| JP | 2002-277809 | 9/2002 |
| JP | 2002-321195 | 11/2002 |

OTHER PUBLICATIONS

K. E. Petersen, Journal of Research and Development, vol. 24, No. 5, pp. 631-637, "Silicon Torsional Scanning Mirror", Sep. 1980.

(Continued)

*Primary Examiner*—Euncha P. Cherry
*Assistant Examiner*—Pranav Khatri
(74) *Attorney, Agent, or Firm*—Oblon, Spivak, McClelland, Maier & Neustadt, P.C.

(57) ABSTRACT

An optical scanning apparatus includes a vibration mirror having a mirror surface that reflects an optical beam. A pair of torsion beams swingably support the mirror. The mirror is vibrated in a sealed space whose pressure is adjusted such that a characteristic of the mirror falls within a predetermined range.

23 Claims, 25 Drawing Sheets

OTHER PUBLICATIONS

H. Schenk, et al., The 13th Annual International Conference on MEMS 2000, pp. 473-478, "An Electrostatically Excited 2D-Micro-Scanning-Mirror With an In-Plane Configuration of the Driving Electrodes", Jan. 23-27, 2000.

H. Camon, et al., The 13th Annual International Conference on MEMS 2000, pp. 645-650, "Fabrication, Simulation and Experiment of a Rotating Electrostatic Silicon Mirror With Large Angular Deflection", Jan. 23-27, 2000.

* cited by examiner

FIG.7
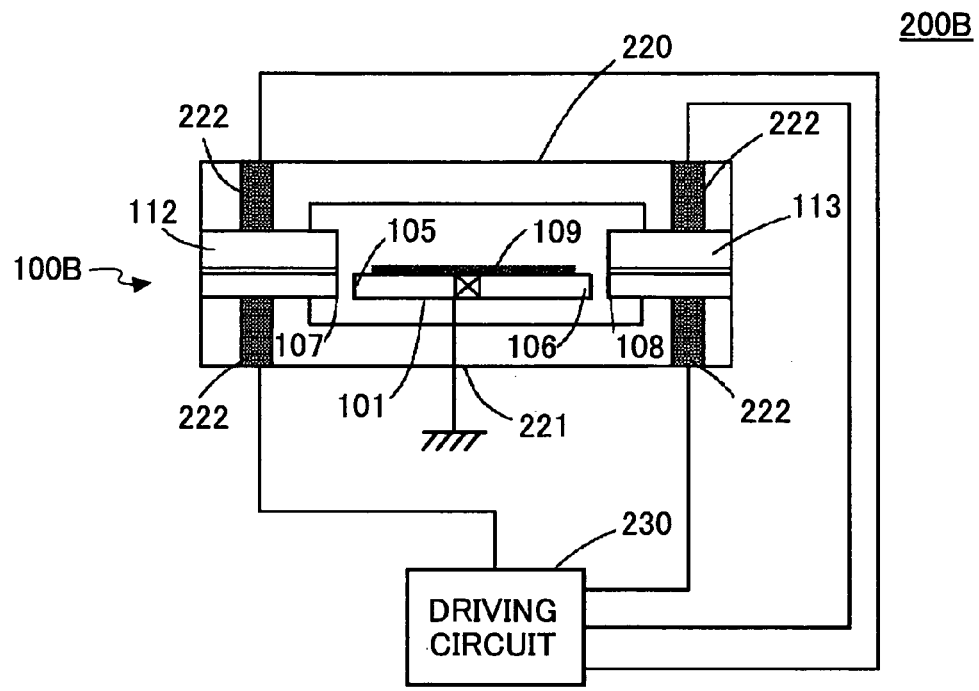
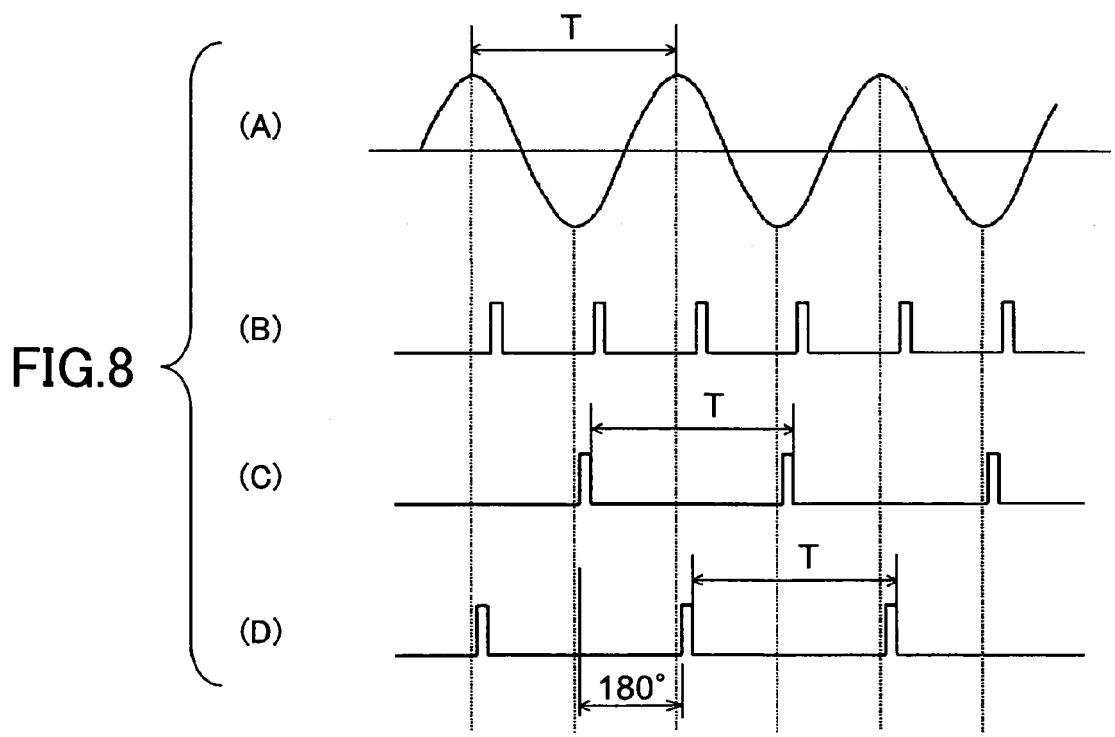
FIG.8

FIG.29

| GROUP | CATEGORY | ATOMIC SYMBOL | GAS | | | | | | |
|---|---|---|---|---|---|---|---|---|---|
| | | | $O_2$ | $C_2H_2$ | $C_2H_4$ | CO | $H_2$ | $CO_2$ | $N_2$ |
| II<br>IV<br>V<br>VI<br>VIII₁ | A | Ca Sr Ba<br>Ti Zr Hf<br>V Nb Ta<br>Cr Mo W<br>Fe Ru Os | + | + | + | + | + | + | + |
| VIII₂,₃ | B₁ | Ni Co | + | + | + | + | + | + | − |
| VIII₂,₃ | B₂ | Rh Pd Pt Ir | + | + | + | + | + | − | − |
| VII, I | B₃ | Mn Cu | + | + | + | + | ± | − | − |
| VII, I | C | Al Au | + | + | + | − | − | − | − |
| I | D | Li Na K | + | + | − | − | − | − | − |
| II, I, III<br>IV, V | E | Mg Ag Zn Cd<br>In Si Ge Sn<br>Pb As Sb Bi | + | − | − | − | − | − | − |

(NOTE) +: ABSORB  −: DO NOT ABSORB
± : SLIGHTLY ABSORB OR DEPEND ON CONDITION

OPTICAL SCANNING APPARATUS, OPTICAL WRITING APPARATUS, IMAGE FORMING APPARATUS, AND METHOD OF DRIVING VIBRATION MIRROR

BACKGROUND OF THE INVENTION

1. Field of the Invention

The present invention generally relates to: micro optical systems applying micro machining techniques; and image forming apparatuses such as digital copying machines and laser printers, and more particularly, to: an optical scanning apparatus using a beam-supported-type vibration mirror driven by an electrostatic force; an optical scanning apparatus that can be applied to, for example, an optical-scanning-type barcode reader and an in-vehicle laser radar; and an image forming apparatus using such an optical scanning apparatus.

2. Description of the Related Art

The optical scanning apparatus using a beam-supported-type vibration mirror driven by electrostatic force is a promising candidate for an optical writing apparatus of an image forming apparatus such as a digital copying machine and a laser printer, and for an optical reading apparatus such as a barcode reader and a scanner.

"Silicon Torsional Scanning Mirror", Kurt E. Petersen, IBM Journal of Research and Development Vol. 24, 1980, pages 631–637 discloses a beam-supported-type vibration mirror that causes a mirror substrate supported by two beams provided on the same line to perform reciprocating motion by twisting the two beams with electrostatic force exerted between the mirror substrate and electrodes provided at positions opposing the mirror substrate, while using the two beams as the rotation axis. The vibration mirror manufactured by using a micro machining technique has a simple structure compared to an optical scanning apparatus configured to rotate a polygon mirror by using a motor, and can be integrally formed in a semiconductor process. Thus, the size of the vibration mirror can be easily reduced and manufacturing costs thereof are low. In addition, since a polygon mirror uses a plurality of mirror surfaces, there is a problem of variation in accuracy of each of the mirror surfaces. However, the vibration mirror having only a single mirror does not have such a problem. Further, it is possible for the vibration mirror to easily correspond to high-speed scanning performed by reciprocating scanning.

Various electrostatically-actuated vibration mirrors are known such as: an electrostatically-actuated vibration mirror that decreases the rigidity of a beam by forming the beam into an S-shape so as to achieve a large swing angle with a small driving force (refer to Japanese Patent Publication No. 2924200, for example); an electrostatic vibration mirror having a beam whose thickness is thinner than those of a mirror substrate and a frame substrate (refer to Japanese Laid-Open Patent Application No. 7-92409, for example); an electrostatically-actuated vibration mirror in which driving electrodes are arranged at a position that does not overlap with swinging directions of a mirror part (refer to Japanese Patent Publication No. 3011144 and "An Electrostatically Excited 2D-Micro-Scanning-Mirror with an In-Plane Configuration of the Driving Electrodes", Harald Schenk, The 13th Annual International Conference on MEMS 2000, pages 473–478, for example); an electrostatically-actuated vibration mirror that reduces a driving voltage without changing a swing angle of a mirror by providing a driving electrode in a slanted manner with respect to the center position of the swing of the mirror (refer to "Fabrication, Simulation and Experiment of a Rotating Electrostatic Silicon Mirror with Large Angular Deflection", Camon Henri, The 13th Annual International Conference on MEMS 2000, pages 645–650, for example); and an electrostatically-actuated vibration mirror having an electrode for actuation in addition to a driving electrode (refer to Japanese Laid-Open Patent Application No. 2002-267995).

Conventionally, there is a vibration mirror that causes a mirror substrate to perform reciprocating motion while using as the rotation axis two beams provided on the same line to support a mirror substrate at two opposing sides thereof by driving the mirror substrate with electrostatic force exerted between two movable electrodes provided on the other opposing two sides of the mirror substrate and driving electrodes opposing to the movable electrodes. Such a vibration mirror is driven to perform reciprocating motion at a resonance point. However, as can be seen from FIG. 14 showing measurement results, the above-mentioned vibration mirror has a problem in that the swing angle (vibration amplitude) of the mirror substrate is significantly varied when environmental temperature is changed. The problem is caused since the resonance point of a vibrating system of a vibration mirror varies depending on environmental temperature and the variation of the resonance point significantly affects the swing angle of the mirror substrate.

A description is given below of the resonance point of such a vibration mirror and variation of the resonance point due to change in environmental temperature. The resonance point may be approximated by the following equation (1), where $k\theta$ represents a torsional elastic coefficient of a beam, and I represents a moment of inertia of the mirror substrate.

$$f = 1/2\pi \sqrt{(k/I)} \tag{1}$$

The torsional elastic coefficient $k\theta$ is given by the following equation (2) where c represents the width of the beam, t represents the height of the beam, and L represents the length of the beam. It should be noted that $\beta$ represents a modulus of section, E represents Young's modulus, and $\nu$ represents Poisson's ratio.

$$k\theta = \beta \cdot t \cdot c^3 \cdot E/L(1+\nu) \tag{2}$$

The Young's modulus E at a temperature tmp is obtained by the following equation (3), provided that the temperature coefficient is $\Delta ht$.

$$E = E_0(1 - \Delta ht^* tmp) \tag{3}$$

It should be noted that $E_0$ is given by the following equation (4).

ti $E_0 = 1.9e+12$(dyne/cm2), $\Delta ht = 75e-6/°$ C.

From the above equations (1) through (4), it is understood that the Young's modulus E is decreased in proportion to the increase in the temperature tmp. Accordingly, it is understood that the resonance point falls when the temperature tmp is increased.

In order to reduce variation of the swing angle caused by change in environmental temperature, similarly to an optical scanner driven by a piezoelectric element disclosed in, for example, Japanese Patent Publication No. 2981600, it is possible to apply a mechanism in which an electric resistive element serving as a heater element is provided, and variation of Young's modulus is suppressed by increasing or decreasing the heat value of the electric resistive element. However, it is undesirable in terms of reliability to provide an electric resistive element in a beam that is elastically deformed. Additionally, when the electric resistive element is provided, the manufacturing process of a vibration mirror is complicated, and additional means are required for controlling a current of the electric resistive element, which are problems in terms of costs.

Conventional optical scanning apparatuses use a polygon mirror or a Galvano mirror as a deflector that scans an optical beam. In order to achieve a higher resolution image and high-speed printing, it is necessary to further increase the moving speed of the mirror, which may present problems in durability of a bearing supporting the mirror, heat generation due to windage loss of the mirror, and noise, for example. Thus, there is a limit for such conventional optical scanning apparatuses to perform high-speed scanning.

On the other hand, recently, studies have been made on optical deflectors using micro machining techniques, and methods have been proposed that integrally form a vibration mirror and a beam supporting the vibration mirror from a Si substrate (refer to Japanese Patent Publications No. 2924200 and No. 3011144, for example). According to the proposed techniques, since reciprocating vibration is performed by using resonance, there is an advantage in that noise is low despite that a high-speed operation is performed. Additionally, it is possible to reduce power consumption since a driving force for rotating the vibration mirror is small.

By using a vibration mirror as mentioned above, compared to the conventional methods that use a polygon mirror, it is possible to provide an optical scanning apparatus having a reduced size and consuming less power. However, the swing angle of the vibration mirror is small, and there is a limit to the size of a reflection surface. Hence, a method has been proposed in which a plurality of optical scanning apparatuses having short optical path lengths are arranged in parallel, thereby diving an image to be constituted in the main scanning direction, reducing respective recording lengths, and splicing them together (refer to Japanese Laid-Open Patent Application No. 2001-228428).

However, when using a plurality of vibration mirrors and scanning in a divided manner as mentioned above, variation in the resonance frequency of each of the vibration mirrors may become a major problem. This is because when the variation in the resonance frequency is large, it is difficult or impossible to drive the plurality of vibration mirrors with a common driving frequency. It should be noted that the span of adjustable range of the swing angle of a mirror is extremely small.

Variation in a resonance frequency may be caused by the following factors.

(i) variation in processing during production
(ii) variation due to change in environmental temperature and/or humidity
(iii) variation in ambient pressure (when used in the atmosphere)

Accordingly, the above-mentioned problem cannot be avoided, and it is necessary to select one of the following options: for example, driving the vibration mirrors with respective driving frequencies corresponding to respective resonance frequencies; selecting and using those vibration mirrors that fall within a predetermined range, and driving the vibration mirrors with the same driving frequency, which is undesirable in terms of process yield; and adding a complicated driving system whereby controlling and driving the vibration mirrors.

Countermeasures for variation in a resonance frequency due to variation in processing (the above item (i)) include a method that, in a manufacturing process of a vibration mirror, after the vibration mirror and a torsion beam are formed, performs etching or depositing on the vibration mirror and/or the torsion beam so as to vary the mass thereof (generally referred to as "trimming") while driving the vibration mirror, thereby adjusting the resonance frequency to fall within a predetermined range (refer to Japanese Laid-Open Patent Applications No. 2002-40353, No. 2002-40355, No. 2002-228965).

However, since the above-mentioned method performs the adjustment in the middle of the manufacturing process, there are problems in that a shift tends to occur if adjustment is not performed in prospect of a difference between the resonance frequencies before and after completion of the vibration mirror, and it is difficult or impossible to correspond to variation in the resonance frequency under an environment subjected to the above items (ii) and/or (iii).

In addition, the resonance frequency of a vibration mirror is fundamentally determined to a unique value by the rigidity of an elastic member (torsion beam) and the inertia of the vibration mirror. Hence, countermeasures for variation in the resonance frequency due to temperature change under an environment subjected to the above item (ii) include a method that provides a heater (resistance heating) to a torsion beam, which is an elastic member, and maintains the temperature of the elastic member at a constant value, thereby suppressing rigidity variation due to change in environmental temperature, i.e., frequency variation (refer to Japanese Laid-Open Patent Application No. 9-197334, for example).

However, there are problems in the above-mentioned method. For example, since the above-mentioned method provides the heater, it is inevitable to avoid an increase in the manufacturing costs for the heater. In addition, since electricity is continuously conducted to the heater, power consumption also is increased. Further, since the temperature of the elastic member is controlled by heat generation of the heater, there is a problem in that it is difficult or impossible to correspond to decrease in environmental temperature in a positive manner.

Additionally, the countermeasures also include a method in which a vibration mirror is bonded and fixed to a base member having a thermal expansion coefficient different from that of the vibration mirror, and rigidity variation in an elastic member is canceled out by using a stress created due to the difference between the thermal expansion coefficients of the vibration mirror and the base member, which difference is generated due to temperature change, thereby suppressing frequency variation (refer to Japanese Laid-Open Patent Application No. 2002-321195, for example).

However, with the above-mentioned method, the stress is generated in various ways depending on the structure, materials, and bonding methods. Hence, it is doubtful whether it is possible to design a vibration mirror such that the above-mentioned stress is effectively generated, and whether the stress is effectively generated as designed, when considering errors inevitably introduced during the production of the vibration mirror.

Generally, a structure is used in which the vibration space of a vibration mirror is sealed with respect to variation in a resonance frequency in the case where the above item (iii) exists.

Further, countermeasures for the above items (i) through (iii) include a method that uses a driving circuit constituted by a feedback circuit having a relatively simple structure, thereby positively driving a vibration mirror at a resonance frequency (refer to Japanese Laid-Open Patent Application No. 2002-277809, for example). However, the method drives the vibration mirror with an electromagnetic force. In the method, a coil formed on the vibration mirror for conducting a driving current is commonly used, and feedback is given by detecting a counter electromotive force. Thus, there is, for example, a limitation that the method is inapplicable to a vibration mirror that uses a driving force other than an electromagnetic force.

SUMMARY OF THE INVENTION

A general object of the present invention is to provide an improved and useful optical scanning apparatus, optical writing apparatus, image forming apparatus, and method in which one or more of the above-mentioned problems are eliminated.

Another and more specific object of the present invention is to provide an optical scanning apparatus using an electrostatically-actuated beam-supported-type vibration mirror, an optical writing apparatus and an image forming apparatus using the optical scanning apparatus that can effectively suppress variation of a swing angle of a vibration mirror caused by, for example, change in environmental temperature, without changing the structure of a vibration mirror and without providing additional means that increase costs, thereby achieving stable optical scanning and stable image formation.

Still another object of the present invention is to provide a method that reduces variation in the resonance frequency of a vibration mirror and a method that increases the tolerance range for variation in a driving frequency.

In order to achieve the above-mentioned objects, according to one aspect of the present invention, there is provided an optical scanning apparatus including:

a vibration mirror including driving electrodes; and a driving part that applies a driving pulse to the driving electrodes of the vibration mirror, the vibration mirror including:

a mirror substrate having free ends;

two beams swingably supporting the mirror substrate; and movable electrodes formed on the free ends of the mirror substrate; and wherein the driving electrodes are provided at positions corresponding to the movable electrodes so as to generate an electrostatic torque for vibrating the mirror substrate, and wherein a cycle of the driving pulse is set such that the mirror substrate is vibrated at a frequency that is higher than a resonance point of a resonance frequency band of the vibration mirror.

Additionally, according to another aspect of the present invention, there is provided an optical scanning apparatus including:

a vibration mirror; and a driving part, the vibration mirror including:

a mirror substrate having free ends;

two beams swingably supporting the mirror substrate;

movable electrodes formed on the free ends of the mirror substrate;

two first driving electrodes that generate an electrostatic torque for vibrating the mirror substrate; and two second driving electrodes that are provided to overlap with the respective first driving electrodes in a vibration direction of the mirror substrate and that generate an electrostatic torque for vibrating the mirror substrate, the driving part being adapted to apply a first driving pulse to the first driving electrodes, a second driving pulse to one of the second driving electrodes, and a third driving pulse to the other of the second driving electrodes, wherein cycles and phases of the first, second and third driving pulses are set such that the mirror substrate is vibrated at a frequency that is higher than a resonance point of a resonance frequency zone of the vibration mirror.

Additionally, according to another aspect of the present invention, there is provided a method of driving a vibration mirror including: a mirror substrate having free ends; two beams swingably supporting the beams; movable electrodes formed on the free ends of the mirror substrate; and driving electrodes that are provided at positions corresponding to the movable electrodes and that generate an electrostatic torque for vibrating the mirror substrate, the method including the steps of:

setting a cycle of a driving pulse such that the mirror substrate is vibrated at a frequency higher than a resonance point of a resonance frequency band; and applying the driving pulse to the driving electrodes.

Additionally, according to another aspect of the present invention, there is provided a method of driving a vibration mirror including: a mirror substrate; two beams swingably supporting the mirror substrate; movable electrodes formed on free ends of the mirror substrate; two first driving electrodes that generate electrostatic torque for vibrating the mirror substrate; and two second driving electrodes that are provided to overlap with the respective first driving electrodes in a vibration direction of the mirror substrate and that generate an electrostatic torque for vibrating the mirror substrate, the method including the steps of:

setting cycles and phases of a first driving pulse, a second driving pulse, and a third driving pulse such that the mirror substrate is vibrated at a frequency that higher than a resonance point of a resonance frequency band of the mirror substrate; and applying the first driving pulse to the first driving electrodes, the second driving pulse to one of the second driving electrodes, and the third driving pulse to the other of the second electrodes.

According to the present invention, variation in the swing angle of the vibration mirror due to environmental temperature change is reduced. Thus, it is possible to perform stable optical scanning.

In an embodiment of the present invention, by driving the mirror substrate by means of the first and second driving electrodes, it is possible to increase the swing angle of the vibration mirror and expand the scanning width.

In an embodiment of the present invention, it is possible to effectively drive the mirror substrate by exerting only an electrostatic torque that increases the speed of vibration of the mirror substrate. Also, it is possible to obtain a greater swing angle by using both electrostatic attraction and electrostatic repulsive force of the second driving electrodes.

In an embodiment of the present invention, it is possible to adjust the swing angle of the vibration mirror.

In an embodiment of the present invention, the facing areas between the driving electrodes and the movable electrodes may be increased. Hence, it is possible to obtain a desired swing angle with a low driving voltage.

In an embodiment of the present invention, it is possible to reduce the load at the time when the mirror substrate is vibrated. Hence, it is possible to obtain a desired swing angle with a low driving voltage.

Additionally, according to another aspect of the present invention, there is provided an optical writing apparatus for scanning an image carrier with an optical light beam modulated with a recording signal, the optical writing apparatus including:

an optical scanning apparatus; and
an incident part,
the optical scanning apparatus including:
a vibration mirror including driving electrodes; and
a driving part that applies a driving pulse to the driving electrodes of the vibration mirror,
the vibration mirror including:
a mirror substrate having a mirror surface and free ends;
two beams swingably supporting the mirror substrate; and
movable electrodes formed on the free ends of the mirror substrate;
wherein the driving electrodes are provided at positions corresponding to the movable electrodes so as to generate an electrostatic torque for vibrating the mirror substrate, and
wherein a cycle of the driving pulse is set such that the mirror substrate is vibrated at a frequency that is in a resonance frequency band of the vibration mirror and is higher than a resonance point, and
the incident part being disposed to cause the optical light beam modulated with the recording signal to be incident on the mirror surface of the mirror substrate of the vibration mirror of the optical scanning apparatus.

Additionally, according to another aspect of the present invention, there is provided an image forming apparatus including:
an image carrier;
an optical writing apparatus that forms an electrostatic latent image on the image carrier by scanning the image carrier with an optical light beam modulated with a recording signal;
a developing part that develops with toner the electrostatic latent image formed on the image carrier;
a transfer part that transfers a developed toner image on a transfer medium; and
a fixing part that fixes a transferred toner image to the transfer medium,
the optical writing apparatus including:
an optical scanning apparatus; and
an incident part,
the optical scanning apparatus including:
a vibration mirror including driving electrodes; and
a driving part that applies a driving pulse to the driving electrodes of the vibration mirror,
the vibration mirror including:
a mirror substrate having a mirror surface and fee ends;
two beams swingably supporting the mirror substrate; and
movable electrodes formed on the free ends of the mirror substrate;
wherein the driving electrodes are provided at positions corresponding to the movable electrodes so as to generate an electrostatic torque for vibrating the mirror substrate, and
wherein a cycle of the driving pulse is set such that the mirror substrate is vibrated at a frequency that is higher than a resonance point of a resonance frequency band of the vibration mirror, and
the incident part being disposed to cause the optical light beam modulated with the recording signal to be incident on the mirror surface of the mirror substrate of the vibration mirror of the optical scanning apparatus.

Additionally, according to another aspect of the present invention, there is provided an optical writing apparatus for scanning an image carrier with an optical light beam modulated with a recording signal, the optical writing apparatus including:
an optical scanning apparatus; and
an incident part,
the optical apparatus including:
a vibration mirror; and
a driving part,
the vibration mirror including:
a mirror substrate having free ends and a mirror surface;
two beams swingably supporting the mirror substrate;
movable electrodes formed on the free ends of the mirror substrate;
two first driving electrodes that generate an electrostatic torque for vibrating the mirror substrate; and
two second driving electrodes that are provided to overlap with the respective first driving electrodes in a vibration direction of the mirror substrate and that generate an electrostatic torque for vibrating the mirror substrate,
the driving part being adapted to apply a first driving pulse to the first driving electrodes, a second driving pulse to one of the second driving electrodes, and a third driving pulse to the other of the second driving electrodes,
wherein cycles and phases of the first, second and third driving pulses are set such that the mirror substrate is vibrated at a frequency that is higher than a resonance point of a resonance frequency zone of the vibration mirror, and
the incident part causing the optical light beam modulated with the recording signal to be incident on a mirror surface of the mirror substrate of the vibration mirror of the optical scanning apparatus.

Additionally, according to another aspect of the present invention, there is provided an image forming apparatus including:
an image carrier;
an optical writing apparatus that forms an electrostatic latent image on the image carrier by scanning the image carrier with an optical light beam modulated with a recording signal;
a developing part that develops with toner the electrostatic latent image formed on the image carrier;
a transfer part that transfers a developed toner image on a transfer medium; and
a fixing part that fixes a transferred toner image to the transfer medium,
the optical writing apparatus including:
an optical scanning apparatus; and
an incident part,
the optical apparatus including:
a vibration mirror; and
a driving part,
the vibration mirror including:
a mirror substrate having free ends and a mirror surface;
two beams swingably supporting the mirror substrate;
movable electrodes formed on the free ends of the mirror substrate;
two first driving electrodes that generate an electrostatic torque for vibrating the mirror substrate; and
two second driving electrodes that are provided to overlap with the respective first driving electrodes in a vibration direction of the mirror substrate and that generate an electrostatic torque for vibrating the mirror substrate, the driving part being adapted to apply a first driving pulse to the first driving electrodes, a second driving pulse to one of the second driving electrodes, and a third driving pulse to the other of the second driving electrodes, wherein cycles and phases of the first, second and third driving pulses are set such that the mirror substrate is vibrated at a frequency that is higher than a resonance point of a resonance frequency zone of the vibration mirror, and the incident part being adapted to cause the optical light beam modulated with the recording signal to be incident on the mirror surface of the mirror substrate of the vibration mirror of the optical scanning apparatus.

Accordingly, it is possible to realize an inexpensive and compact optical writing apparatus that can perform stable optical writing, and an inexpensive and compact image forming apparatus that can perform stable image formation.

In addition, it is possible to reduce power consumption and noise of an optical writing apparatus and an image forming apparatus.

Additionally, according to another aspect of the present invention, there is provided an optical scanning apparatus including:

a vibration mirror having a mirror surface that reflects an optical beam and vibrated in a vibration space formed in the optical scanning apparatus; and a pair of torsion beams swingably supporting the vibration mirror in the vibration space, wherein the vibration space is sealed and an air pressure therein is adjusted such that a characteristic of the vibration mirror falls within a predetermined range.

According to an aspect of the present invention, the vibration space may be sealed after adjusting the air pressure therein. Hence, it is possible to adjust characteristics (e.g., resonance frequency and swing angle) of a vibration mirror that can be varied by adjusting the air pressure. Hence, it is possible to obtain a vibration mirror having desired characteristics by performing the above-mentioned adjustment in the last manufacturing process of the vibration mirror.

Additionally, according to another aspect of the present invention, there is provided an optical scanning apparatus including:

a vibration mirror having a mirror surface that reflects an optical beam;

a pair of torsion beams swingably supporting the vibration mirror in a sealed vibration space formed in the optical scanning apparatus; and an air pressure adjusting part that adjusts an air pressure in the vibration space such that a characteristic of the vibration mirror falls within a predetermined range.

According to an aspect of the present invention, the air pressure in the vibration space may be adjusted after sealing the vibration mirror. Hence, it is possible to make variation in characteristics of optical scanning apparatuses fall within a predetermined range. Thus, it is possible to easily adjust such variation.

Additionally, according to another aspect of the present invention, there is provided an optical scanning apparatus including:

a vibration mirror having a mirror surface that reflects an optical beam and vibrated in a sealed vibration space formed in the optical scanning apparatus;

a pair of torsion beams swingably supporting the vibration mirror in the sealed vibration space; and an air pressure adjusting part that adjusts an air pressure in the sealed vibration space such that a predetermined swing angle is obtained at a predetermined driving frequency or a predetermined band.

In an embodiment of the present invention, it is possible to obtain desired swing angles in a plurality of optical scanning apparatuses having variation in their characteristics with an arbitrarily-determined constant driving frequency.

In an embodiment of the present invention, the air pressure adjusting part may absorb a gas in the vibration space, and adjust the air pressure in the vibration space by absorbing the gas therein.

In an embodiment of the present invention, it is possible to reduce variation in characteristics of vibration mirrors by adjusting the air pressures in the vibration spaces.

In an embodiment of the present invention, the air pressure adjusting part may release a gas in the vibration space and adjust the air pressure in the vibration space by releasing the gas therein.

In an embodiment of the present invention, it is possible to reduce variations in characteristics of vibration mirrors.

In an embodiment of the present invention, a gas introduced into the vibration space may be formed by mixing a plurality of kinds of gases.

In an embodiment of the present invention, it is possible to finely adjust the air pressures in the vibration spaces in which the vibrating mirrors are vibrated. Hence, it is possible to reduce variation in characteristics of vibrating mirrors.

In an embodiment of the present invention, the air pressure adjusting part may include a plurality of kinds of air pressure adjusting parts.

In an embodiment of the present invention, the adjustable range of air pressure in the vibration space may be increased, and it is possible to perform fine adjustment of the air pressure therein. Thus, high flexibility in adjustment is achieved.

In an embodiment of the present invention, the air pressure adjusting parts may have different activation temperatures.

In an embodiment of the present invention, it is possible to coarsely and finely adjust the air pressure in the vibration space merely by varying temperature. Hence, it is possible to further reduce variation in characteristics of vibration mirrors.

In an embodiment of the present invention, the air pressure adjusting parts may have different activators.

In an embodiment of the present invention, it is possible to perform local activation, and coarsely and finely adjust the air pressure in the vibration space. Thus, it is possible to further reduce variation in characteristics of vibration mirrors.

In an embodiment of the present invention, a plurality of the air pressure adjusting parts may be arranged at different positions.

In an embodiment of the present invention, reaction more than scheduled is prevented in activation by heating. Thus, it is possible to easily adjust the air pressure.

In an embodiment of the present invention, an optical scanning apparatus may include:

a driving voltage generator applying a voltage of a predetermined frequency to the optical scanning apparatus, wherein the vibration mirror is driven in a band that is in the vicinity of a resonance frequency and is outside a resonance peak.

In an embodiment of the present invention, by using a band outside a resonance peak, it is possible to increase the adjustable range of the driving frequency.

Additionally, according to another aspect of the present invention, there is provided an image forming apparatus including:

an optical scanning apparatus as described herein for example;

a photo conductor on which an electrostatic image is formed by the optical scanning apparatus;

a developing part developing the electrostatic image by a toner; and a transfer part transferring a developed toner image onto a sheet medium.

In accordance with the present invention, compared to conventional scanning means using a polygon mirror, power consumption is less. Thus, it is possible to provide an image forming apparatus producing low noise.

Other objects, features and advantages of the present invention will become more apparent from the following detailed description when read in conjunction with the following drawings.

BRIEF DESCRIPTION OF THE DRAWINGS

FIG. 7 is a schematic diagram showing a general structure of the optical scanning apparatus according to the second embodiment of the present invention;

FIG. 8 is a waveform chart for explaining a driving method of the vibration mirror in the second embodiment of the present invention;

FIG. 29 is a table showing chemical absorption characteristics of metals with respect to a plurality of kinds of gases;

DETAILED DESCRIPTION OF THE PREFERRED EMBODIMENTS

A description is given below of preferred embodiments of the present invention, with reference to the drawings.

(First Embodiment)

Figure 1A:
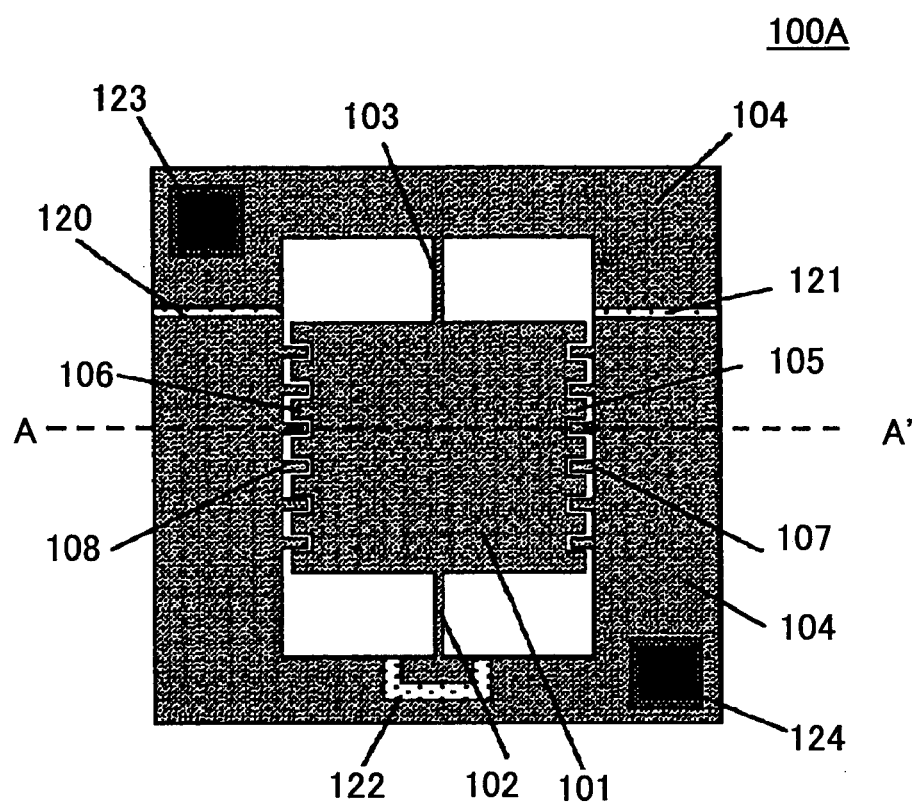
FIG. 1A is a schematic plan view of a vibration mirror used in an optical scanning apparatus according to a first embodiment of the present invention.
Figure 1B:
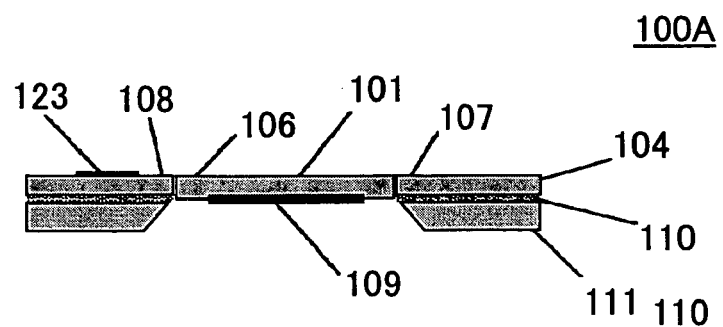
FIG. 1B is a schematic cross-sectional view of the vibration mirror used in the optical scanning apparatus according to the first embodiment of the present invention.
Figure 2:
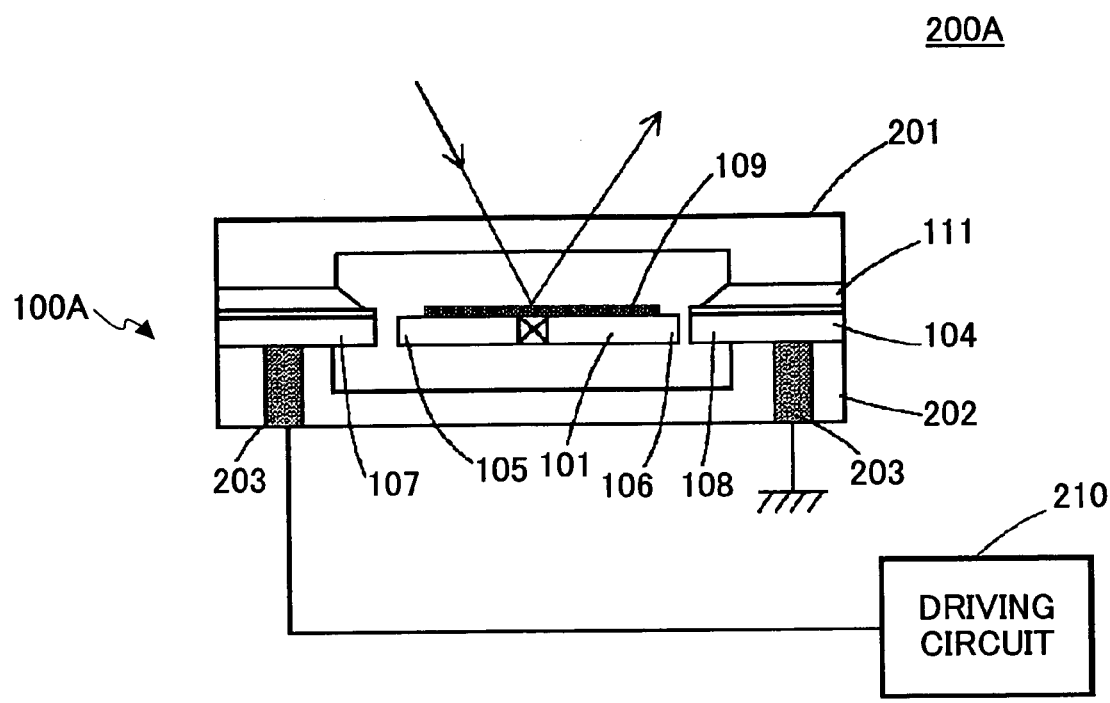
FIG. 2 is a schematic diagram showing a general structure of the optical scanning apparatus according to the first embodiment of the present invention.

A description is given below of the first embodiment of the present invention. FIGS. 1A and 1B show the structure of a vibration mirror 100A used in an optical scanning apparatus 200A according to this embodiment. FIG. 2 shows the general structure of the optical scanning apparatus 200A.

FIG. 1A is a schematic plan view of the vibration mirror 100A seen from the side opposite to a mirror surface of the vibration mirror 10A. FIG. 1B is a schematic cross sectional view of the vibration mirror 100A taken along the line A–A' in FIG. 1A.

The vibration mirror 100A shown in FIG. 1A includes a mirror substrate 101, torsion beams 102 and 103, and a frame supporting part 104. The mirror substrate 101 is supported by the frame supporting part 104 via the torsion beams 102 and 103 at the central portions of two opposing ends thereof. The mirror substrate 101 can perform reciprocating vibration while using the torsion beams 102 and 103 as the torsion rotation axes. Comb-like movable electrodes 105 and 106 are formed on the two opposing ends (free ends) of the mirror substrate 101 that are not supported by the torsion beams 102 and 103. First comb-like driving electrodes (driving electrodes) 107 and 108, which engage with the comb-like movable electrodes 105 and 106 via minute gaps (in a non-contact manner) as shown, are formed in the frame supporting part 104. The movable electrodes 105 and 106 and the driving electrodes 107 and 108 have the comb-like shapes so that facing areas between the movable electrodes 105 and 106 and the driving electrodes 107 and 108 are increased, and a large swing angle is achieved with a low driving voltage.

The structure including: the mirror substrate 101; the torsion beams 102 and 103; and the frame supporting part 104 having the driving electrodes 107 and 108 is integrally formed by conducting a general etching process on a first substrate (a monocrystal silicon substrate having a low resistance, for example). A mirror surface 109 (FIG. 1B), which is formed by a metal film having a high reflection coefficient with respect to the wavelength of a scanning light that is used, is formed on one surface of the mirror substrate 101.

A frame supporting part 111 (FIG. 1B) having a shape substantially the same as that of the frame. supporting part 104 is bonded to the frame supporting part 104 via an insulating film 110. The frame supporting part 111 is manufactured by conducting a general etching process on a second substrate (monocrystal silicon substrate having a low resistance, for example) bonded to the first substrate via the insulating film 110.

The frame supporting part 104 is divided in an insulating manner by slits 120, 121 and 122 into: a region that is electrically conductive to the mirror substrate 101; and a region that is electrically conductive to the driving electrodes 107 and 108. Electrode pads 123 and 124, each being formed by a thin metal layer, are formed in the above-mentioned regions.

According to this embodiment, as shown in FIG. 2, a vibration space of the mirror substrate 101 is sealed in a depressurized state by bonding a cover substrate 201 and a base substrate 202 to both surfaces of the vibration mirror 100A. By causing the vibration space to assume a depressurized state as mentioned above, the viscous resistance of the vibration space is decreased. Hence, it becomes possible to increase the swing angle of the mirror substrate 101. It should be noted that, though the resonance point of the vibration mirror 100A is approximated by the aforementioned equation (1), the resonance point falls in proportion to the increase in the vibration space. Since in this embodiment the cover substrate 201 transmits a scanning light beam, the cover substrate 201 is made of, for example, Pyrex glass. The base substrate 202 is made of an insulating material such as glass and a synthetic resin.

The optical scanning apparatus 200A shown in FIG. 2 includes a driving circuit 210 for driving the driving electrodes 107 and 108 of the vibration mirror 100A. The electrode pad 124 (FIG. 1A) of the driving electrodes 107 and 108 of the vibration mirror 100A is electrically connected to the driving circuit 210 via a penetrating electrode 203 formed in the base substrate 202. The electrode pad 123 (FIG. 1A) of the mirror substrate 101 is grounded via another penetrating electrode 203 of the base substrate 202.

Figure 3:
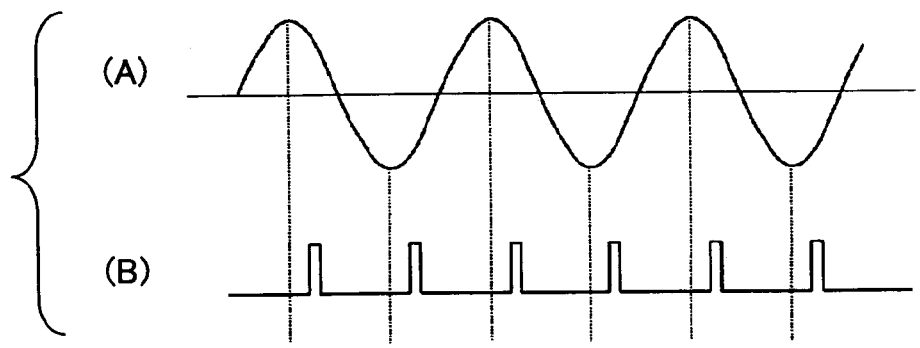
FIG. 3 is a waveform chart for explaining a driving method of the vibration mirror of the optical scanning apparatus according to the first embodiment of the present invention.

The driving circuit 210 drives the mirror substrate 101 to vibrate in a reciprocating manner by applying a common driving pulse to the driving electrodes 107 and 108. FIG. 3 shows the phase relationship between the vibration waveform of the mirror substrate 101 (represented by (A)), and the driving pulse (represented by (B)). The cycle of the driving pulse is set such that the vibration mirror 100A is vibrated at a frequency somewhat higher than the resonance point of the resonance frequency band of the vibration mirror 100A.

Figure 5:
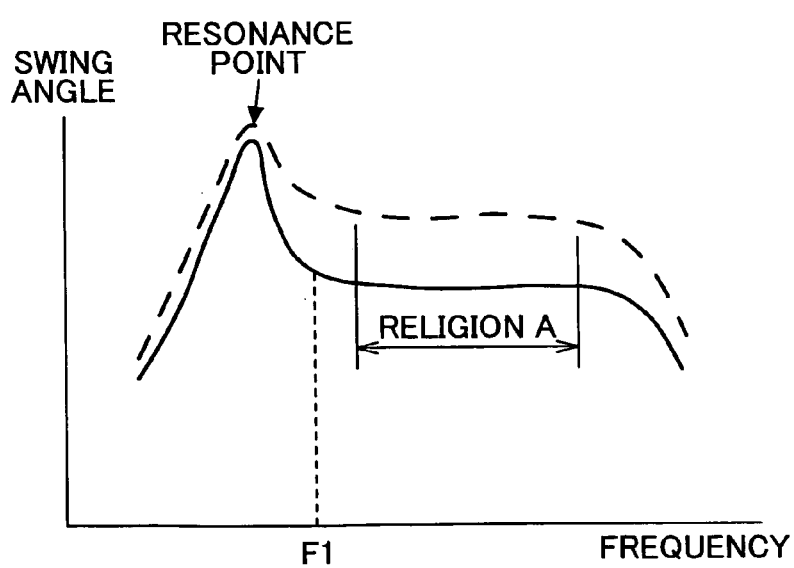
FIG. 5 is a graph showing a relationship between the vibration frequency and the swing angle.

In FIG. 5, the continuous line represents the relationship between the vibration frequency and the swing angle of the vibration mirror 100A in this embodiment. In this embodiment, the driving electrodes 107 and 108 are driven by the driving pulse having a cycle that vibrates the mirror substrate 101 in a reciprocating manner at a frequency somewhat higher than the resonance point shown in FIG. 5, i.e., F1. By driving the mirror substrate 101 to be vibrated at such a frequency, even if the resonance point of the vibration mirror 100A is varied due to, for example, change in environmental temperature, variation in the swing angle becomes small.

Referring to FIG. 5, a further description is given below of the variation in the resonance point of the vibration mirror 100A and that in the swing angle.

Figure 4A:
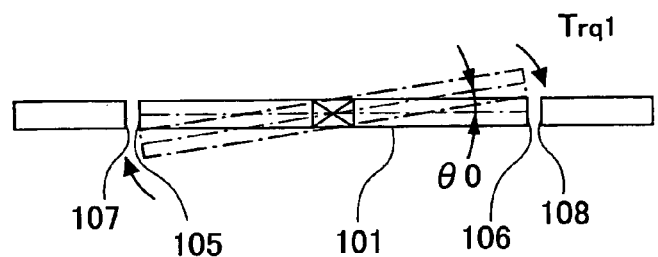
FIG. 4A is a schematic diagram for explaining a relationship between the electrostatic torque and swing angle of the vibration mirror of the optical scanning apparatus according to the first embodiment of the present invention.
Figure 4B:
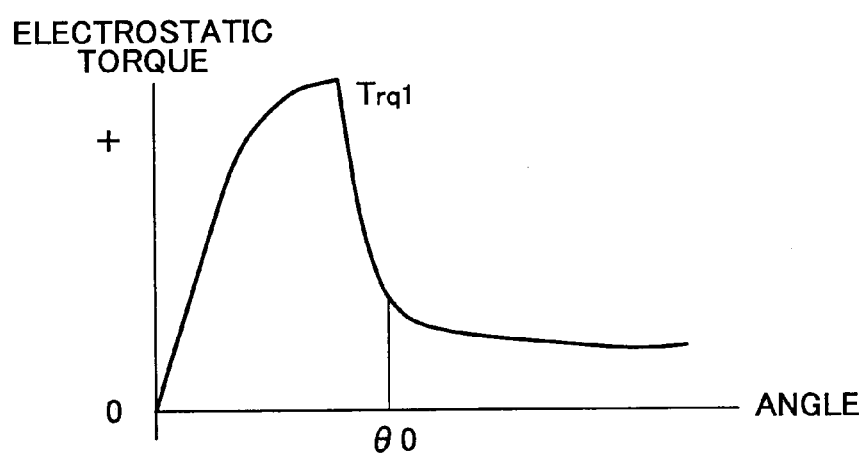
FIG. 4B is a graph for explaining a relationship between the electrostatic torque and swing angle of the vibration mirror of the optical scanning apparatus according to the first embodiment of the present invention.

FIG. 4A is a schematic diagram and FIG. 4B is a graph for explaining the relationship between the swing angle and the electrostatic torque exerted on the mirror substrate 101 of the vibration mirror 100A. $\theta o$ represents the angle of the mirror substrate 101 at the time when the edges of the movable electrodes 105 and 106 face the edges of the driving electrodes 107 and 108. As can be seen from FIG. 4B, when the angle of the mirror substrate 101 is equal to or more than $\theta o$, the rate of change of the electrostatic torque with respect to the angle becomes low. In a case where the vibration mirror 100A is driven at a frequency out of the resonance point, the timing at which the electrostatic torque is exerted on the mirror substrate 101 is in the vicinity of $\theta o$. The variation in the electrostatic torque caused by change in the angle is small in the vicinity of $\theta o$. Accordingly, when the vibration mirror 100A is driven at a vibration frequency that is somewhat higher than the resonance point, even if the resonance point is varied due to, for example, change in environmental temperature, the variation in the swing angle of the vibration mirror 100A is small.

(Second Embodiment)

A description is given below of a second embodiment of the present invention. FIGS. 6A, 6B and 6C show the structure of a vibration mirror 100B used in an optical scanning apparatus 200B according to this embodiment. FIG. 7 shows a general structure of the optical scanning apparatus 200B.

Figure 6:
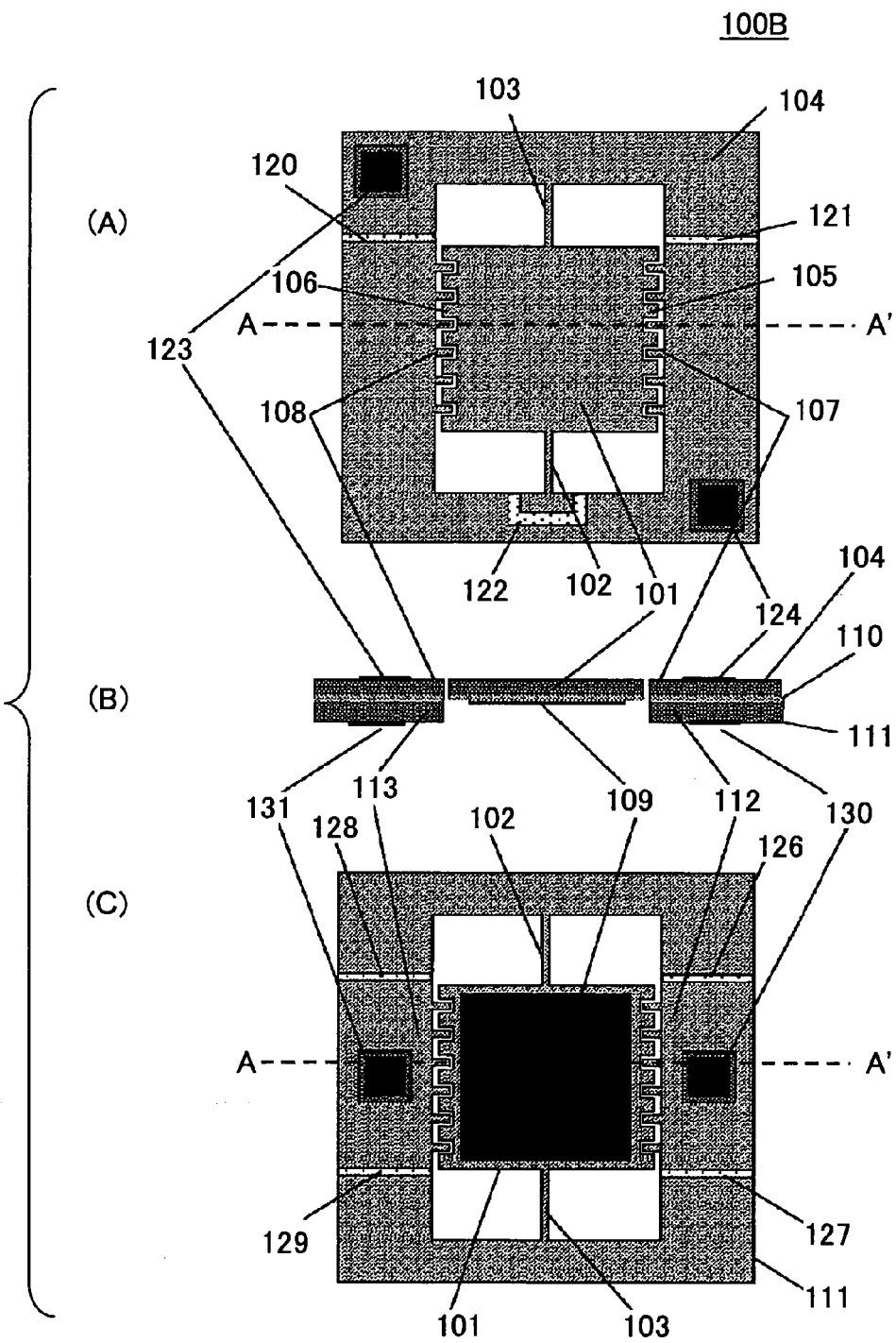
FIG. 6A is a schematic plan view of a vibration mirror seen from the side opposite to a mirror surface.
FIG. 6B is a schematic cross-sectional view of the vibration mirror taken along the line A–A' in FIG. 6A.
FIG. 6C is a schematic plan view of the vibration mirror seen from the mirror surface side.

FIG. 6-(A) is a schematic plan view of the vibration mirror 100B seen from the side opposite to the mirror surface 109. FIG. 6-(B) is a schematic cross-sectional view of the vibration mirror 100B taken along the line A–A' in FIG. 6-(A). FIG. 6-(C) is a schematic plan view of the vibration mirror 100B seen from the mirror surface 109 side.

In FIG. 6, those parts that are the same as those corresponding parts in FIG. 1 are designated by the same reference numerals. The vibration mirror 100B of the second embodiment structurally differs from the vibration mirror 100A of the first embodiment in that: second comb-like driving electrodes (driving electrodes) 112 and 113, which overlap with the first comb-like driving electrodes 107 and 108, are formed in the inner ends of the frame supporting part 111; the frame supporting part 111 is divided in an insulating manner by slits 126, 127, 128 and 129 into a region that is electrically connected to the driving electrode 112 and a region that is electrically connected to the driving electrode 113; and electrode pads 130 and 131, each being formed by a thin metal film, are formed in the above-mentioned regions.

In this embodiment, as shown in FIG. 7, in the vibration mirror 100B having the two-stage electrode structure as mentioned above, the vibration space of the mirror substrate 101 is sealed in a depressurized state by bonding a cover substrate 220 and a base substrate 221 to both surfaces of the vibration mirror 100B. By causing the vibration space to assume the depressurized state as mentioned above, the viscous resistance of the vibration space is decreased. Hence, the load on the mirror substrate 101 at the time of vibration is reduced, and the swing angle is increased. Since the cover substrate 220 transmits a scanning light beam, the cover substrate 220 is made of, for example, Pyrex glass. The base substrate 221 is made of an insulating material such as glass and a synthetic resin.

The optical scanning apparatus 200B shown in FIG. 7 includes a driving circuit 230 for driving the driving electrodes 107, 108, 112 and 113 of the vibration mirror 100B. The common electrode pad 124 (see FIG. 6-(A)) of the driving electrodes 107 and 108 of the vibration mirror 100B is electrically connected to the driving circuit 230 via a penetrating electrode 222 that is formed in the base substrate 221. The electrode pads 130 and 131 (see FIG. 6-(C)) of the driving electrodes 112 and 113 are electrically connected to the driving circuit 230 via penetrating electrodes 222 that are formed in the cover substrate 220. The electrode pad 123 of the mirror substrate 101 is grounded via a penetrating electrode of the base substrate 221.

According to the second embodiment of the present invention, the relationship between the driving pulse applied by the driving circuit 230 to each of the driving electrodes 107, 108, 112 and 113 and the vibration waveform of the mirror substrate 101 becomes as shown in FIG. 8. In FIG. 8, (A) represents the vibration waveform of the mirror substrate 101, (B) represents the waveform of the driving pulse applied to the driving electrodes 107 and 108, (C) represents the waveform of the driving pulse applied to the driving electrode 112, and (D) represents the waveform of the driving pulse applied to the driving electrode 113. The cycle and phase of each of the driving pulses is set such that the vibration mirror 100B is vibrated at a frequency somewhat higher than the resonance point in the resonance frequency band.

The broken line in FIG. 4 represents the relationship between the vibration frequency and the swing angle of the vibration mirror 100B of this embodiment. Since the vibration mirror 100B has a two-stage electrode structure, compared to the vibration mirror 100A having a single-stage electrode structure of the first embodiment, the swing angle is increased in the mass. In this embodiment, the vibration mirror 100B is driven so that the mirror substrate 101 is vibrated in a reciprocating manner at, for example, a frequency in the middle of a frequency zone A whose frequencies are somewhat higher than the resonance point (the peak of the resonance frequency zone) shown in FIG. 4. When the vibration mirror 100B is driven to be vibrated at such a frequency, even if the resonance point is varied due to, for example, change in environmental temperature, the variation in the swing angle becomes small.

A more detailed description is given below of the phase relationship between the vibration and driving pulse of the mirror substrate 101 in the second embodiment.

Figure 9A:
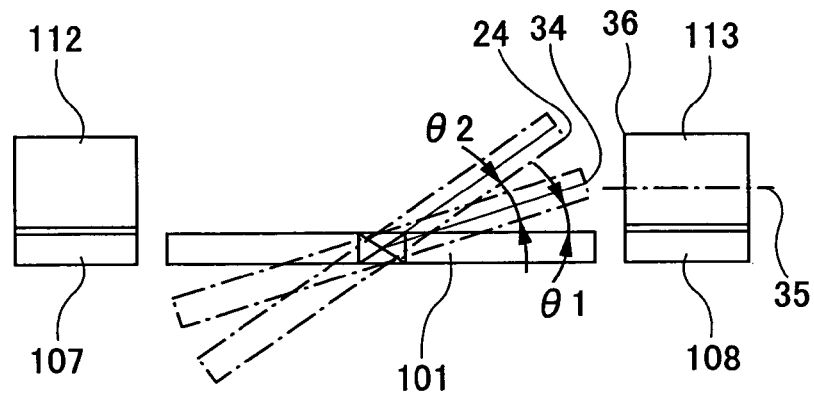
FIG. 9A is a schematic diagram for explaining a relationship between the electrostatic torque and swing angle of the vibration mirror of the optical scanning apparatus according to the second embodiment of the present invention.
Figure 9B:
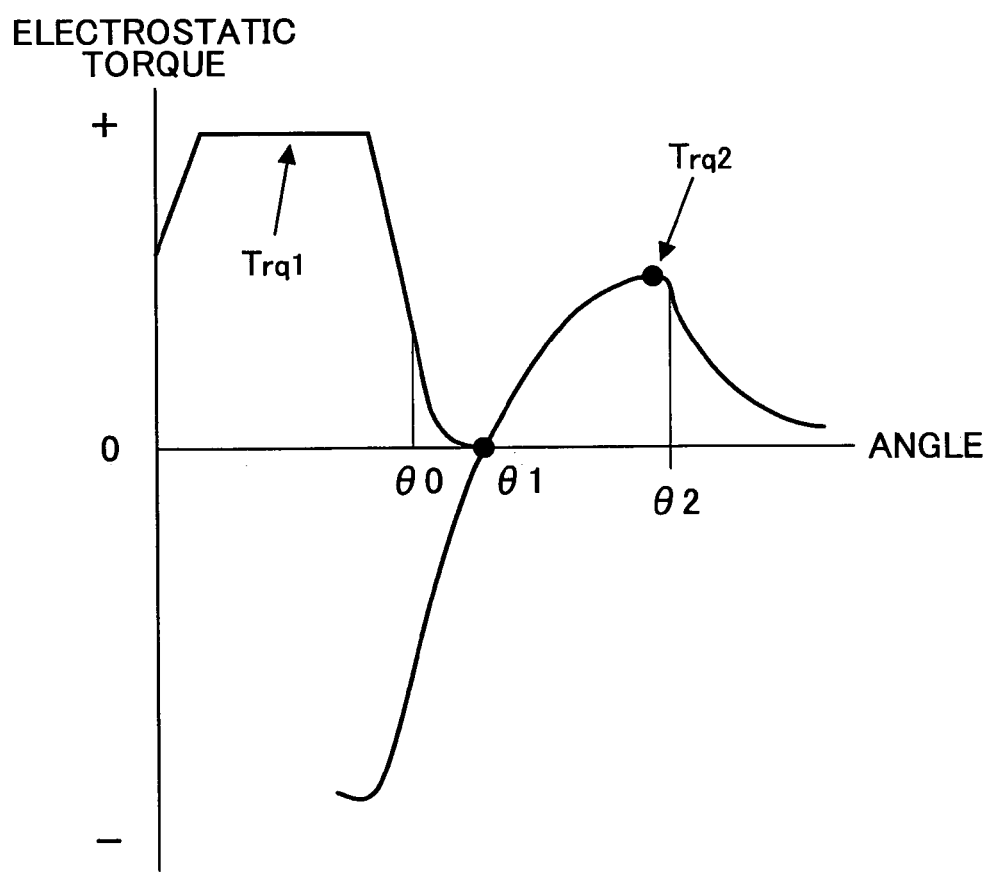
FIG. 9B is a graph for explaining a relationship between the electrostatic torque and swing angle of the vibration mirror of the optical scanning apparatus according to the second embodiment of the present invention.

FIG. 9A is a schematic diagram and FIG. 9B is a graph for explaining the relationship between the swing angle of the mirror substrate 101 and the electrostatic torque exerted on the mirror substrate 101 by each of the driving electrodes 107, 108, 112 and 113. In FIG. 9B, Trq1 represents the electrostatic torque exerted on the mirror substrate 101 by the driving electrodes 107 and 108, and Trq2 represents the electrostatic torque exerted on the mirror substrate 101 by the driving electrode 113 (112). The electrostatic torque is calculated under the condition in which a voltage is applied to the driving electrodes 107 and 108 when the swing angle is equal to or less than $\theta o$, and a voltage is applied to the driving electrode 113 when the swing angle is more than $\theta o$.

In FIG. 9B, $\theta o$ represents the angle of the mirror substrate 101 at the time when the edges of the movable electrodes 105 and 106 face the edges of the driving electrodes 107 and 108 (refer to FIGS. 4A and 4B). $\theta 1$ represents the angle of the mirror substrate 101 at the time when a center 34 of the movable electrode 106 in the thickness direction thereof faces a center 35 of the driving electrode 113 in the thickness direction thereof. $\theta 2$ represents the angle of the mirror substrate 101 at the time when an edge 24 of the movable electrode 106 faces an edge 36 of the driving electrode 113. When the swing angle is equal to or less than $\theta 1$, the electrostatic toque Trq2 is exerted in a direction in which the mirror substrate 101 is made distant from the neutral point of vibration. When the swing angle is more than $\theta 1$, the electrostatic torque Trq2 is exerted in a direction in which the mirror substrate 101 is drawn toward the neutral point of, vibration. The electrostatic torque Trq2 reaches the peak value at the angle $\theta 2$. Although the electrostatic torque exerted by the driving electrode 112 is similar to the electrostatic torque Trq2 exerted by the driving electrode 113, the direction is opposite.

In the second embodiment, the electrostatic torque is exerted by the first driving electrodes 107 and 108 and the second driving electrodes 112 and 113 in the directions along which the mirror substrate 101 is drawn toward the neutral point of vibration. The first driving electrodes 107 and 108 and the second driving electrodes 112 and 113 are driven while being switched at the swing angle $\theta o$. That is, when the swing angle in the positive direction exceeds $\theta o$, the driving pulse is applied to the driving electrode 113, and when the swing angle in the positive direction is equal to or less than θo, the driving pulse is applied to the driving electrodes 107 and 108. When the swing angle in the negative direction exceeds θo, the driving pulse is applied to the driving electrode 112, and when the swing angle in the negative direction is equal to or less than θo, the driving pulse is applied to the driving electrodes 107 and 108. Accordingly, the driving pulses applied to the driving electrodes 112 and 113 are shifted by 180°. With such a driving method, the electrostatic torque by the second driving electrode is exerted only in the direction in which the speed of vibration is accelerated. Thus, it is possible to effectively drive the mirror substrate 101. In addition, compared to the case of the first embodiment, the strength of the electrostatic torque exerted in an angle equal to or more than θ1 is greater. Hence, even if the driving pulse of the same voltage value is applied, it is possible to achieve a greater swing angle in the second embodiment than in the first embodiment.

(Third Embodiment)

Figure 10:
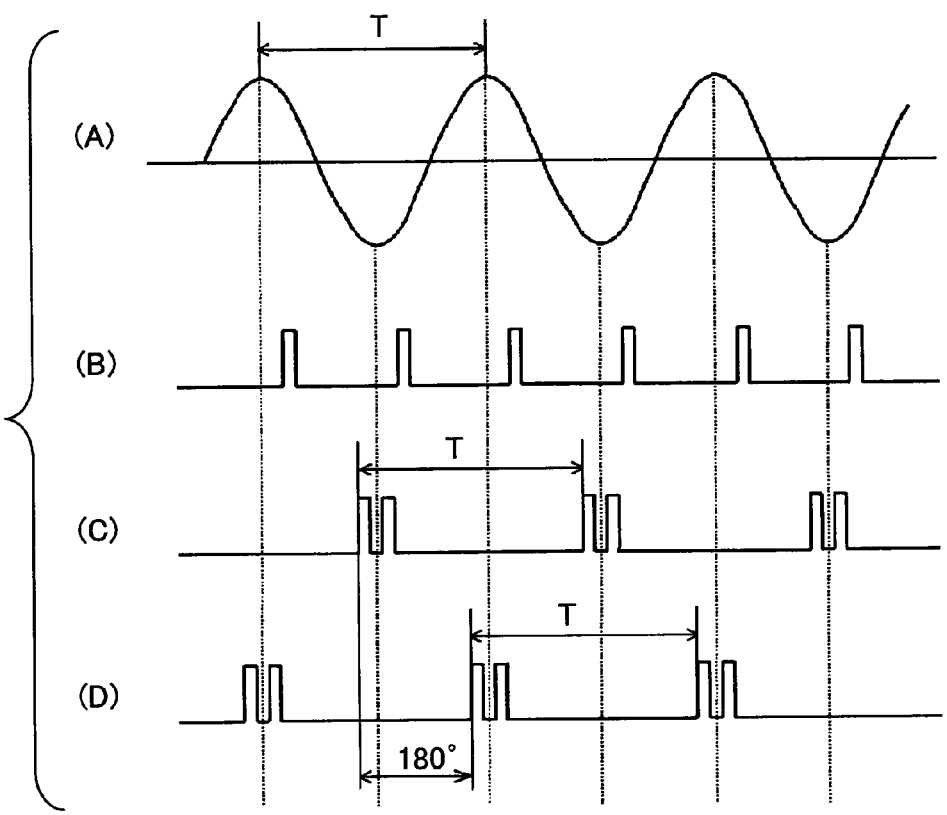
FIG. 10 is a waveform chart for explaining a driving method of the vibration mirror of the optical scanning apparatus according to a third embodiment of the present invention.

According to a third embodiment of the present invention, the driving circuit 230 may drive the vibration mirror 100B at a vibration frequency similar to that in the second embodiment by applying the driving pulse as shown in FIG. 10 to each of the electrodes 107, 108, 112 and 113. In FIG. 10, (A) represents the vibration waveform of the mirror substrate 101, (B) represents the waveform of the driving pulse applied to the driving electrodes 107 and 108, (C) represents the waveform of the driving pulse applied to the driving electrode 112, and (D) represents the waveform of the driving pulse applied to the driving electrode 113.

The driving pulse is applied to the driving electrodes 107 and 108 when the swing angle is equal to or less than θo. When the swing angle exceeds θo, the driving pulse is applied to the driving electrodes 112 and 113. In the third embodiment, however, the driving pulse is applied before and after the extreme value of the vibration waveform. That is, the driving pulse is applied to the driving electrode 112 before and after the extreme value in the negative direction of the vibration waveform of the mirror substrate 101, and the driving pulse is applied to the driving electrode 113 before and after the extreme value in the positive direction of the vibration waveform. The driving pulse applied before the extreme value exerts an electrostatic torque (repulsive force) in a direction separating the mirror substrate 101 from the neutral point of vibration. At such moment, since the mirror substrate 101 is making a movement in the direction separating the mirror substrate 101 from the neutral point of vibration, the electrostatic torque functions to increase the speed of the vibration. The driving pulse applied after the extreme value exerts an electrostatic torque (attracting force) in a direction drawing the mirror substrate 101 toward the neutral point of vibration. At such moment, since the mirror substrate 101 is making a movement in the direction approaching the neutral point of vibration, the electrostatic force functions to increase the speed of the vibration. As mentioned above, since the third embodiment uses both electrostatic attraction and electrostatic repulsion exerted by the driving electrodes 112 and 113, it is possible to achieve a swing angle greater than that achieved in a driving method using only electrostatic attraction.

(Fourth Embodiment)

In a fourth embodiment of the present invention, the driving circuit 230 includes a means for varying the voltage value of the driving pulse with respect to the driving electrodes 112 and 113 so as to adjust the swing angle. The electrostatic force exerted between the second electrodes 112 and 113 and the movable electrodes 105 and 106 is proportional to the square of the voltage between electrodes. Hence, by varying the voltage value of the driving pulse, it is possible to increase and decrease the swing angle. The driving electrodes 112 and 113 may be driven by the driving method of the second embodiment or the third embodiment.

(Fifth Embodiment)

Figure 11A:
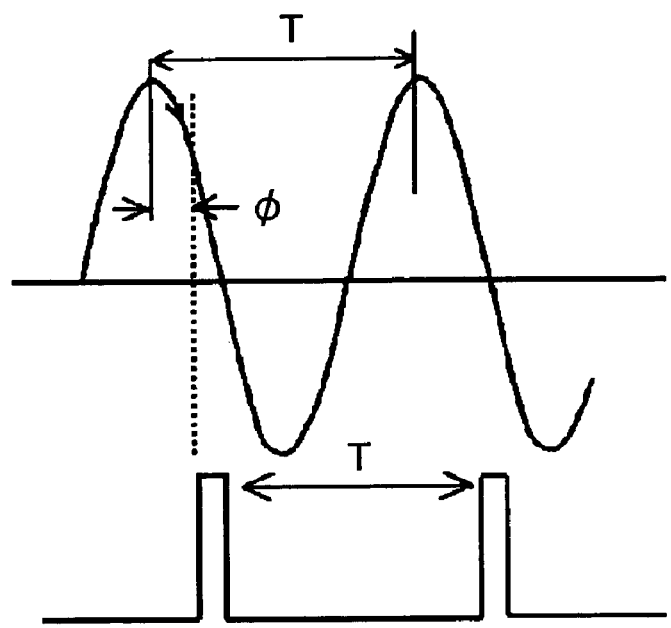
FIG. 11A is a waveform chart for explaining a driving method of a vibration mirror in a fifth embodiment of the present invention.
Figure 11B:
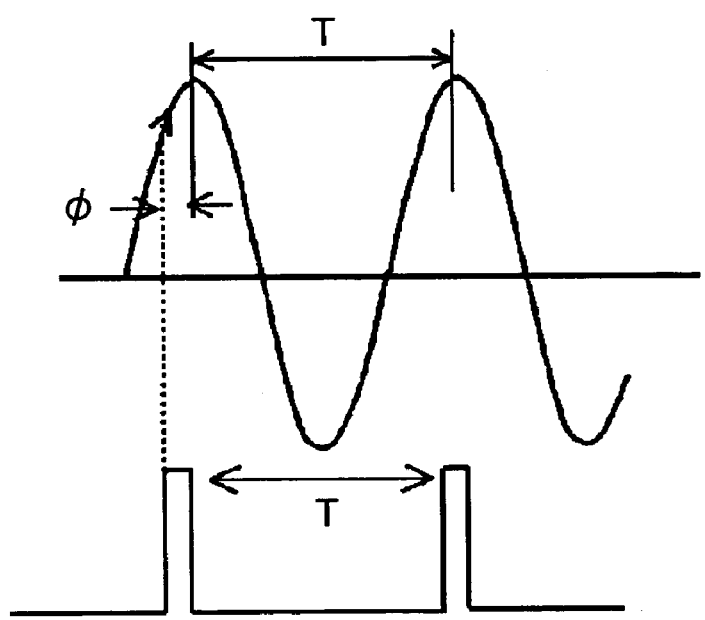
FIG. 11B is another waveform chart for explaining the driving method of the vibration mirror in the fifth embodiment of the present invention.

According to a fifth embodiment of the present invention, though the driving circuit 230 drives the vibration mirror 100B by a method similar to that in the second embodiment (FIG. 8), the driving circuit 230 may include a means for varying the phase of the driving pulse applied to the driving electrodes 112 and 113 so as to adjust the swing angle. In other words, as shown in FIG. 11A, it is possible for the above-mentioned means to delay the driving pulse (corresponding to the driving pulse represented by (D) in FIG. 8) with respect to the driving electrode 113 by $\phi$ from a positive extreme value of the vibration waveform. Alternatively, as shown in FIG. 11B, it is possible for the means to advance the driving pulse by $\phi$ from the positive extreme value of the vibration waveform. Further, it is possible to vary $\phi$ in a fixed range.

When there is a phase relationship as shown in FIG. 11A, the electrostatic torque exerted by the driving electrode 113 functions to increase the speed of vibration of the mirror substrate 101 toward the neutral point of the vibration. On the other hand, where there is a phase relationship as shown in FIG. 11B, the electrostatic torque exerted by the driving electrode 113 functions to increase the speed of vibration of the mirror substrate 101 toward a positive extreme value of the vibration. Additionally, depending on the value of $\phi$, the magnitude of the electrostatic torque to be exerted is varied (refer to FIG. 9(B)). Accordingly, by changing the value of $\phi$ and negative/positive (advance/delay) of $\phi$, it is possible to adjust the swing angle (vibration amplitude) of the mirror substrate 101. Although the description is given above of the case of the driving electrode 113, the driving pulse with respect to the driving electrode 112 and the phase of a negative extreme value of the vibration waveform of the driving pulse are varied in a similar manner. The vibration cycle of the vibration mirror 100B is substantially determined by the cycle of the driving pulse of the driving electrodes 107 and 108. Hence, in practice, the phases of the driving pulse applied to the driving electrodes 112 and 113 are controlled on the basis of the driving pulse applied to the driving electrodes 105 and 106.

(Sixth Embodiment)

Figure 12:
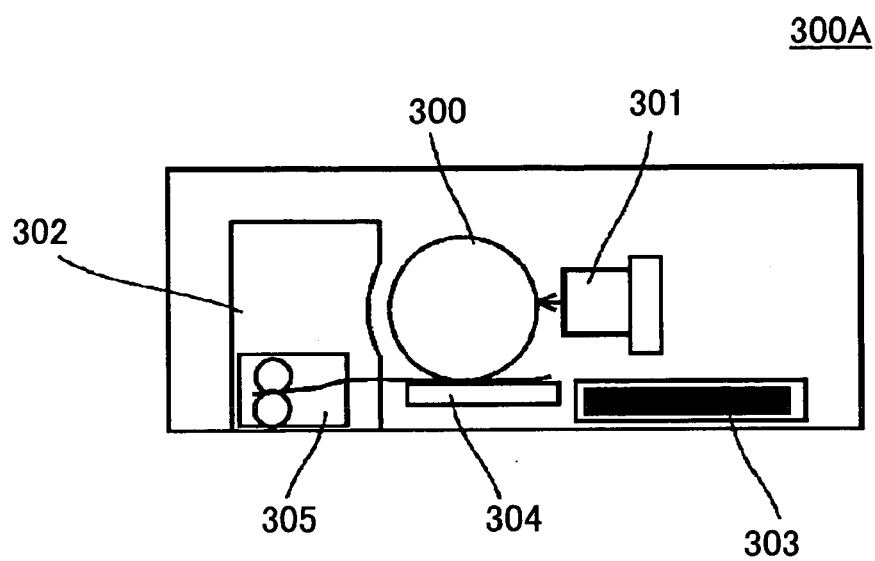
FIG. 12 is a schematic diagram of an image forming apparatus according to a sixth embodiment of the present invention.
Figure 13:
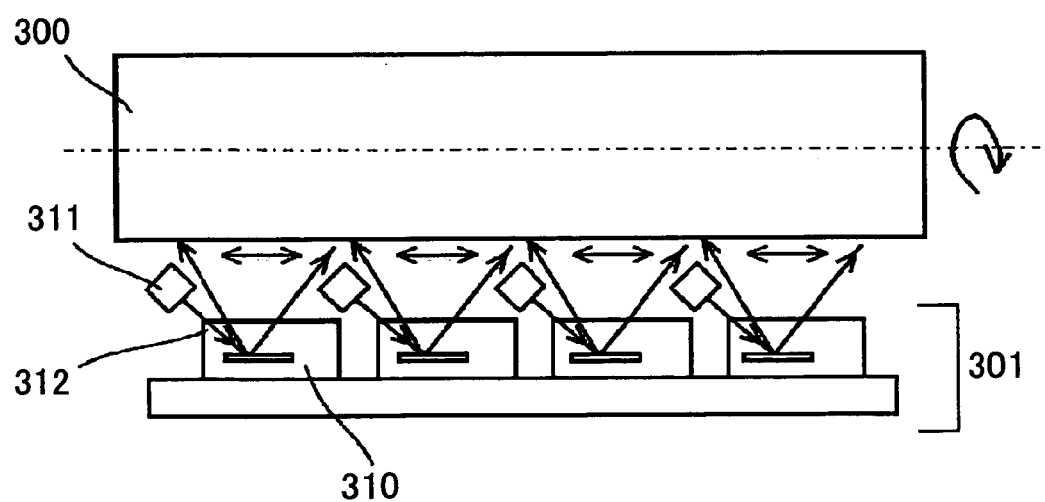
FIG. 13 is a schematic diagram of an optical writing apparatus according to the sixth embodiment of the present invention.
Figure 14:
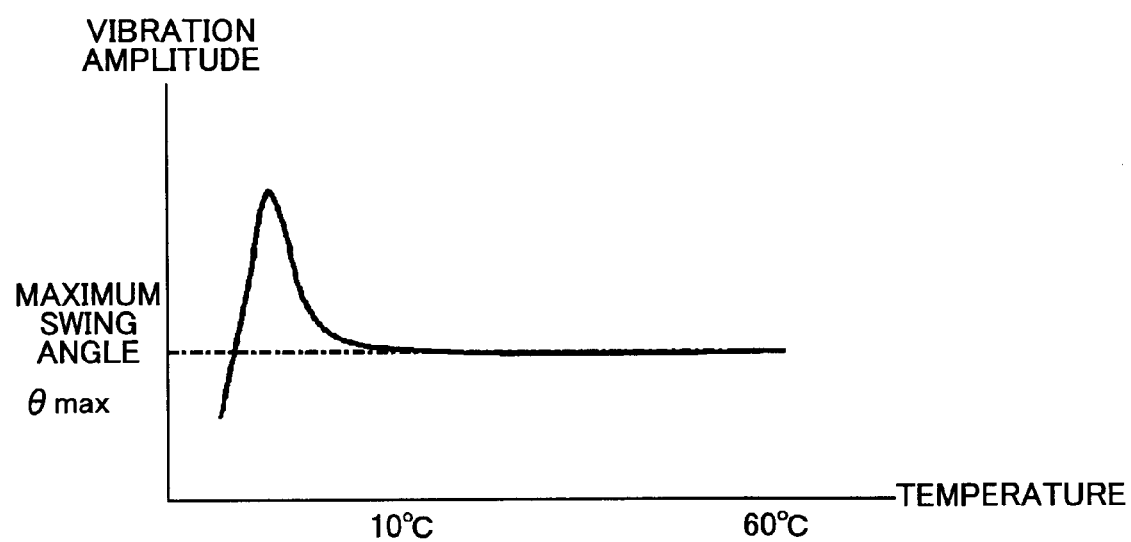
FIG. 14 is a graph showing a relationship between the swing angle of the vibration mirror and environmental temperature.

A description is given below of a sixth embodiment of the present invention. FIG. 12 shows a general structure of an image forming apparatus 300A according to the sixth embodiment. FIG. 13 shows a general structure of an optical writing apparatus 301 of the image forming apparatus 300A.

The image forming apparatus 300A shown in FIG. 12 includes a photo conductor drum 300 serving as an image carrier. A charged surface of the photo conductor drum 300 is scanned by the optical writing apparatus 301 with a laser light beam modulated with a recording signal, thereby forming an electrostatic latent image on the charged surface. The electrostatic latent image is developed with toner by a developing apparatus 302. The developed toner image is transferred by a transfer apparatus 304 onto a recording paper (transfer medium) fed from a paper-feeding tray 303. Then, the developed toner image is fixed to the recording paper by a fixing apparatus 305. Since the general structure of the image forming apparatus 300A is similar to image forming apparatuses of a general electrophotography type, no further description is given.

As shown in FIG. 13, the optical writing apparatus 301 includes a plurality of the above-mentioned optical scanning apparatuses 310 arranged in a main scanning direction, and performs optical scanning (optical writing) by the optical scanning apparatuses 310 with respect to respective predetermined writing widths. Vibration mirrors of the optical scanning apparatuses (200A and/or 200B) 310 are arranged in the main scanning direction. Driving circuits of the optical scanning apparatuses 310 may be arranged in a concentrated manner, and the present invention includes such a configuration. A semiconductor laser 311 is provided for each of the optical scanning apparatuses 310. Each semiconductor laser 311 is modulated in accordance with an image signal generated by an image signal generator (not shown). An output laser light beam of each semiconductor laser 310 is incident on a mirror substrate of the vibration mirror of a corresponding optical scanning apparatus 310, and the photo conductor drum 300 is scanned with a deflected laser light beam. It should be noted that optical systems may be provided between the semiconductor lasers 311 and vibration mirrors of the optical scanning apparatuses 310 and/or between the vibration mirrors and the photo conductor drum 300 if necessary. However, for simplicity, illustration of such optical systems is omitted.

In the optical scanning apparatuses 310 according to the present invention, the swing angles of the mirror substrates are stable irrespective of variation in environmental temperature as mentioned above. Hence, the optical writing widths of the optical writing apparatuses 301 are stable. Accordingly, it is possible for the image forming apparatus according to the present invention to perform image formation of high quality. In addition, compared to an optical scanning apparatus using a polygon mirror, the optical scanning apparatus using a beam-supported-type vibration mirror is more compact in size and inexpensive, consumes less electric power for driving, and produces low operation sound. It is obvious that such advantages are reflected to the image forming apparatus as well as the optical writing apparatus 301.

According to the present invention, variation in the swing angle of the vibration mirror 100A, 100B due to, for example, variation in environmental temperature is reduced. Thus, it is possible to perform stable optical scanning.

In an embodiment of the present invention, the mirror substrate 101 may be driven by the first driving electrodes 107, 108 and the second driving electrodes 112, 113. Thereby, it is possible to increase the swing angle of the vibration mirror 100A, 100B and expand the scan width.

In an embodiment of the present invention, only an electrostatic torque that increases the speed of vibration of the mirror substrate 101 may be exerted. Thereby, it is possible to effectively drive the mirror substrate 101.

In an embodiment of the present invention, by using both electrostatic attraction and electrostatic repulsion exerted by the second driving electrodes 112, 113, it is possible to achieve a greater swing angle.

In an embodiment of the present invention, it is possible to adjust the swing angle of the vibration mirror 100A, 100B.

In an embodiment of the present invention, since the facing areas between the driving electrodes 107, 108 and the movable electrodes 105, 106 are increased, it is possible to achieve a required swing angle with a lower driving voltage.

In an embodiment of the present invention, it is possible to realize an inexpensive and compact optical writing apparatus or image forming apparatus that can perform stable optical writing or stable image formation. Additionally, it is also possible to reduce power consumption and noise of the optical writing apparatus or the image forming apparatus.

Hereinafter, a description is given of a case where an electrostatically-actuated vibration mirror is used as a vibration mirror. The electrostatically-actuated vibration mirror is driven and vibrated by exerting an electrostatic force thereon. The present invention may be applied not only to such electrostatically-actuated vibration mirror, but also to those vibration mirrors that use other driving means such as a piezoelectric driving element.

(Seventh Embodiment)

Figure 15:
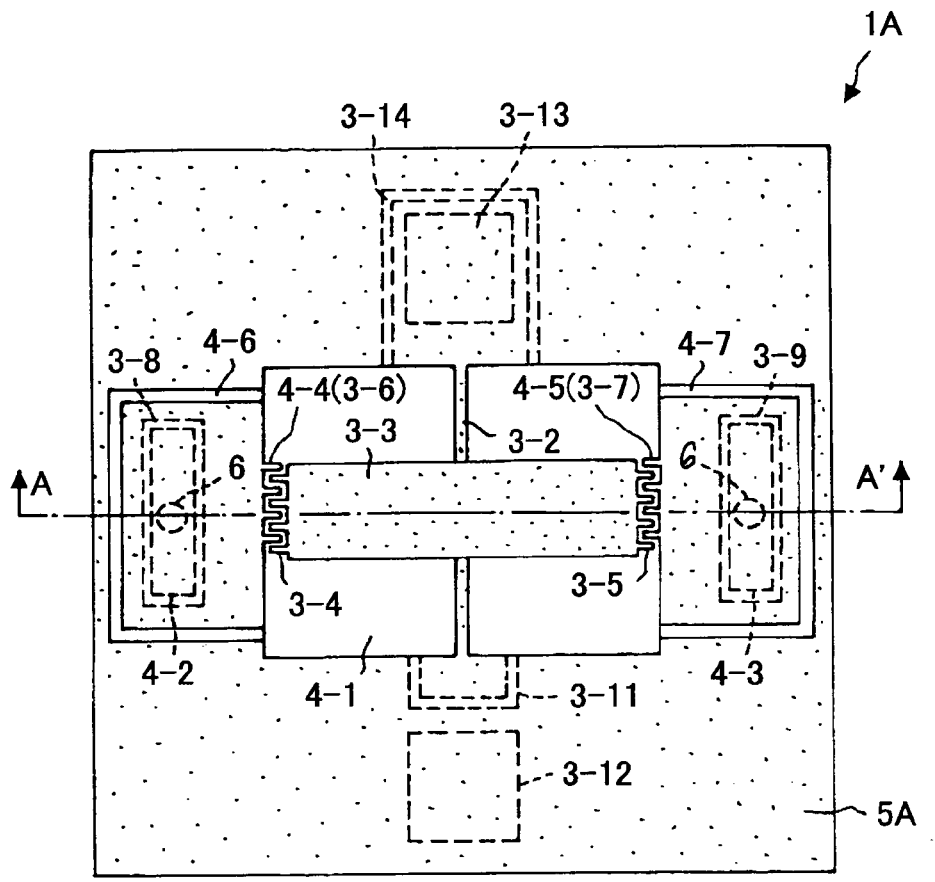
FIG. 15 is a plan view of an optical scanning apparatus.
Figure 16:
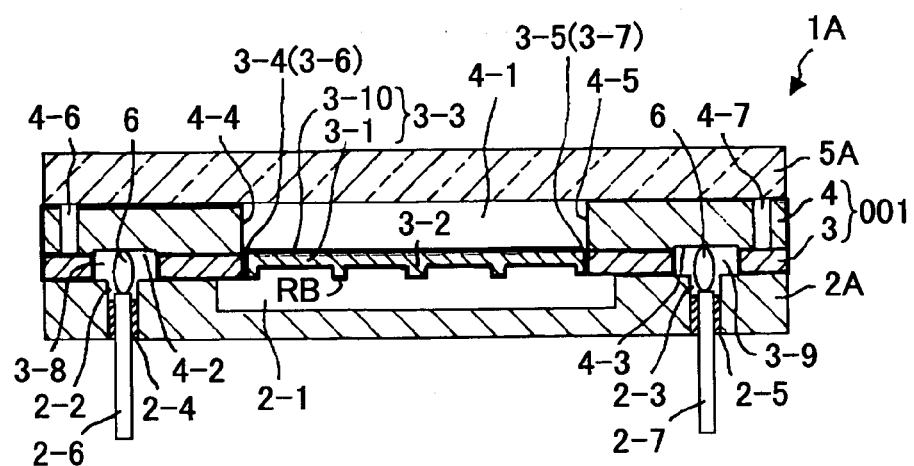
FIG. 16 is a cross-sectional view of the optical scanning apparatus taken along the line A–A' in FIG. 15.
Figure 17:
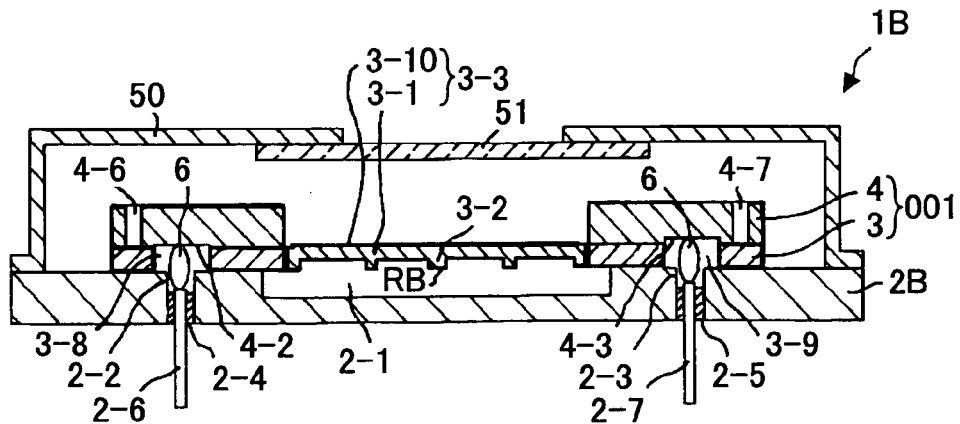
FIG. 17 is a cross-sectional view of another optical scanning apparatus.

Referring to FIGS. 15 through 17, a description is given of an optical scanning apparatus 1A according to a seventh embodiment of the present invention that seals the vibration space of a vibration mirror at the time when characteristics of the vibration mirror fall within a permissible range. FIG. 15 is a top plan view of the optical scanning apparatus 1A. FIG. 16 is a cross-sectional view of the optical scanning apparatus 1A taken along the line A–A' shown in FIG. 15.

Referring to FIGS. 15 and 16, the optical scanning apparatus 1A has a structure in which a base substrate 2A, a first substrate 3, a second substrate 4, and a transparent substrate 5A, each having a rectangular shape, are stacked in this order from the bottom to the top.

A rectangular concave portion 2-1 is formed in the center portion of the base substrate 2A. The concave portion 2-1 has an area and a depth that do not inhibit vibration of a vibration mirror 3-3 centered on a torsion beam 3-2, which is described later. Openings 2-2 and 2-3, which are round through-holes, are formed outside the concave portion 2-1 in the lateral direction. Insulating materials 2-4 and 2-5 are filled in the openings 2-2 and 2-3, respectively. Bar-like lead terminals 2-6 and 2-7 penetrate through the center portions of the insulating materials 2-4 and 2-5, respectively. The bar-like lead terminals 2-6 and 2-7 are held by the insulating materials 2-4 and 2-5, respectively, in an insulating manner.

The torsion beam 3-2 and a strip mirror substrate 3-1 are integrally formed with the first substrate 3 in the center portion of the first substrate 3. In other words, the center portion of the first substrate 3 is hollowed except for the torsion beam 3-2 and the mirror substrate 3-1. The opening thus formed by hollowing the first substrate 3 is indicated by a reference numeral 3-17 in FIG. 31, which is later described in detail. The center portion of the strip mirror substrate 3-1 is supported by the first substrate 3 via the torsion beam 3-2, which is an integral part of the first substrate 3, such that the mirror substrate 3-1 can be oscillated.

The top surface of the mirror substrate 3-1 is a mirror surface 3-10. The vibration mirror 3-3 is formed by the mirror substrate 3-1 having the mirror surface 3-10 formed on the top surface thereof. Referring to FIGS. 15 and 16, a first comb-like movable electrode (hereinafter referred to as "first movable electrode") 3-4 is formed on the left end of the mirror substrate 3-3, and a second comb-like movable electrode (hereinafter referred to as "second movable electrode") 3-5 is formed on the right end thereof.

A first comb-like fixed electrode (hereinafter referred to as "first fixed electrode") 3-6 and a second comb-like fixed electrode (hereinafter referred to as "second fixed electrode") 3-7 are formed in the first substrate 3 with shapes that allow the first fixed electrode 3-6 and the second fixed electrode 3-7 to engage with the first and second movable electrodes 3-4 and 3-5 in a non-contact manner. A rectangular opening 4-1 is formed in the center portion of the second substrate 4. The rectangular opening 4-1 has a size that does not inhibit oscillation of the vibration mirror 3-3, which is turned centering on the torsion beam 3-2.

The substrate 5A protects the vibration mirror 3-3. The substrate 5A is transparent so that an external optical beam can enter the vibration mirror 3-3 and a reflected light from the vibration mirror 3-3 can exit to the outside.

Referring to FIG. 16, rectangular elongated openings 3-8 and 3-9 are formed at positions outside the first and second fixed electrodes 3-6 and 3-7, respectively. The first substrate 3 is covered with an insulating film in the inner sides of the openings 3-8 and 3-9 and the outer peripherals, as indicated by heavy lines in FIG. 16.

The second substrate 4 is also covered with an insulating film in the inner sides of the opening 4-1 and the outer peripherals thereof, as indicated by heavy lines in FIG. 16. However, the insulating film is removed from rectangular elongated regions 4-2 and 4-3 and the rectangular regions 4-2 and 4-3 are electrically conductive. The rectangular regions 4-2 and 4-3 correspond to the openings 3-8 and 3-9 formed in the first substrate 3, and are slightly smaller than the openings 3-8 and 3-9, respectively.

The center portions of the rectangular regions 4-2 and 4-3, having no insulating film, are located at the positions opposing the lead terminals 2-6 and 2-7, respectively. The center portions of the rectangular regions 4-2 and 4-3 contact solder balls 6 having curved surface shapes and provided at respective ends of the lead terminals 2-6 and 2-7, and the center portions of the rectangular regions 4-2 and 4-3 are electrically connected to the lead terminals 2-6 and 2-7, respectively. The solder balls 6 and the lead terminals 2-6 and 2-7 serve as conductive means. Thus, it is possible to apply a voltage for driving the vibration mirror 3-3 to a third fixed electrode 4-4 and a fourth fixed electrode 4-5 (which are described later) formed in the second substrate 4.

A third comb-like fixed electrode 4-4 and a fourth comb-like fixed electrode 4-5 are formed in the second substrate 4 at the positions opposing to the first fixed electrode 3-6 and the second fixed electrode 3-7 of the first substrate 3, respectively. The third and fourth fixed electrodes 4-4 and 4-5 have the shapes, pitches and phases that are the same as those of the first and second fixed electrodes 3-6 and 3-7, so that the third and fourth fixed electrodes 4-4 and 4-5 can engage with the first and second movable electrodes 3-4 and 3-5 in a non-contact manner, and can allow the first and second movable electrodes 3-4 and 3-5 to pass through the third and fourth fixed electrodes 4-4 and 4-5.

An insulating groove (slit groove) 4-6 is formed in the second substrate 4 such that the insulating groove 4-6 surrounds at least the rectangular region 4-2 and the third fixed electrode 4-4 in common and communicates with the opening 4-1. Similarly, an insulating groove (slit groove) 4-7 is formed in the second substrate 4 such that the insulating groove 4-7 surrounds at least the rectangular region 4-3 and the fourth fixed electrode 4-5 in common and communicates with the opening 4-1.

Figure 31:
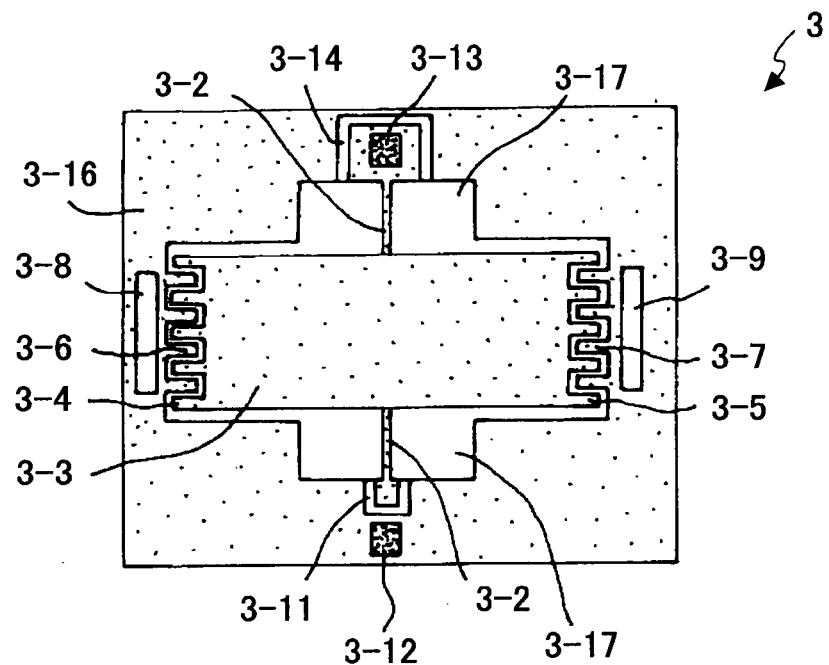
FIG. 31 is a plan view of a first substrate.

Referring to FIGS. 16 and 31, an insulating groove 3-11 is formed in the first substrate 3 such that the insulating groove 3-11 surrounds an end portion of the torsion beam 3-2 located at the lower side of the torsion beam 3-2 in the longitudinal direction thereof, and communicates with the opening 3-17 of the first substrate 3 (refer to FIG. 31). In addition, a fifth fixed electrode 3-12 is formed outside the insulating groove 3-11. The fifth fixed electrode 3-12 is electrically connected with the first and second fixed electrodes 3-6 and 3-7 via the first substrate 3 in common.

Referring to FIGS. 16 and 31, an insulating groove 3-14 is formed in the first substrate 3 such that the insulating groove 3-14 surrounds the other end portion of the torsion beam 3-2, which is located in the upper side of the torsion beam 3-2 in the longitudinal direction thereof, and a sixth fixed electrode 3-13 is provided in the vicinity of the end portion in common, and communicates with the opening 3-17 of the first substrate 3 (refer to FIG. 31). The sixth fixed electrode 3-13 is electrically connected to the first and second movable electrodes 3-4 and 3-5, respectively, of the vibration mirror 3-3 via the torsion beam 3-2 in common.

Application of a voltage or the like is performed on the fifth fixed electrode 3-12 and the sixth fixed electrode 3-13 by using lead terminals (not shown) and solder balls (not shown) having similar structures to those forming the conductive means used for the rectangular regions 4-2 and 4-3.

As will be appreciated from FIGS. 15, 16 and 31, with the structure in which the base substrate 2A, the first substrate 3, the second substrate 4, and the substrate 5A are integrally stacked in this order, an airtight chamber is formed, within which is sealed a vibration space formed by, for example, the concave portion 2-1, the opening 3-17, and the opening 4-1, which are in communication with each other. The vibration mirror 3-3 including the torsion beam 3-2 is located within the airtight chamber.

The base substrate 2A, the first substrate 3, the second substrate 4, and the substrate 5A surround the vibration mirror 3-3, thereby constituting a package member that forms the vibration space for the vibration mirror 3-3.

By applying a voltage varied with time to the first movable electrode 3-4, the second movable electrode 3-5, the first fixed electrode 3-6, the second fixed electrode 3-7, the third fixed electrode 4-4, and the fourth fixed electrode 4-5, an electrostatic force is exerted between the movable electrodes (3-4, 3-5) and the fixed electrodes (3-6, 4-4, 3-7, 4-5), and the vibration mirror 3-3 is vibrated centering on the torsion beam 3-2.

As mentioned above, the basic structure of the optical scanning apparatus 1A, which exerts a driving force for oscillation on a part of the vibration mirror 3-3, includes: the vibration mirror 3-3 having the mirror surface 3-10 that reflects an optical beam; the torsion beam 3-2 supporting the vibration mirror 3-3 such that the torsion beam 3-2 is swingable; and the package member (the base substrate 2A, the first substrate 3, the second substrate 4, and the substrate 5A) surrounding the vibration mirror 3-3, thereby forming the vibration space for the vibration mirror 3-3.

In the above-mentioned embodiment, the substrate 5A is transparent. However, this is not a limitation, and the substrate 5A may be transparent only in the portion that is necessary for allowing an optical beam to be incident on the vibration mirror 3-3.

A further description is given below of the optical scanning apparatus 1A.

The base substrate 2A, the first substrate 3, the second substrate 4 and the substrate 5A, which form the package member, may be bonded to each other by selecting a preferable bonding method suitable for the materials of the substrates from among solder bonding, glass bonding, epoxy adhesive bonding, for example.

In FIG. 16, the first substrate 3 and the second substrate 4 are referred to as a micro mirror 001. In the exemplary embodiment, each of the first substrate 3 and the second substrate 4 is manufactured by using a SOI (Silicon On Insulator) substrate formed by sandwiching an insulating member between two silicon substrates. Also in the exemplary embodiment, the structure of a substrate forming the vibration mirror 3-3, which substrate includes two substrates, i.e., an upper substrate and a lower substrate, and an insulating member between the two substrates, is the same as that of the first substrate 3.

The mirror surface 3-10 is formed on a top surface of the lower substrate. The top surface of the lower substrate is exposed by performing solution processing using an etching technique. The torsion beam 3-2 is formed in the lower mirror substrate 3-1.

As mentioned above, the first fixed electrode 3-6 and the second fixed electrode 3-7 are formed in the first substrate 3, and the third fixed electrode 4-4 and the fourth fixed electrode 4-5 are formed in the second substrate 4. The positions of the first fixed electrode 3-6 and the third fixed electrode 4-4 correspond to the first movable electrode 3-4 of the vibration mirror 3-3, and the positions of the second fixed electrode 3-7 and the fourth fixed electrode 4-5 correspond to the second movable electrode 3-5 of the vibration mirror 3-3.

In the aforementioned manner, by forming the above-mentioned electrodes 3-4, 3-5, 3-6, 3-7, 4-4 and 4-5 into comb-like shapes, it is possible to reduce a driving voltage. In this embodiment, both the first substrate 3 and the second substrate 4 are formed by SOI substrates having low resistances, a metal is not formed, and the first substrate 3 and the second substrate 4 serve as electrodes.

Hence, in the first substrate 3, the insulating grooves (slit grooves) 3-11 and 3-14 are formed therein as means for insulating and separating the first movable electrode 3-4 and the second movable electrode 305 from the first fixed electrode 3-6 and the second fixed electrode 3-7, thereby achieving a function of insulation and separation.

In this embodiment, as mentioned above, the surface of the SOI substrate is used as the mirror surface by performing the etching process on the SOI substrate. As shown in FIG. 16, ribs RB may be provided on the back surface of the vibration mirror 3-3 in parallel with the torsion beam 3-2 so as to maintain rigidity while reducing the weight of the vibration mirror 3-3.

The substrate 5A and the base substrate 2A, which are located respectively on and under the micro mirror 001, serve as the package members that form the vibration space of the micro mirror 001 (more particularly, the vibration mirror 3-3).

The substrate 5A located on the micro mirror 001 and the base substrate 2A located under the micro mirror 001 serve as sealing members that form the vibration space for the micro mirror 001. In the last sealing process that adjusts the final air pressure in the vibration space, the vibration space is sealed by adjusting the air pressure therein while driving the vibration mirror 3-3 so that the characteristics of the vibration mirror 3-3 fall within the predetermined range.

Figure 18:
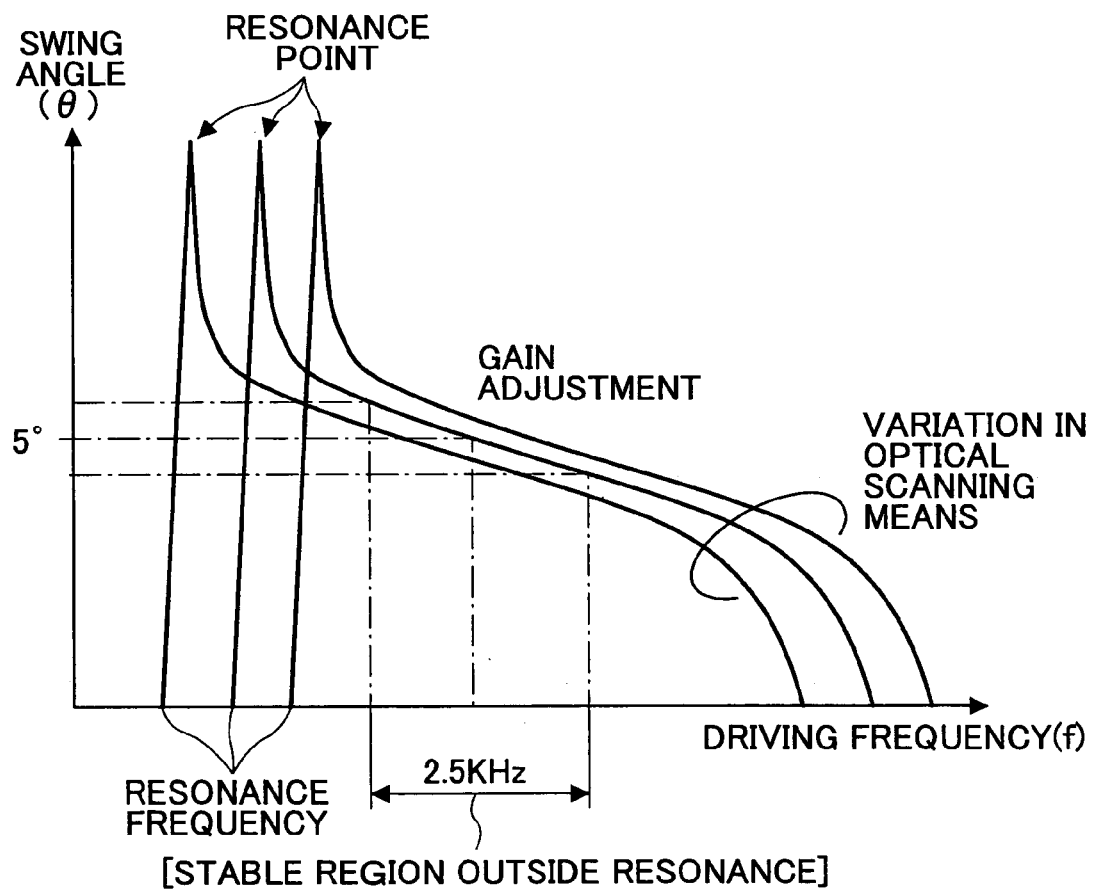
FIG. 18 is a graph showing characteristics of the swing angle of a vibration mirror with respect to the driving frequency.

When adjusting the air pressure in the vibration space and sealing the vibration space, the vibration space may be sealed in a state where a predetermined frequency range is achieved during adjustment of the air pressure with the vibration mirror 3-3 being driven. Additionally, in a structure where a plurality of optical scanning apparatuses are used as optical scanning means, by providing means for adjusting the air pressure in the vibration space for an individual vibration mirror in each of the optical scanning apparatuses, it is possible to further reduce variation in resonance frequency by using a shift in the resonance frequency due to pressure change. Further, it is possible to increase a tolerance range for the driving frequency by using a flat frequency characteristic in which a gain at a resonance point is suppressed, or by using a band outside a resonance peak (stable region outside resonance) as shown in FIG. 18.

Figure 19:
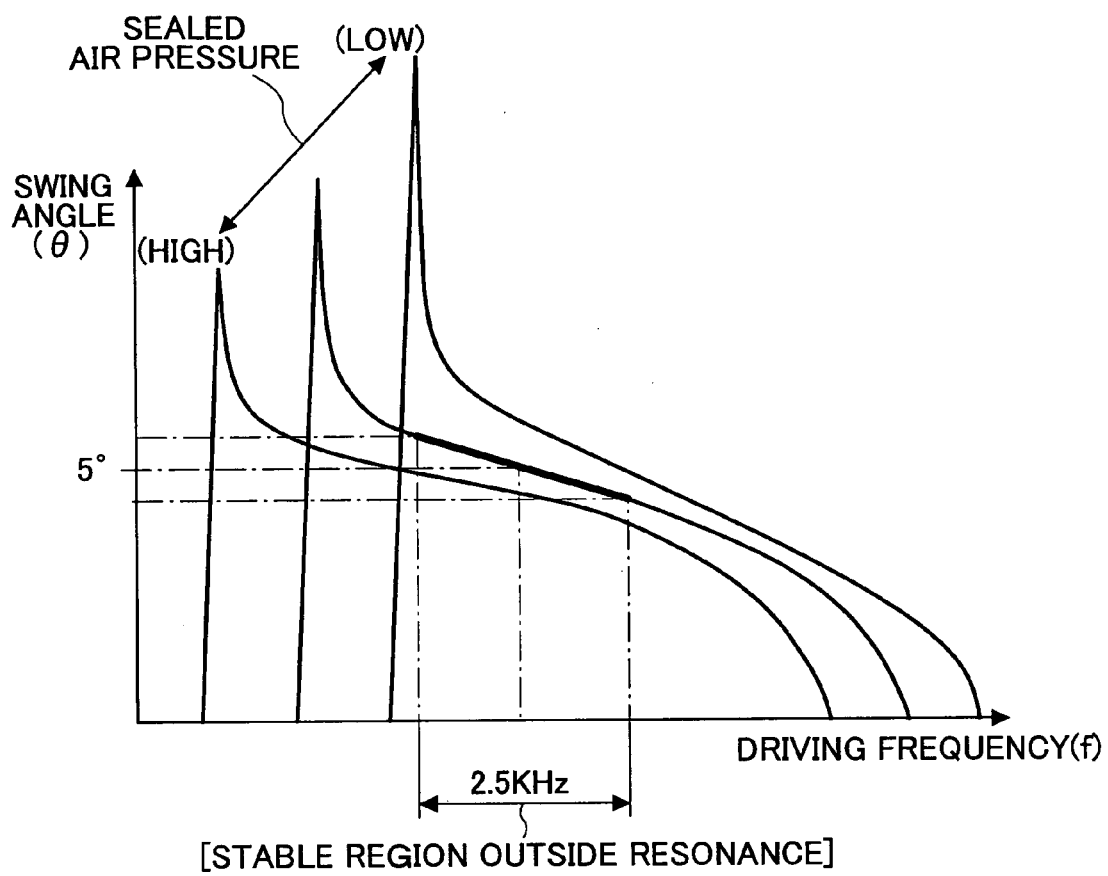
FIG. 19 is a graph illustrating variation in frequency characteristics of the vibration mirror when a sealing air pressure is changed.
Figure 20:
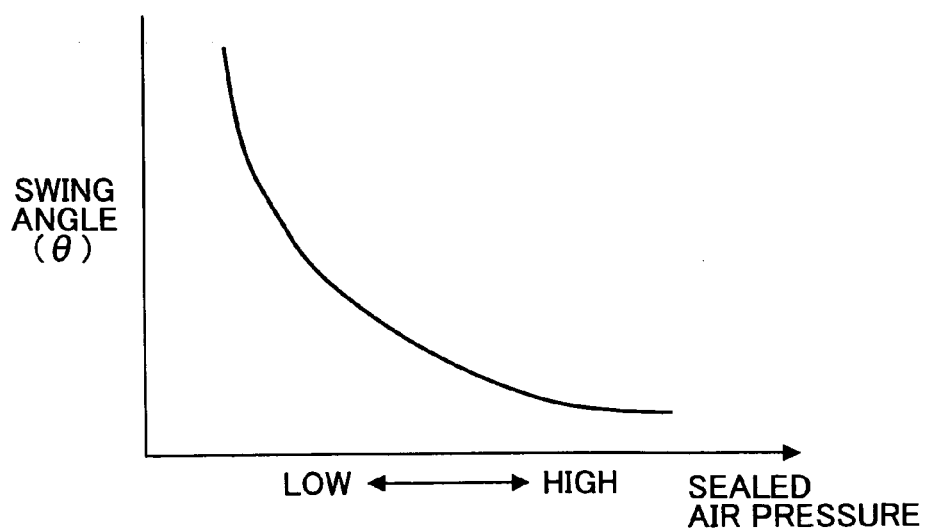
FIG. 20 is a graph showing a relationship between the swing angle of the vibration mirror and the sealed air pressure.

By adjusting the air pressure in a vibration space and sealing the vibration space, it is possible to adjust characteristics (resonance frequency and swing angle, for example) of a vibration mirror such as shown in FIGS. 19 and 20. Thus, it is possible to manufacture different characteristics at the last of the manufacturing process of an optical scanning apparatus. Accordingly, it is possible to manufacture products having different specifications at low costs. Inversely, as for products having the same specifications, it is possible to reduce variation in the characteristics. For this reason, the rate of quality product is increased since those products that are below standard and conventionally rated as defective products can be quality products by performing the air pressure adjustment thereon. In addition, since the vibration space is sealed, resistance against variation in a resonance frequency due to environmental change is obtained. Further, since the adjustment is performed at the last of the manufacturing process of an optical scanning apparatus, the specification of the optical scanning apparatus can be easily matched to designed specifications. Thus, the rate of quality product is increased. Furthermore, in an optical scanning apparatus in which the air pressure is to be set to a rather low value, the effect of viscous resistance of gas is increased. Thus, damping effect generated between the gas and the structure that seals the vibration space for a vibration mirror particularly affects the characteristics of the optical scanning apparatus. In an embodiment of the present invention, however, since adjustment is performed at the time of sealing while monitoring the characteristics, it is easier to obtain an optical scanning apparatus meeting specifications.

In addition to the optical scanning apparatus 1A shown in FIG. 16, the vibration space for the vibration mirror 3-3 may be sealed as in an optical scanning apparatus 1B, which is shown in FIG. 17, having a structure in which the micro mirror 001 is enclosed by a base substrate 2B and an upper cover 50. In the illustrated embodiment, a transparent board 51 is used as a part of the upper cover 50 so that light can be incident on the vibration mirror 3-3 through the upper cover 50 and light reflected by the vibration mirror 3-3 can exit the upper cover 50. In FIG. 17, those parts that are the same as those corresponding parts in FIG. 16 are designated by the same reference numerals, and a description thereof is omitted.

(Eighth Embodiment)

A description is given below of an eighth embodiment of the present invention.

An optical scanning apparatus according to the eighth embodiment of the present invention includes an air pressure adjusting means for adjusting the air pressure in a vibration space. A gas absorbent that can adjust the air pressure in the vibration space such that a desired resonance frequency is obtained may be used as the air pressure adjusting means.

Figure 21:
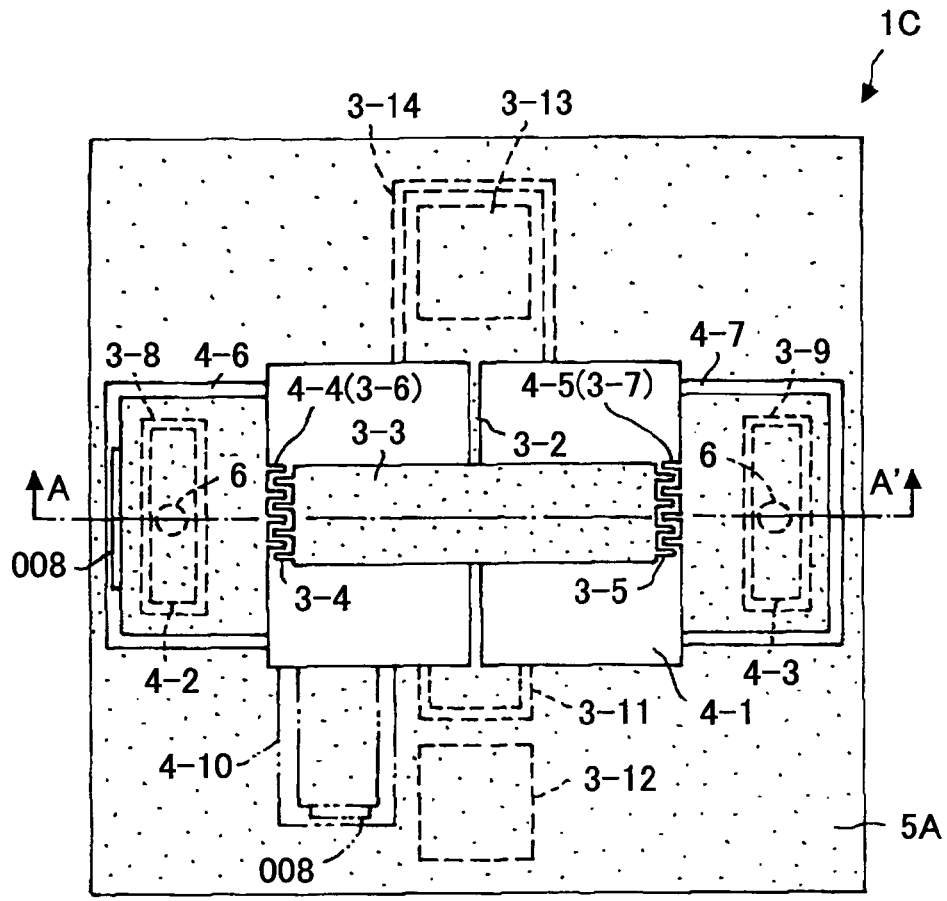
FIG. 21 is a plan view of an optical scanning apparatus.
Figure 22:
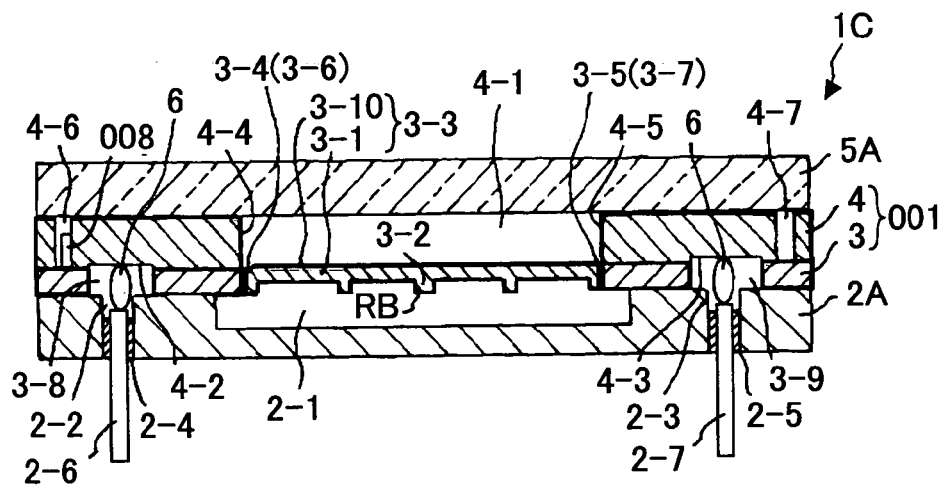
FIG. 22 is a cross-sectional view of the optical scanning apparatus taken along the line A–A' in FIG. 21.
Figure 23:
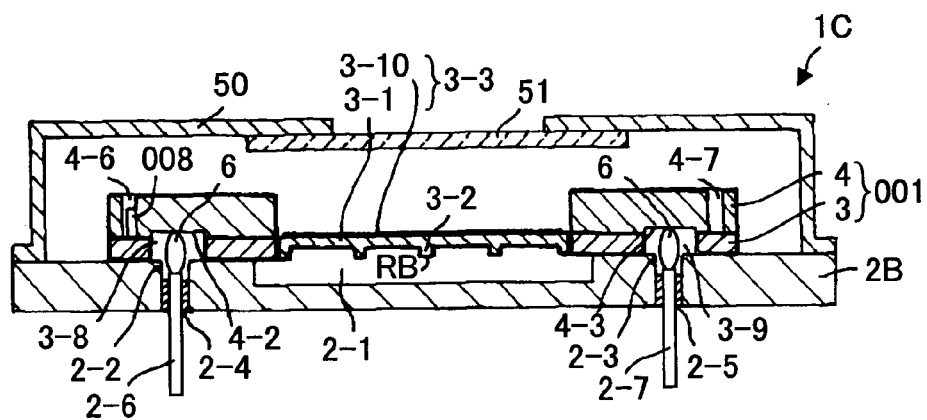
FIG. 23 is a cross-sectional view of another optical scanning apparatus.

FIGS. 21 and 22 show an optical scanning apparatus 1C and FIG. 23 shows an optical scanning apparatus 1D according to the eighth embodiment of the present invention. FIG. 21 is a top plan view of the optical scanning apparatus 1C. FIG. 22 is a cross-sectional view of the optical scanning apparatus 1C taken along the line A–A' in FIG. 21. FIG. 23 is a cross-sectional view of the optical scanning apparatus 1D. The basic structures of the optical scanning apparatuses 1C and 1D are substantially the same as those shown in FIGS. 15–16 and 17, respectively. Thus, in FIGS. 21 through 23, those parts that are the same as those corresponding parts in FIGS. 15 through 17 are designated by the same reference numerals, and a description thereof is omitted.

The eighth embodiment differs from the seventh embodiment in that an air pressure adjusting means for adjusting the air pressure in the vibration space for the vibration mirror 3-3 is provided. In the aforementioned seventh embodiment, the air pressure adjustment of the vibration space (sealed space) for the vibration mirror 3-3 is performed at the last of the manufacturing process of the optical scanning apparatus (1A, 1B). On the other hand, in the eighth embodiment, it is possible to perform the air pressure adjustment at the last of the manufacturing process or after completion of the optical scanning apparatus 1C.

As shown in FIGS. 21 and 22, in the optical scanning apparatus 1C according to this embodiment, the insulating groove (slit groove) 4-6, which communicates with the vibration space for the vibration mirror 3-3 that is formed by the concave portion 2-1 and the opening 4-1, may be used, and a gas absorbent 008 may be deposited in the insulating groove 4-6. When sealing the vibration space for the vibration mirror 3-3 by stacking and bonding, for example, the substrate 5A, the micro mirror 001, and the base substrate 2A to each other, by enclosing at the same time a gas that can be absorbed by the gas absorbent 008, it is possible to perform the air pressure adjustment by activating the gas absorbent 008 by a method such as heating. Moreover, it is possible to adjust the characteristics of the vibration mirror 3-3.

Similarly, in an optical scanning apparatus 1D shown in FIG. 23, by using the insulating groove 4-6, depositing therein the gas absorbent 008, and enclosing the gas that is absorbed by the gas absorbent 008, it is possible to adjust the air pressure in the sealed oscillation space.

As shown in FIG. 19, in an optical scanning apparatus, the frequency characteristics of a vibration mirror are varied by changing the sealed air pressure in the vibration space for the vibration mirror. Hence, according to the eighth embodiment of the present invention, in a case where variation exists in resonance frequencies of a plurality of or a large number of optical scanning apparatuses, it is possible to easily control the resonance frequencies to fall within predetermined ranges with which required swing angles are obtained.

Additionally, the sealed air pressure and the swing angle have characteristics (relationship) as shown in FIG. 20. Thus, by using the characteristics, it is possible to adjust optical scanning apparatuses having variations in their characteristics such that desired swing angles are obtained at an arbitrary driving frequency or a band after the vibration space is sealed. It should be noted that the air pressure adjusting means includes the insulating groove (slit groove) 4-6 or 4-7, the gas absorbent 008, and the enclosed gas, for example.

According to the eighth embodiment, it is possible to perform the air pressure adjustment after completion of the optical scanning apparatus. Hence, it is possible to perform further accurate adjustment. In addition, since it is possible to perform the air pressure adjustment after sealing, it is also possible to adjust variation in the characteristics caused by an outgas remaining in the sealed space that may be generated at the time of sealing, depending on a sealing method.

By adjusting the air pressure in the vibration space, it is possible to absorb or reduce variation in a resonance frequency generated at the time of manufacturing a vibration mirror. In addition, since the vibration space is sealed, resistance against variation in a resonance frequency due to environmental change is obtained. Accordingly, considering the characteristics of the vibration mirror, by aligning the characteristics of resonance frequencies by the air pressure adjustment, it is possible to obtain an optical scanning apparatus that is stable and easy to handle. Further, the swing angle can be adjusted relatively easily by adjusting a driving voltage. On the other hand, when driving by a common driving frequency, adjustment of a resonance frequency requires control by a complex driving system since the span of adjustable range of the driving frequency is extremely narrow. Accordingly, by using the optical scanning apparatus according to the eighth embodiment, it is possible to provide an optical scanning apparatus that is stable and easy to be controlled.

FIGS. 21 through 23 show the case where means for absorbing the gas in the vibration space, i.e., the gas absorbent 008, is used as the air pressure adjusting means. It is possible to achieve the method of absorbing the gas in the vibration space by depositing the gas absorbent 008 in the vibration space, and, fundamentally, the gas absorbent 008 may be activated merely by heating. Thus, it is possible to easily adjust (for example, reduce) the air pressure in the vibration space, and it is possible to reduce variation in the characteristics of the vibration mirror by setting in advance the air pressure in the vibration space to a rather high value. Additionally, by using an absorbent such as the gas absorbent 008, it is also possible to adjust variation in the characteristics caused by an outgas remaining in the sealed space that may be generated at the time of sealing, depending on a sealing method.

According to the eighth embodiment of the present invention, since it is possible to adjust the air pressure in the vibration space after the vibration space is sealed, it is possible to adjust the air pressure therein while actually using the vibration mirror. In the illustrated embodiment, the gas absorbent 008 is deposited in the insulating groove 4-6, which is the slit groove. This is not a limitation, and essentially, the gas absorbent 008 may be deposited in an arbitrary place, provided that the place communicates with the vibration space. However, it should be noted that there are some cases where it is preferable to deposit the gas absorbent 008 at a location close to an outer surface of the vibration mirror for convenience in terms of heating.

In a case where the gas absorbent 008 is made of a metal, depositing the gas absorbent 008 in the insulating groove 4-6, which is the slit groove, may cause a malfunction whereby an electrical short occurs between electrodes. Thus, in such case an additional slit groove is preferably formed at a location where an electrical short will not occur (the same applies to the case of a gas release agent 009 shown in FIG. 24 and 25, which is described later).

As illustrated in FIG. 21, a slit groove 4-10 dedicated for depositing a gas absorbent therein is formed in the second substrate 4. The slit groove 4-10 has a U-shape and communicates with the opening 4-1.

The gas absorbent 008 (in this case, the gas absorbent 008 is made of a metal) is deposited in the slit groove 4-10. Of course, in this case, the gas absorbent 008 (made of the metal) is not deposited in the insulating groove 4-6.

In an embodiment shown in FIGS. 24 and 25, which is described later, an additional slit groove as mentioned above is not shown. However, when using an agent made of a metal, according to the above-mentioned case, slit grooves dedicated for respectively depositing therein the gas absorbent 008 and the gas release agent 009 may be provided in the second substrate 4, and the gas absorbent 008 and the gas release agent 009 may be deposited in the corresponding slit grooves.

It is possible to form the slit groove 4-10, which is dedicated for depositing the gas release agent 009 therein, in a manner similar to that of the insulating groove 4-6 and simultaneously with the insulating groove 4-6, which is advantageous in that manufacturing costs are not increased.

A description is given below of variation in a resonance frequency.

Variation in a resonance frequency of a vibration mirror can be classified into: individual variation due to variation in the shape of a vibration mirror introduced during the manufacturing process thereof; variation due to variation in environmental temperature and/or humidity; and variation due to variation in the atmosphere pressure in the case where the vibration mirror is used in the atmosphere. When a great variation exists in the resonance frequency, there is a problem in that it is difficult or impossible to drive a plurality of vibration mirrors with a common driving frequency (since the span of adjustable range is narrow).

Figure 26:
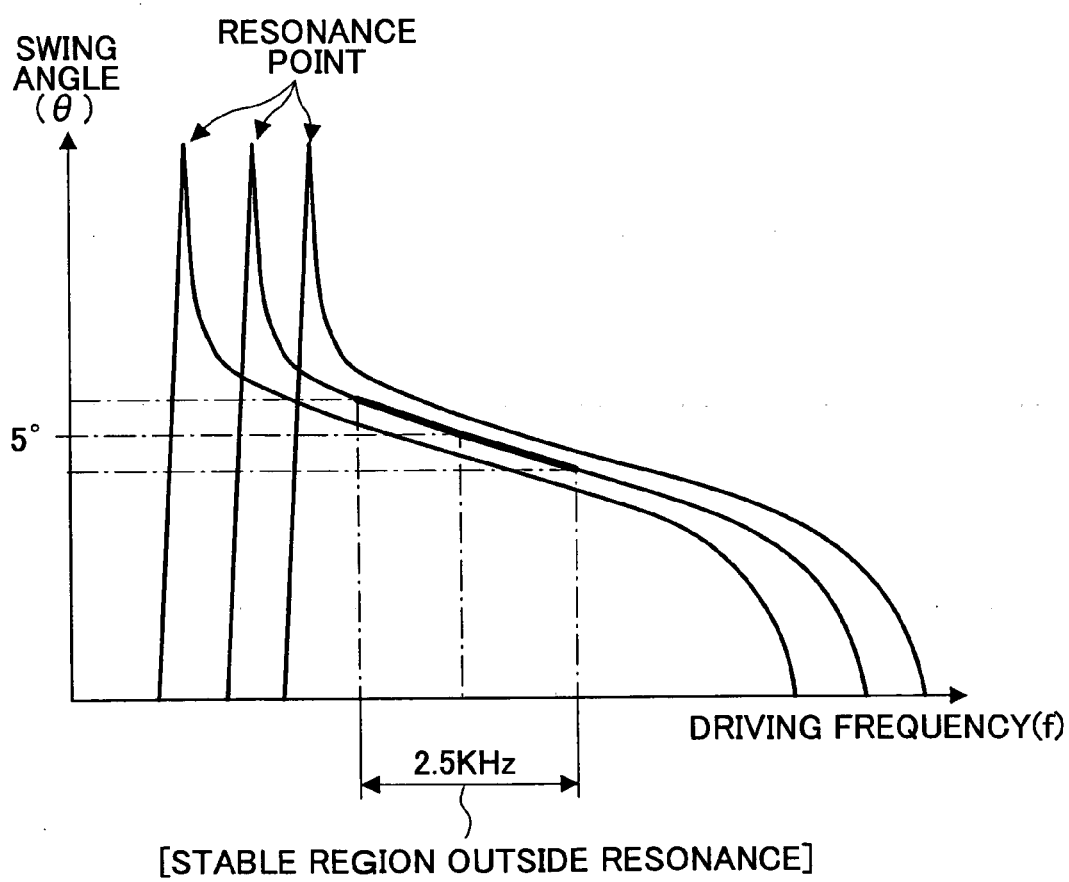
FIG. 26 is a graph showing difference in the resonance frequencies of vibration mirrors.
Figure 27:
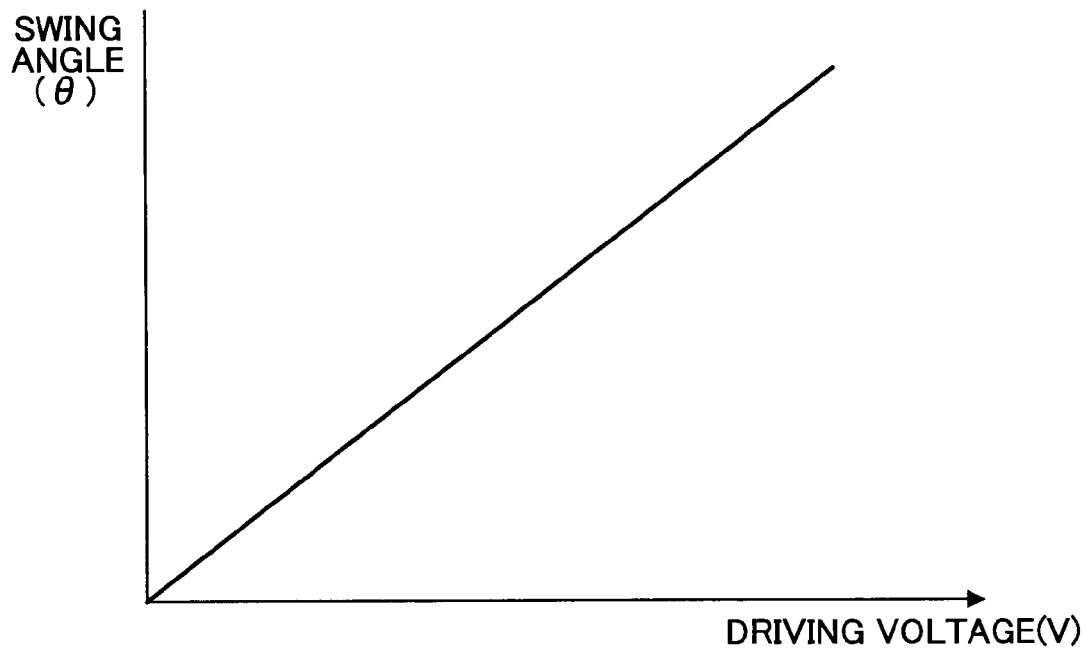
FIG. 27 is a graph showing a relationship between driving voltage and swing angle of a vibration mirror.

There is a problem in that, in a case where the sealed air pressure is adjusted so as to align resonance frequencies, the swing angles of the vibration mirrors are also varied. However, as will be appreciated by comparing the f-θ characteristic shown in FIG. 26 and the relationship (V-θ characteristic) between the driving voltage and the swing angle shown in FIG. 27, it is much more easy to adjust the swing angle with the driving voltage. As will be appreciated from the V-θ characteristic shown in FIG. 27, in a normal usage region, a substantially proportional relationship is established between the driving voltage and the swing angle. Thus, it is possible to easily adjust the swing angle without using a complex feedback circuit.

Alternatively, by setting the driving voltage to a high value, i.e., making the initial swing angle large, from the beginning and using a swing angle equal to or smaller than the initial swing angle for scanning, it may not be necessary to adjust the driving voltage.

Accordingly, among the characteristics of the vibration mirror, by aligning the resonance frequencies by adjusting the air pressures in the sealed oscillation spaces for the vibration mirrors, it is possible to easily adjust the swing angles.

By adjusting the air pressure in the vibration space, it is possible to absorb or reduce variation in the resonance frequency generated during the manufacturing process of the vibration mirror. In addition, since the vibration space is sealed, resistance against variation in the resonance frequency due to environmental change is obtained. Accordingly, it is possible to realize an optical scanning apparatus that is stable, easy to handle, and easy to control.

It should be noted that air pressure in the vibration space for the vibration mirror is adjusted, for example, by sealing the vibration space at the time when the characteristics of the vibration mirror falls within a permissible range while adjusting the air pressure therein, or by using the air pressure adjusting means.

In another embodiment of the present invention, the air pressure may be adjusted by discharging a gas into the vibration space. That is, instead of using a gas absorbent, a gas release agent that discharges a gas is used. A method of discharging a gas into the vibration space can be achieved by depositing a gas release agent in the vibration space, and fundamentally, the gas release agent is activated merely by heating. Thus, it is possible to easily adjust (for example, increase) the air pressure in the vibration space. In addition, by setting in advance the air pressure in the vibration space to a somewhat low value, it is possible to reduce variation in the characteristics of the vibration mirror.

(Ninth Embodiment)

A description is given below of a ninth embodiment of the present invention.

In an optical scanning apparatus according to this embodiment, a plurality of kinds of gases mixed and introduced into the vibration space of the vibration mirror serve as the air pressure adjusting means.

Figure 28:
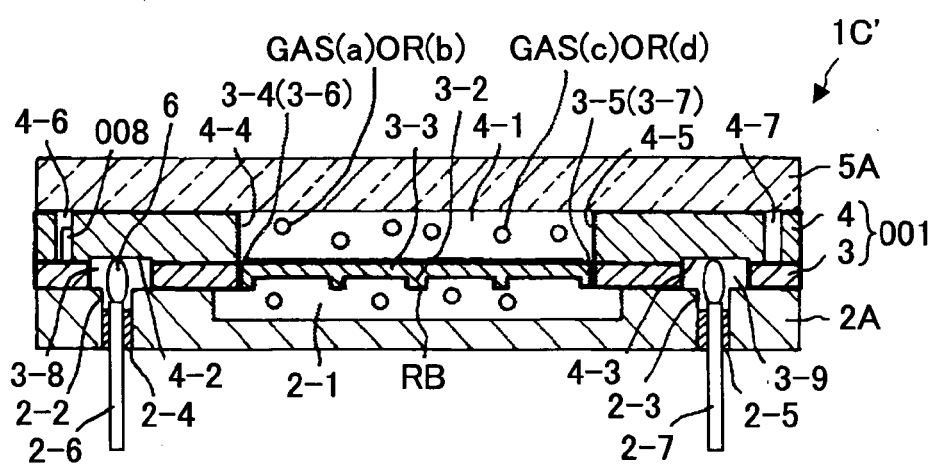
FIG. 28 is a cross-sectional view of an optical scanning apparatus.

In FIG. 28, the mechanical structure of an optical scanning apparatus 1C' is the same as that of the optical scanning apparatus 1C shown in FIG. 22. In this embodiment, the insulating groove 4-6 is used and the gas absorbent 008 is deposited therein as the air pressure adjusting means. A plurality of kinds of gases are mixed and introduced into the vibration space of the vibration mirror 3-3.

Upon adjustment of the air pressure, it is difficult to adjust the air pressure to a specific pressure with a single gas. When a plurality of kinds of gases are mixed and used, it is possible to finely adjust the air pressure in the vibration space of the vibration mirror 3-3 by using, for example, a method in which the gases are divided into the main gas (a) and the gas for air pressure adjustment (b), wherein a plurality of gases (c) and (d) having different masses are used as the gas for air pressure adjustment. Thus, it is possible to further reduce variation in the characteristics of the vibration mirror.

Figure 24:
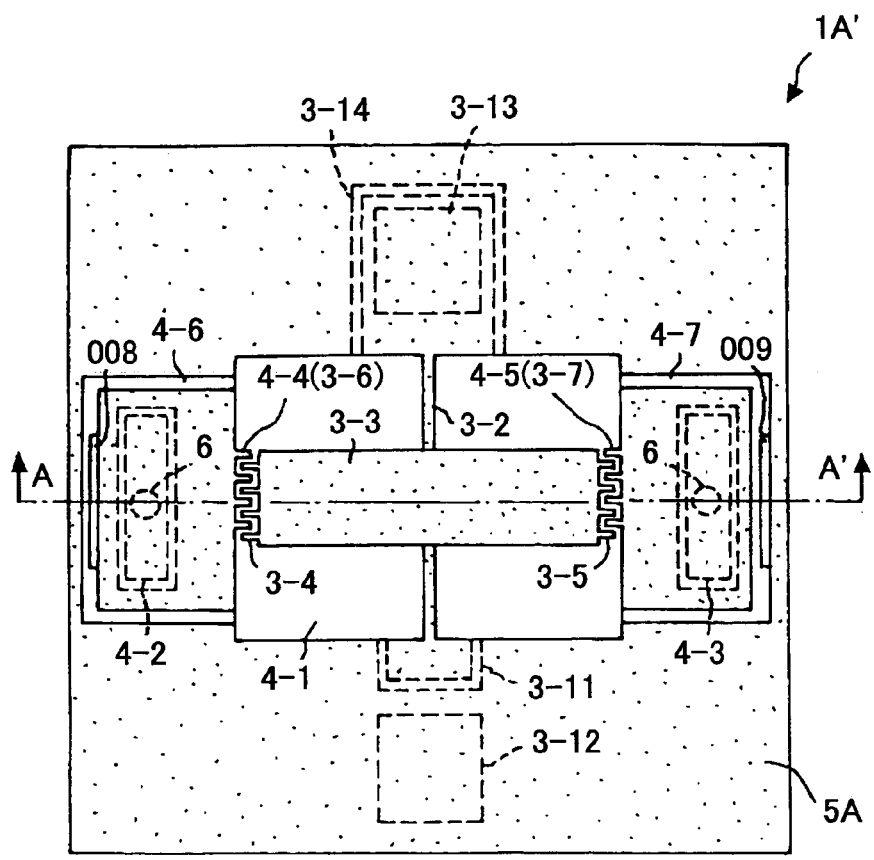
FIG. 24 is a plan view of an optical scanning apparatus.
Figure 25:
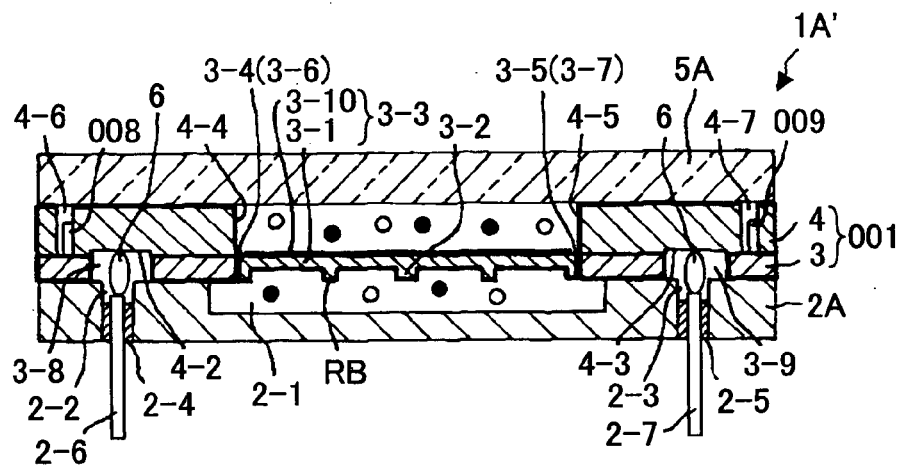
FIG. 25 is a cross-sectional view of the optical scanning apparatus taken along the line A–A' in FIG. 24.

FIGS. 24 and 25 show an optical scanning apparatus 1A' having a plurality of kinds of air pressure adjusting means. In FIGS. 24 and 25, the mechanical structure of the optical scanning apparatus 1A' is the same as that of the optical scanning apparatus 1A shown in FIGS. 15 and 16.

In the illustrated embodiment, a case is shown where the gas absorbent 008 is used in combination with the gas release agent 009 as the plurality of kinds of air pressure adjusting means. The gas absorbent 008 is deposited in the insulating groove 4-6, and the gas release agent 009 is deposited in the insulating groove 4-7. By depositing the gas absorbent 008 and the gas release agent 009 in different places, it is possible to quickly and stably adjust the air pressure.

In the case where a gas absorbent and a gas release agent, which act on the air pressure in the opposite manners (in increasing and decreasing manners), are used at the same time as mentioned above, flexibility in adjustment is high: for example, it is possible to adjust the air pressure in the vibration space in two ways (increase and decrease the air pressure); the span of adjustable range for the air adjustment of the vibration space may be increased; and it is also possible to perform fine adjustment. Thus, it is possible to further reduce variation in the characteristics of a vibration mirror.

It should be noted that, in a case where a plurality of kinds of gases that act on the air pressure in the same direction are used, it is possible to increase the adjustable range.

In cases where the gas absorbent 008 and the gas release agent 009 are used at the same time as the plurality of kinds of air pressure adjusting means, and where the gas absorbent 008 and the gas release agent 009 have different activation temperatures, it is possible to coarsely and finely adjust the air pressure in the vibration space merely by varying the temperature. Thus, it is possible to further reduce variation in the characteristics of a vibration mirror.

In cases where the gas absorbent 008 and the gas release agent 009 are used at the same time as the plurality of kinds of air pressure adjusting means, and where the gas absorbent 008 and the gas release agent 009 are activated in different methods such as laser heating and resistance heating, it is possible to perform local activation and to perform coarse adjustment and fine adjustment of the air pressure in the vibration space. Thus, it is possible to further reduce variation in the characteristics of a vibration mirror.

By depositing the gas absorbent 008 and the gas release agent 009 in different places, for example, by depositing the gas absorbent 008 in the insulating groove 4-6 and the gas release agent 009 in the insulating groove 4-7 as mentioned above, that is, by depositing the gas absorbent 008 and the gas release agent 009 in a divided manner, and by activating the gas absorbent 008 and the gas release agent 009 by means of local heating, it is possible to perform coarse adjustment and fine adjustment of the air pressure in the vibration space. Thus, it is possible to further reduce variation in the characteristics of a vibration mirror. In addition, it is easy to perform adjustment since reaction further than desired is prevented during activation by heating or the like.

Generally, absorbents for gases include inorganic absorbents (zeolite, silica gel, and porous glass, for example), organic absorbents (activated carbon and absorbent resin, for example), and catalytic metals, for example. Here, in order to adjust the air pressure by absorbing molecules of a gas (gases), an absorbent for selectively developing chemical absorption, which is an irreversible reaction, should be selected. FIG. 29 is a table showing chemical absorption characteristics of various metals with respect to a plurality of gases. It is possible to develop chemical absorption by, for example, forming an oxide or a carbide (which serves as a stopper layer against chemical reaction) on a surface of one of the metals, and heating the metal so that the oxide or carbide thereon is diffused into the metal, thereby exposing and activating the surface of the metal. In addition to those metals listed in the table shown in FIG. 29, a "sintered material" such as Zr—V—Fe may be used. The sintered material may be used since it is possible to manufacture the sintered material to be porous and thus a large specific surface area is obtained.

When providing a gas release agent, a method of using physical absorption, which is a reversible reaction, may be used. For example, a gas release agent may be provided by preparing an activated carbon that is caused to physically absorb nitrogen at low temperature, and heating the activated carbon later so as to stop or reduce physical absorption.

In cases where a gas absorbent is used, for example, as shown in the table of FIG. 29, since some materials have the property of high abosorptivity and others do not, using a plurality of gases makes it possible to perform adjustment.

In an embodiment of the present invention, a tolerable range for variation in the driving frequency may be increased. In fθ characteristic shown in FIG. 26, by using a flat band that is outside the resonance peaks, i.e., "stable region outside resonance", it is possible to increase the tolerable range for variation in the driving frequency. The wider the stable region outside resonance is, the better. In order to expand the stable region outside resonance, the gain at a resonance point should be suppressed. Thereby, a flat frequency characteristic having an expanded stable region outside resonance is obtained.

(Tenth Embodiment)

A description is given below of a tenth embodiment of the present invention. Hereinafter, a description is given of the structure of a laser printer as an example of an image forming apparatus that includes: optical scanning means including an optical scanning apparatus (vibration mirror module) having the above-mentioned structure and an optical system such as a lens for scanning; a photo conductor on which an electrostatic image is formed, the photo conductor mounting the optical scanning means; developing means for developing the electrostatic image by toner; and transfer means for transferring the developed toner image on a sheet medium.

Figure 30:
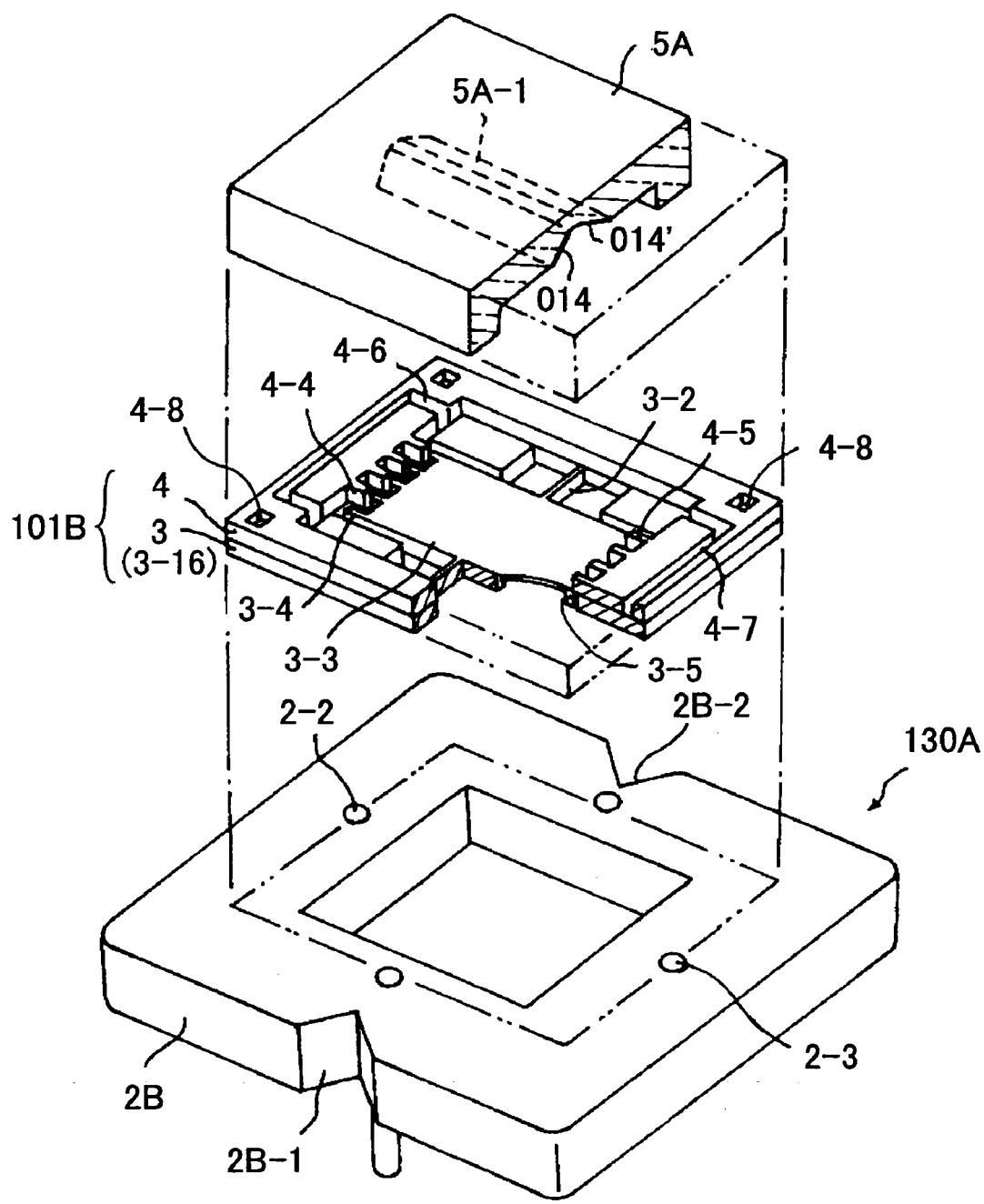
FIG. 30 is an exploded perspective view of an optical scanning apparatus.

FIG. 30 shows, among the optical scanning apparatuses of the embodiments described above, an optical scanning apparatus constructed by combining: the first substrate 3; the second substrate 4; the substrate 5A, which is described with reference to FIG. 16 and serves as an upper substrate that forms a package member; and the base substrate 2A, which is shown in FIG. 16 and serves as a base substrate that forms the package member. Here, the optical scanning apparatus is explained as a vibration mirror module 130A. The details of the structure are common with those described above except for the combination of the members.

In FIG. 30, the substrate constituting a vibration mirror is formed by bonding the first substrate 3, which is formed by two Si substrates, and the second substrate 4 via an insulating film such as an oxide film. The first substrate 3 is formed by the Si substrate having the thickness of 60 μm. The vibration mirror 3-3, which serves as a movable mirror, and the torsion beam 3-2, which supports the vibration mirror 3-3 while serving as an axis on the same line, are formed in the first substrate 3 by etching. In other words, the vibration mirror 3-3 and the torsion beam 3-2 are formed by cutting off the surrounding portion thereof in the first substrate 3 such that portions corresponding to the vibration mirror 3-3 and the torsion beam 3-2 remain therein. Hereinafter, the portion of the first substrate 3 other than the vibration mirror 3-3 and the torsion beam 3-2 is referred to as a fixed frame 3-16.

The vibration mirror 3-3 is formed symmetrically with respect to the torsion beam 3-2, comb-like concavity and convexity (the movable electrodes 3-4 and 3-5) are formed on both edges of the vibration mirror 3-3, and the first fixed electrode 3-6 and the second fixed electrode 3-7, which are comb-like concavity and convexity having a gap of several micrometers, are formed in the inner edges of the fixed frame 3-16 so as to engage with the movable electrodes 3-4 and 3-5.

There are several methods for forming a reflection surface formed on a surface of the vibration mirror 3-3. Here, the reflection surface is formed by depositing a metal film of, for example, Au, and the substrates (the first substrate 3 and the second substrate 4) per se are individually formed as electrodes by separating the substrates into islands while being bonded via the insulating layer as shown in FIGS. 30 and 31.

In FIGS. 30 and 31, the concavity and convexity on both edges of the vibration mirror 3-3 form the first movable electrode 3-4 and the second movable electrode 3-5 (having the same potential though being separated for convenience of explanation), and the concavity and convexity of the fixed frame 3-16 opposing to the first movable electrode 3-4 and the second movable electrode 3-5 respectively form the first fixed electrode 3-6 and the second fixed electrode 3-7.

Figure 32:
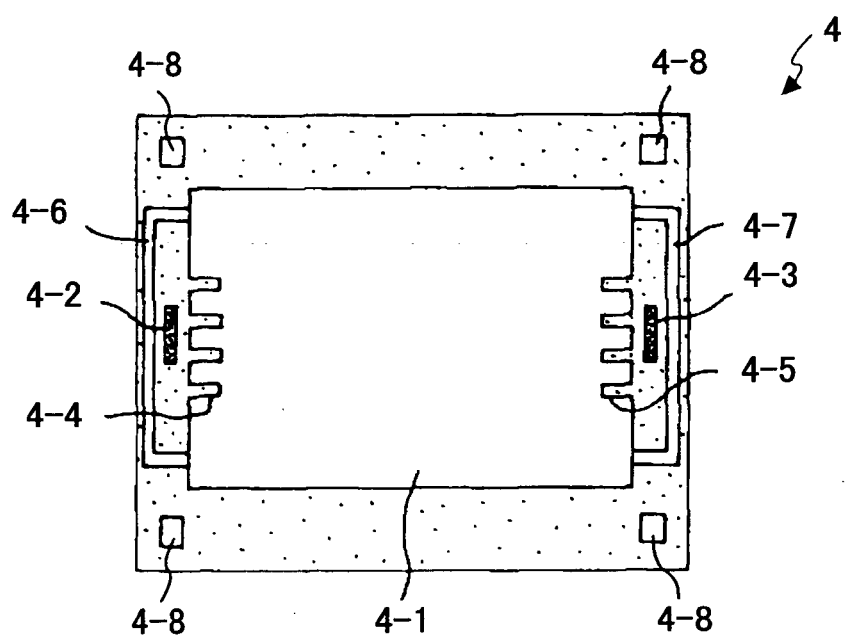
FIG. 32 is a plan view of a second substrate.

In FIGS. 30 and 32, the second substrate 4 is formed by a Si substrate having the thickness of 140 μm. The center portion of the second substrate 4 is hollowed such that a predetermined shape is formed in the hollowed portion. In other words, comb-like concavity and convexity are formed on the inner edges of the hollowed portion, which inner edges overlap with the concavity and convexity formed in the fixed frame 3-16, such that the outer shape of the comb-like concavity and convexity formed on the inner edges of the hollowed portion match that of the concavity and convexity formed in the fixed frame 3-16. Similarly to the first fixed electrode 3-6 and the second fixed electrode 3-7, the concavity and convexity formed on the inner edges of the hollowed portion serve as the third fixed electrode 4-4 and the fourth fixed electrode 4-5. Along with oscillation of the vibration mirror 3-3, the first movable electrode 3-4 and the second movable electrode 3-5 pass through the third fixed electrode 4-4 and the fourth fixed electrode 4-5 in an engaging manner.

In this embodiment, voltage pulses having the same phase are applied to the first fixed electrode 3-6 and the second fixed electrode 3-7. A voltage pulse having the phase ahead of the voltage pulse applied to the first fixed electrode 3-6 and the second fixed electrode 3-7. On the other hand, a voltage pulse having a phase delayed from the voltage pulse applied to the first fixed electrode 3-6 and the second fixed electrode 3-7 is applied to the fourth electrode 4-5.

Figure 33:
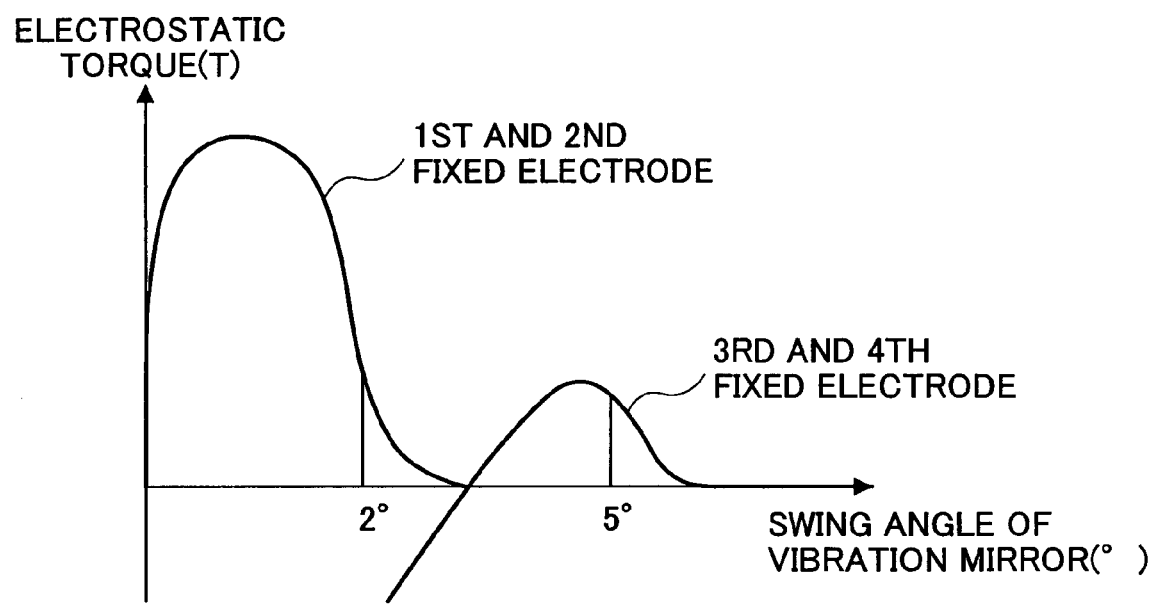
FIG. 33 is a graph showing a relationship between the swing angle of a vibration mirror and electrostatic torque of each fixed electrode.
Figure 34:
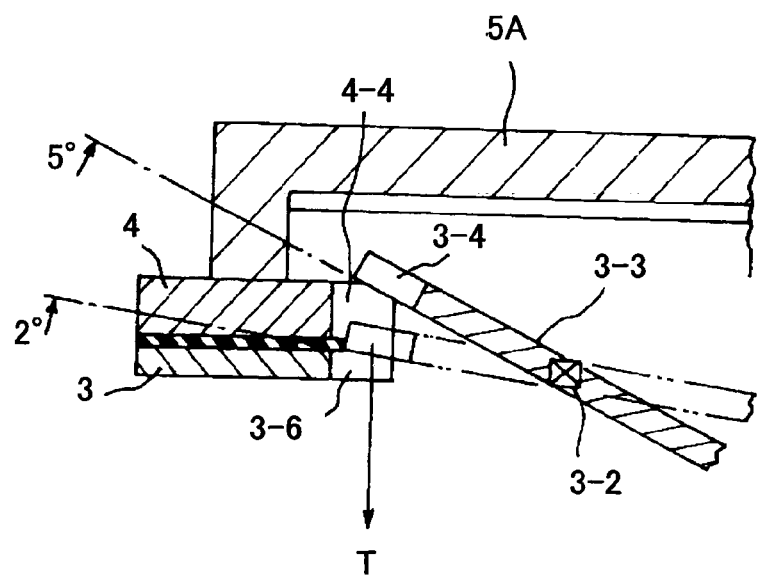
FIG. 34 is a partial cross-sectional view of an electrode portion.

FIG. 33 shows electrostatic torque generated between the electrodes in accordance with the swing angle of the vibration mirror 3-3. FIG. 34 shows a partial cross-sectional view of the vibration mirror module 130A. In this embodiment, electrostatic torque T exerted counterclockwise, i.e., in the direction indicated by an arrow in FIG. 34 (hereinafter referred to as "the positive direction"), is assumed to be positive.

① In an initial state, the vibration mirror 3-3 is horizontal. When a voltage is applied to the third fixed electrode 4-4, an electrostatic force is generated between the third fixed electrode 4-4 and the opposing first movable electrode 3-4 in the negative direction (the direction opposite to the direction indicated by the arrow in FIG. 34). Consequently, the vibration mirror 3-3 is rotated while twisting the torsion beam 3-2 until the swing angle is reached that balances with the restoring force of the torsion beam 3-2.

② When application of the voltage to the third fixed electrode 4-4 is cancelled, the vibration mirror 3-3 is rotated in the positive direction to be horizontal by the restoring force of the torsion beam 3-2. By applying a voltage to the first fixed electrode 3-6 and the second fixed electrode 3-7 immediately before the vibration mirror 3-3 returns to be horizontal, an electrostatic force in the positive direction is generated, and the vibration mirror 3-3 becomes horizontal.

③ By successively applying a voltage to the fourth fixed electrode 4-5 (see FIG. 30), the electrostatic torque T in the positive direction is increased. Consequently, the vibration mirror 3-3 is rotated while twisting the torsion beam 3-2 until the swing angle is reached that balances with the restoring force of the torsion beam 3-2.

④ When application of the voltage to the fourth fixed electrode 4-5 is cancelled, the vibration mirror 3-3 is rotated to be horizontal by the restoring force of the torsion beam 3-2. By applying a voltage to the first fixed electrode 3-6 and the second fixed electrode 3-7 immediately before the vibration mirror 3-3 becomes horizontal, an electrostatic force is exerted in the negative direction, and the vibration mirror 3-3 becomes horizontal.

⑤ When a voltage is applied to the third fixed electrode 4-4, an electrostatic force in the negative direction is generated between the third fixed electrode 4-4 and the first movable electrode 3-4. Consequently, the vibration mirror 3-3 is rotated while twisting the torsion beam 3-2.

As mentioned above, by switching the electrodes in a repeated manner, the vibration mirror 3-3 is caused to perform a reciprocating operation such that the vibration mirror 3-3 is swung at the swing angle (for example, approximately 2° in this embodiment) that allows the first movable electrode 3-4 and the second movable electrode 3-5 to pass through the respectively opposing first fixed electrode 3-6 and second fixed electrode 3-7.

By designing the moment of inertia of the vibration mirror 3-3 and the width and length of the torsion beam 3-2 such that a desired driving frequency used in scanning falls within the band of a primary resonance mode using the torsion beam 3-2 as the rotational axis, the vibration mirror 3-3 is excited and the amplitude is significantly increased. In the afore mentioned manner, it is possible to increase the swing angle of the vibration mirror 3-3 to such an angle at which the first movable electrode 3-4 and the second movable electrode 3-5, which are on both edges of the vibration mirror 3-3, pass through the respectively opposing third fixed electrode 4-4 and the fourth fixed electrode 4-5.

Hence, even if the vibration mirror 3-3 is rotated to pass through the third fixed electrode 4-4 and the fourth fixed electrode 4-5, an electrostatic force is generated in a direction in which the vibration mirror 3-3 is rotated to be horizontal, i.e., in this case, such that the third fixed electrode 4-4 draws the first movable electrode 3-4. In other words, an electrostatic force in the positive direction is exerted on the vibration mirror 3-3. Hence, it is possible to increase the range for swing angle in which the electrostatic torque is exerted, and to maintain a great swing angle even at a driving frequency outside a resonance frequency.

FIG. 18 shows the characteristics of the swing angle with respect to the driving frequency. Referring to FIG. 19, the greatest swing angle is achieved when the driving frequency is matched to the resonance frequency. However, the swing angle has a characteristic that the swing angle varies sharply in the vicinity of the resonance frequency.

Accordingly, there is a disadvantage in that, though it is possible to initially set the driving frequency applied to the fixed electrode by the driving controller of the vibration mirror 3-3 to match the resonance frequency, when the resonance frequency is varied because of temperature change etc., the swing angle is significantly reduced, which results in poor stability.

In addition, there is a problem in that, when a plurality of vibration mirrors are used as in the embodiments described later, it is difficult or impossible to drive the vibration mirrors with a common driving frequency, since the resonance frequency peculiar to each of the vibration mirrors may be varied.

Therefore, in this embodiment, the driving frequency is set in a frequency band that is in the vicinity of the resonance frequency peculiar to a vibration part, which is formed by the vibration mirror 3-3 and the torsion beam 3-2, and that is higher than the resonance frequency where variation in the swing angle is relatively small. For example, the driving frequency may be set to 2.5 kHz with respect to the resonance frequency of 2 kHz, and the swing angle may be set to ±5° by adjusting the gain of an application voltage.

Upon setting of the driving frequency, it is preferable to set the driving frequency in a frequency band (for example, 2.303 Hz or more, or 1.697 or less, where the resonance frequency is 2 kHz) where the driving frequency is not affected even if there is variation in the resonance frequency due to error made during processing of the vibration mirror 3-3 (in this embodiment, 300 Hz) and variation in the resonance frequency because of temperature change (in this embodiment, 3 Hz).

Assuming the size of the vibration mirror 3-3 as: vertical length=$2a$, horizontal length=$2b$, thickness=$d$, length of torsion beam 3-2=$L$, and width=$c$, by using the density $\rho$ and material constant G of Si, moment of inertia I and spring constant K are represented as follows.

$$I = (4ab\rho d/3) \cdot a^2$$

$$K = (G/2L) \cdot \{cd(c^2 + d^2)/12\}$$

The resonance frequency f is represented as follows.

$$f = (1/2\pi) \cdot (K/I)^{1/2}$$
$$= (1/2\pi) \cdot \{Gcd(c^2 + d^2)/24LI\}^{1/2}$$

Since the swing angle θ and the length L of the torsion beam 3-2 is a proportionality relationship, the swing angle θ is represented as follows.

$$\theta = A/If^2 \quad (A: \text{constant})$$

The swing angle θ is in inverse proportion to the moment of inertia I. In order to increase the resonance frequency f, the moment of inertia I must be decreased. Otherwise, the swing angle θ is reduced.

Hence, in this embodiment, the moment of inertia I is reduced to approximately ⅕ by etching the surface of vibration mirror 3-3 that is opposite to the reflection surface such that the portion having the thickness d is left in a grid pattern, and those portions other than the grid pattern portion have the thickness of d/10 or less.

The parameters affecting the moment of inertia I, and errors in the size of the torsion beam 3-2, for example, cause variation in the resonance frequency.

On the other hand, electrostatic force F between the electrodes is represented as:

$$F = \in HV^2/2\delta$$

where ∈ is dielectric constant of air, the length of electrode is H, application voltage is V, and the distance between the electrodes is δ. The swing angle θ may be represented as follows.

$$\theta = B \cdot F/I \quad (B: \text{constant})$$

The longer the length of the electrode is, the greater the swing angle θ becomes. By forming the electrodes into the comb-like shapes, the driving torque 2n times the original torque is obtained, where "n" represents the number of teeth of the electrode. In the aforementioned manner, the length of the outer peripheral of each electrode is made as long as possible so as to increase the length of the electrode, so that a great electrostatic torque is obtained with a low voltage.

Viscous resistance P of air is represented as:

$$P = C \cdot \eta v^2 \cdot E^3 \quad (C: \text{constant})$$

where σ is the speed of the vibration mirror 3-3, E is the area of the vibration mirror 3-3, and η is the intensity of air. The viscous resistance P of air acts against rotation of the vibration mirror 3-3.

In this embodiment, the vibration mirror substrate (micro mirror 101B) (FIG. 30) constructed by joining the first substrate 3 and the second substrate 4 together is mounted on the base substrate 2B having lead terminals and the concave oscillation space for the vibration mirror 3-3, such that the reflection surface of the vibration mirror 3-3 faces up and the torsion beam 3-2 is arranged along the line connecting a pair of V-grooves 2B-1 and 2B-2 formed on outer edges of the base substrate 2B. The substrate 5A, which is a cover formed into a cap like shape, is joined to the upper surface of the second substrate 4, thereby sealing the vibration space for the vibration mirror 3-3. An inert gas is introduced into the vibration space so as to hermetically seal the vibration space. Considering the driving voltage, for example, the air pressure is suitably adjusted within the range of approximately 0.1–10 torr. An optical beam enters and exits the cover (substrate 5A) via a slit window 5A-1 formed therein.

Referring to FIG. 30, a first opposing mirror 014 and a second opposing mirror 014', which are disposed oppose to the vibration mirror 3-3, are formed, for example integrally, with the substrate 5A in the inner side thereof along the direction perpendicular to the torsion beam 3-2. The first opposing mirror 014 and the second opposing mirror 014' are formed by depositing a metal film on inclined surfaces that are inclined at 9° and 26.3° with respect to a substrate surface so that the inclined surfaces form the angle of 144.7° while interposing the slit window 5A-1 therebetween and serve as a pair of reflection surfaces. The above-mentioned metal film is not deposited on the slit window 5A-1. Hence, it is possible for an optical beam to pass through the slit window 5A-1.

The bottom surface of the substrate 5A is formed to be parallel to the mirror surface, which is the top surface, of the vibration mirror 3-3. The bottom surface of the substrate 5A abuts and is joined to the top surface of the frame portion of the second substrate 4. Indexes 4-8 for positioning the first opposing mirror 014 and the second opposing mirror 014' are formed on corners of the second substrate 4 by etching. The substrate 5A is positioned on the second substrate 4 such that the edges of the first opposing mirror 014 and the second opposing mirror 014' match the indexes 4-8. Hence, it is possible to correctly arrange the first opposing mirror 014 and the second opposing mirror 014' in the main scanning direction.

Figure 35:
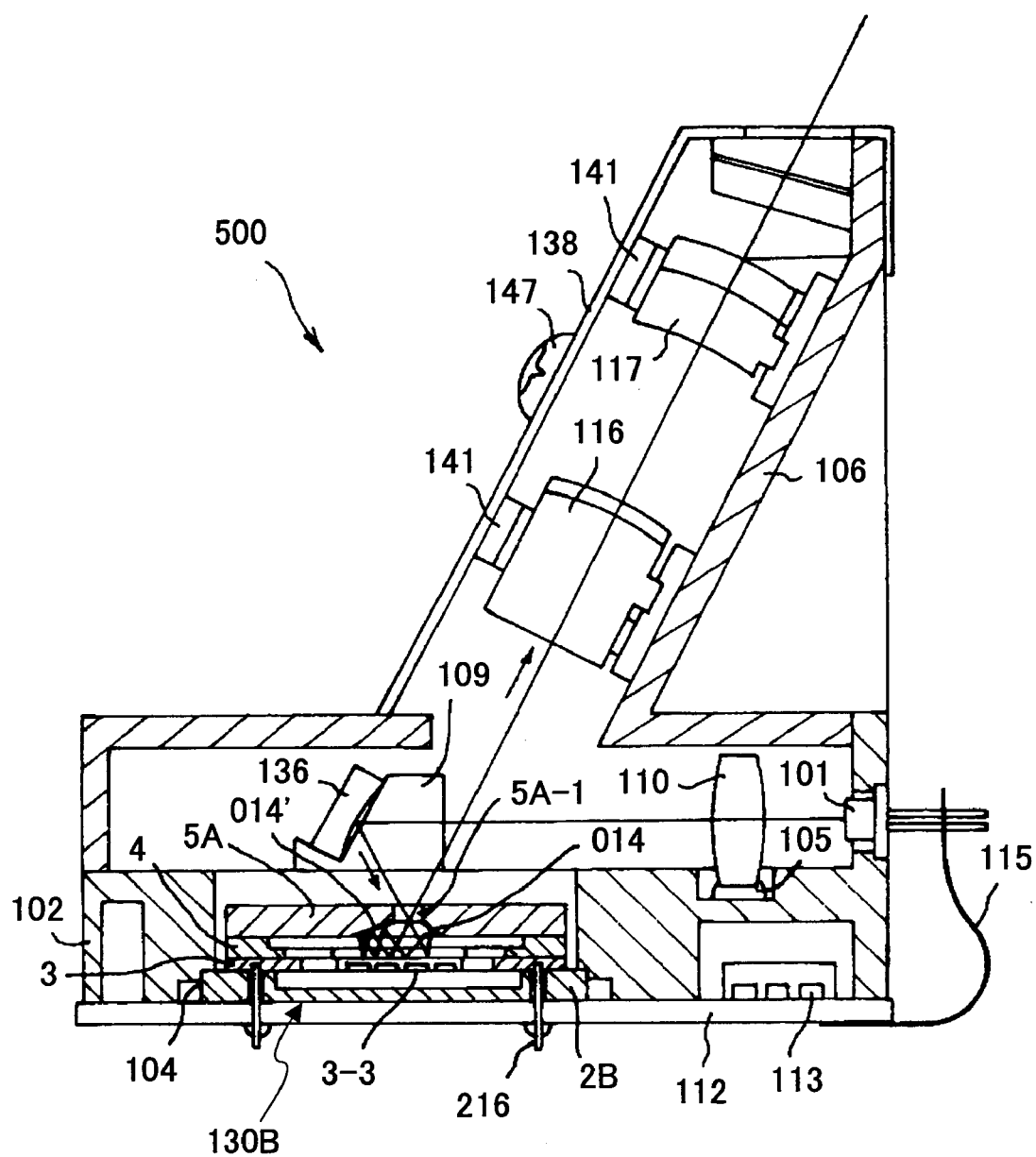
FIG. 35 is a cross-sectional view of optical scanning means taken along a sub-scanning direction.
Figure 36:
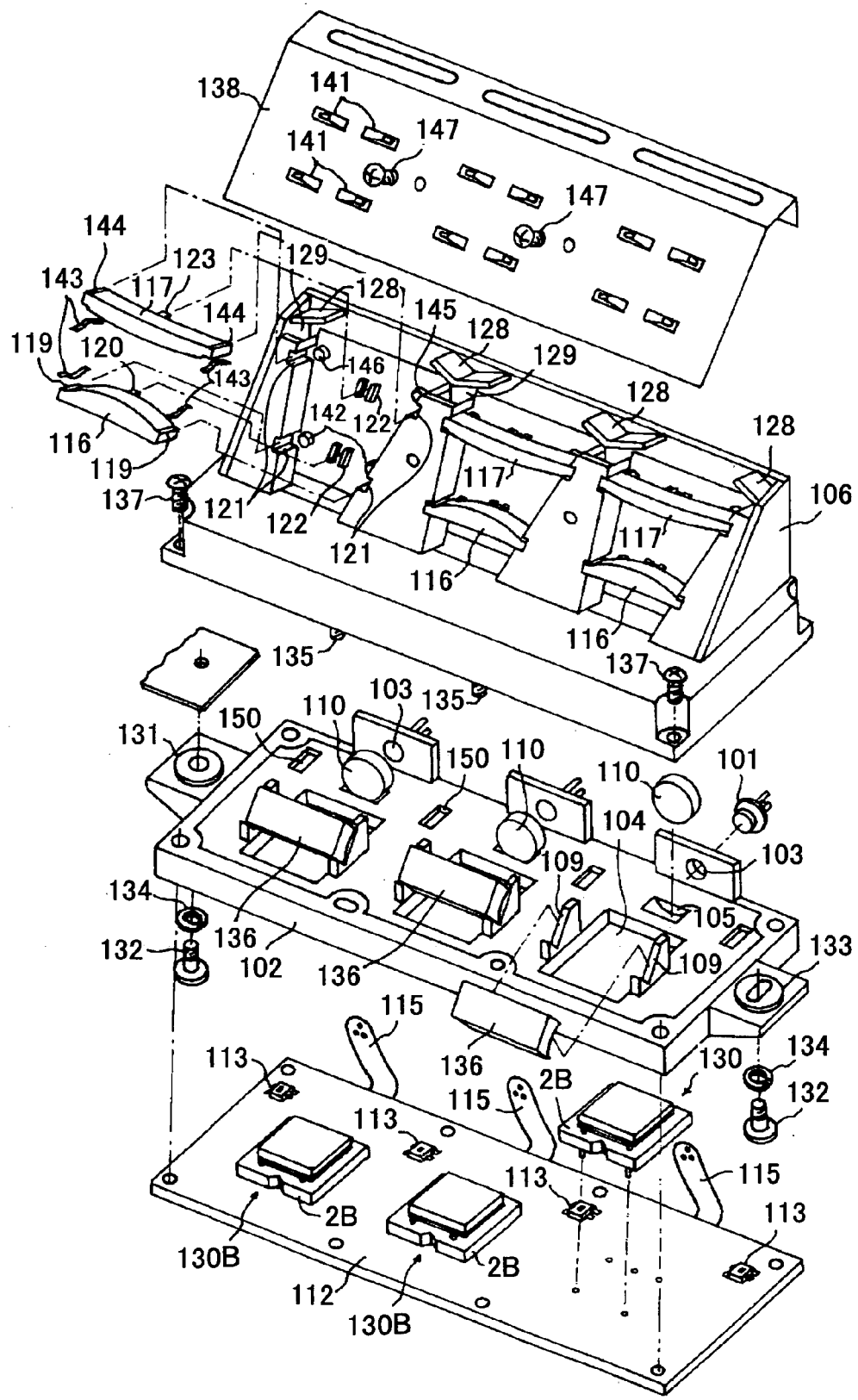
FIG. 36 is an exploded perspective view of the optical scanning means.
Figure 37:
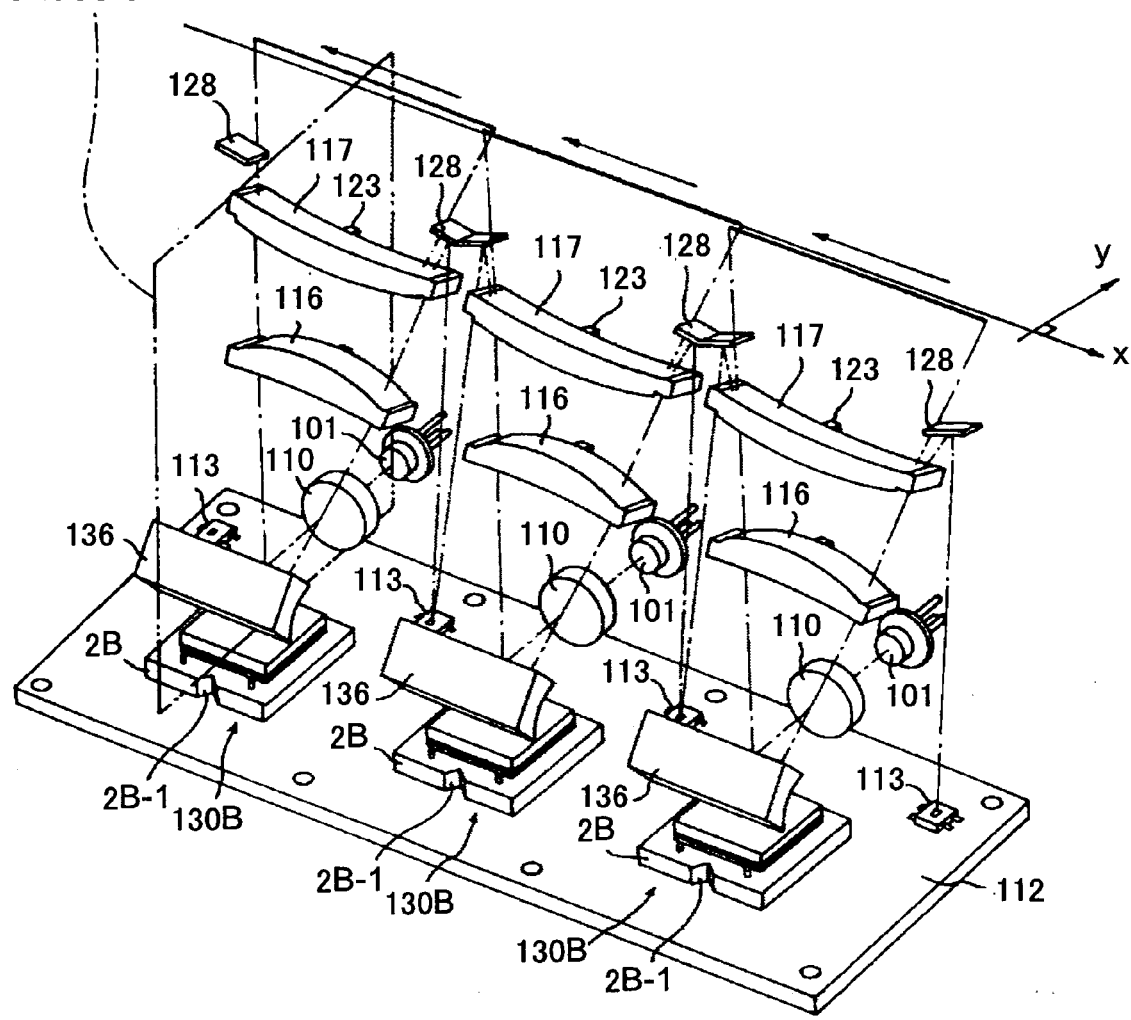
FIG. 37 is an exploded perspective view for explaining an arrangement of optical elements in the optical scanning means.

FIG. 35 is a cross-sectional view of an optical scanning means including an optical scanning apparatus and a scanning optical system taken along the sub-scanning direction. FIG. 36 is an exploded perspective view of the optical scanning means. FIG. 37 shows an arrangement of optical devices. Referring to FIGS. 35 through 37, semiconductor lasers 101, which are light sources, are press fit into stepped through-holes 103, which are provided in walls that are set up on a frame member 102, from the rear surfaces of the wall. The optical axis directions are determined by making the collar surfaces of the semiconductor lasers 101 contact with steps of the through-holes 103. Coupling lenses 110 are fixed to U-shaped concave portions 105 (FIGS. 35 and 36) by curing a UV adhesive between the coupling lenses 110 and the concave portions 105 by positioning light emitting points and the optical axis directions such that the optical axes of the coupling lenses 110 match the optical axes of the semiconductor lasers 101, and outgoing beams become parallel beams (the coupling lenses 110 are fixed into the concave portions 105 such that the optical axes of the coupling lenses 110 coincide with the respective optical axes of the semiconductor lasers 100, and such that optical beams emitted through the respective lenses are parallel).

In this embodiment, three light sources (semiconductor lasers 101) are provided, and each of the light sources has the same structure.

Optical beams that exit from the coupling lenses 110 are made incident on cylinder mirrors 136 having a negative curvature in the sub-scanning direction. The cylinder mirrors 136 are arranged on and bonded to corresponding pairs of mounting members 109 having slanted faces. The optical beams reflected by the cylinder mirrors 136 enter the slit windows 5A-1 (FIG. 35) of the vibration mirror modules (optical scanning apparatuses) 130B as converging beams converging on surfaces of the vibration mirrors in the sub-scanning direction.

The vibration mirror modules 130B are inserted in corresponding square openings 104 (FIG. 35), having a stage on the bottom surface side of the frame member 102, from the back side of the square openings 104, and are positioned based on the outer edges of the base substrates 2B such that the direction of the torsion beams 3-2 match the optical axis direction. The surfaces of the vibration mirrors 3-3 are positioned by making the collar surfaces contact the stage portions. In this embodiment, the three vibration mirror modules 130B are positioned by the single frame member 102 with even intervals (FIG. 36).

Lead terminals projecting from the bottom surface of the base substrate 2B of each of the vibration mirror modules 130B are inserted into and soldered to respective through-holes of a print-circuit board 112 (FIG. 36). Each of the vibration mirror modules 130B is fixed to the frame member 102 by making the top surface of the base substrate 2B contact and fill the lower opening (stage portion) of the square opening 104. Hence, circuits are connected.

Synchronism detecting sensors 113, electronic components constituting driving circuits of the semiconductor lasers 101, and electronic components constituting driving circuits of the vibration mirrors 3-3 are mounted on the print-circuit board 112. Wiring with external circuits is collectively performed. Cables 115, having ends connected to the print-circuit board 112, are connected to the lead terminals of the semiconductor lasers 101.

FIG. 35 shows a cross-sectional view of the optical scanning means taken along the sub-scanning direction. Optical beams emitted from the semiconductor lasers 101 enter the vibration mirrors 3-3 in the sub-scanning cross sections (refer to FIG. 36 for the sub-scanning cross sections) including the torsion beams 3-2 at an angle of approximately 20° inclined in the sub-scanning direction with respect to the normal line via the coupling lenses 110, the cylinder mirrors 136, and the slit windows 5A-1. The optical beams incident on the mirror surfaces formed on the surfaces of the vibration mirrors 3-3 are reflected and reach the first opposing mirrors 014. The optical beams that reach the first opposing mirrors 014 are reflected and returned to the vibration mirrors 3-3. The optical beams returned to the vibration mirrors 3-3 are reflected and made incident on the second opposing mirrors 014' via the slit windows 5A-1. The reflection positions of optical beams that are made incident on the mirror surfaces are moved in the sub-scanning direction while performing three round trips between the vibration mirrors 3-3 and the second opposing mirrors 014'. That is, optical beams that enter the slit windows 5A-1 exit from the slit windows 5A-1 after being reflected by the vibration mirrors 3-3 five times in total.

In this embodiment, the optical path length is reduced by repeating reflections for a plurality of times in the aforementioned manner so that a great scanning angle is achieved even if the swing angle of the vibration mirror 3-3 is small. The scanning angle $\theta$ may be represented by $2N\alpha$ where $N$ is the total number of times of reflections and $\alpha$ is the swing angle.

In this embodiment, since $N=5$ and $\alpha=5°$, the maximum scanning angle is 50°. 35° of the maximum scanning angle 50° serve an image recording region. By using resonance, minute application voltage is required and heat generation is also small. However, as is clear from the above equation, the more the recording speed, i.e., the resonance frequency, is increased, the more necessary it becomes to increase the spring constant K of the torsion beam 3-2, which results in reduction of the swing angle. Therefore, the scanning angle is increased by providing the first opposing mirror 014 and the second opposing mirror 014' as mentioned above, so as to achieve an adequate scanning angle irrespective of the recording speed.

Additionally, the reflection surfaces are arranged in an opposing manner so as to form a room-like shape, and the incident angle of an optical beam with respect to the vibration mirror 3-3 in the sub-scanning direction is assigned to be positive or negative, in other words, the traveling direction of a reflected optical beam is determined to be in the right direction or the left direction, for each reflection. Thereby, skew of a scanning line on a surface to be scanned caused by oblique incidence is suppressed and linearity is maintained, and the rotation of an optical beam within a surface orthogonal to the optical axis is made to return to the original position at the time of exiting. In the aforementioned manner, degradation in imaging performance is prevented.

Referring to FIGS. 35 and 36, a total of four synchronism detecting sensors 113, which are formed by pin photo diodes, are arranged at both ends of the group of vibration mirror modules 130 and between the adjacent vibration mirror modules 130 so that an optical beam can be detected at the scan start side and the scan end side of each of the vibration mirror modules 130. V-shaped mirror receiving parts 128 on which high-intensity aluminum thin sheets are applied are formed in a housing 106 between scan regions of second scanning lenses 117 and on the light-emitting side of the second scanning lenses 117. The reflection surfaces corresponding to the scan start side and the scan end side of the adjacent optical scanning means are arranged in an opposing manner so that optical beams reflected by the high-intensity aluminum thin plates are directed to the respective synchronism detecting sensors 113 via openings 129 formed between the scan regions and rectangular openings 150 of the frame member 102.

Referring to FIG. 36, the frame member 102 is made of a glass-fiber reinforced resin or die-casting aluminum, for example, with which a certain level of rigidity can be secured. Flange parts 131 and 133 are formed on both ends of the frame member 102. The flange parts 131 and 133 are provided for attaching the optical scanning means to the structure of an image forming apparatus body. The flange part 131 is provided with a master hole, and the shank of a fixing screw 132 is engaged with the inside diameter of the master hole. The flange part 133 is provided with a long opening, and a fixing screw 132 penetrates the long opening. The frame member 102 is fixed by means of the fixing screws 132 via respective spring washers 134 in a manner facing photo conductors.

On this occasion, by rotating the optical scanning means on the master hole, adjustment is performed such that a scanning line scanned by one of the vibration mirror modules 130B becomes parallel to a direction x that is orthogonal to the moving direction y of the surface to be scanned (refer to FIG. 37).

The top surface of the frame member 102 is made parallel to surfaces provided on the back side of the square openings 104 and in the mirror normal line direction to which surfaces the vibration mirror modules 130B abut. Two projections 135 projecting from the bottom surface of the housing 106 containing scanning lenses (first scanning lenses 116 and the second scanning lenses 117) are inserted into engaging holes of the frame member 102, thereby performing positioning on the surface and screw shutting the four corners. In this embodiment, screws 137 are screwed to the printed-circuit board 112 via through-holes of the frame member 102. The three members, i.e., the housing 106, the frame member 102 and the print-circuit board 112, are integrally joined to interpose the frame member 102 between the housing 106 and the print-circuit board 112. Thereafter, the above-mentioned soldering is performed.

In the housing 106, the first scanning lenses 116 and the second scanning lenses 117, which form imaging means, are arranged in the main scanning direction, positioned such that each scan region overlaps to the other, and are integrally held.

Each of the first scanning lenses 116 includes: a projection 120 (FIGS. 36 and 37) projecting in the middle of a sub-scanning direction reference surface and allowing positioning in the main scanning direction; and surfaces 119 on the light entering side and the light emitting side thereof. The surfaces 119 are engaged with the housing 106, thereby positioning the first scanning lens 116 in the optical axis direction. The projection 120 is engaged with a groove 122 integrally formed in the housing 106. The surfaces 119 are inserted into a pair of notches 121. The first scanning lens 116 is pressed toward the light entering side by means of springs 143 so as to maintain a position in the surface. In the aforementioned manner, the scanning lenses are relatively arranged within the same surface that is orthogonal to the optical axis. By making the sub-scanning direction reference surface contact with an end of a pair of projections 142 projecting from the housing 106, positioning of the first scanning lens 116 within the surface orthogonal to the optical axis is performed. Consequently, the installation height in the sub-scanning direction is determined. The first scanning lens 116 is pressed and supported by leaf springs 141 integrally formed with a cover 138.

Similarly, each of the second scanning lenses 117 includes: a projection 123 (FIGS. 36 and 37) projecting in the middle of a sub-scanning direction reference surface and similarly allowing positioning in the main scanning direction; and surfaces 144 on both sides thereof. The surfaces 144 allow positioning in the optical axis direction. The projection 123 is engaged with a groove 122 integrally formed with the housing 106. The surfaces 144 are inserted into notches 121, and the second scanning lens 117 is pressed toward the light emitting side thereof by means of springs 143 so as to maintain a predetermined position. The installment height of the second scanning lens 117 is determined by making the sub-scanning direction reference surface contact with: a projection 145 projecting from the housing 106; and an end of an adjusting screw 146 that can be flexibly screwed. The second scanning lens 117 is pressed and supported by leaf springs 141 integrally formed with the cover 138. The cover 138 is fixed by means of screws 147.

Figure 38:
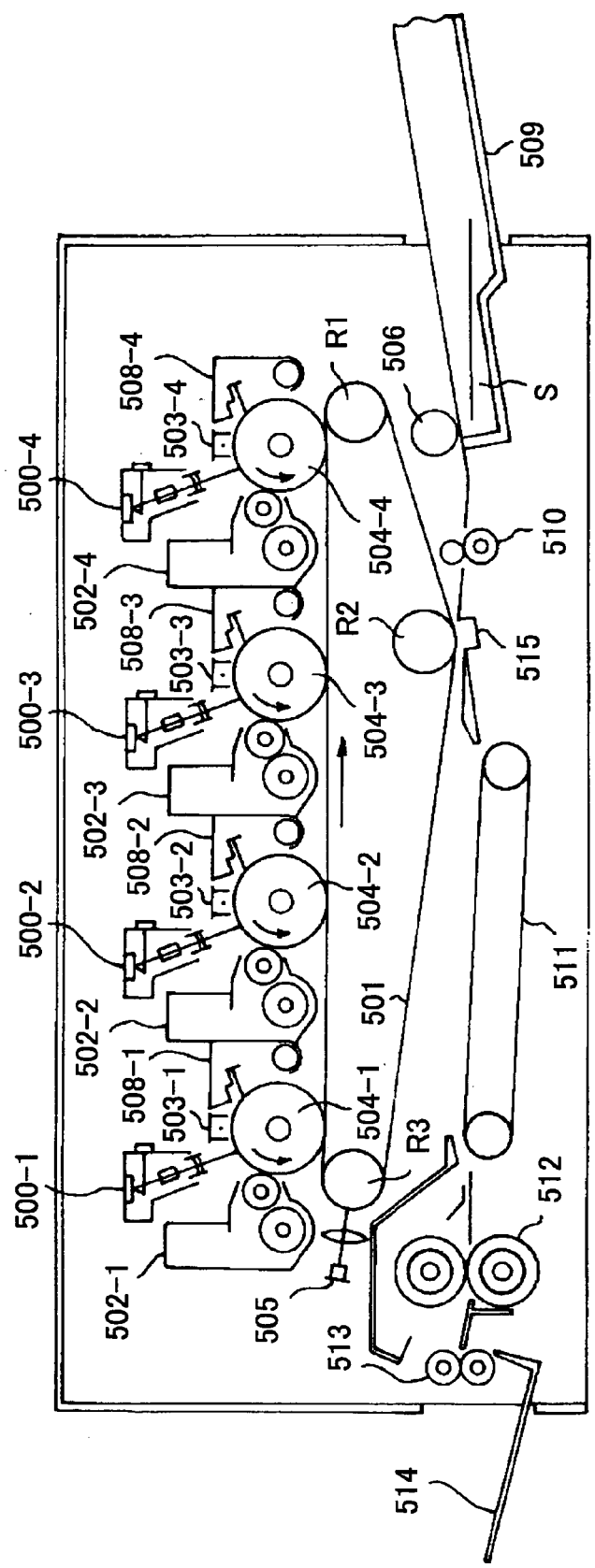
FIG. 38 is a schematic diagram showing the structure of a color laser printer, which is an image forming apparatus.

Referring to FIG. 38, a description is given of a tandem laser printer (as an example of an image forming apparatus) that includes four optical scanning means 500-1, 500-2, 500-3 and 500-4 as described above with reference to FIGS. 35 through 37, each optical scanning means including the optical scanning apparatus (vibration mirror module) according to the present invention and a scan optical system such as an imaging lens.

The four optical scanning means 500-1, 500-2, 500-3 and 500-4 are configured to form images of yellow, magenta, cyan, and black. Photo conductor drums 504-1, 504-2, 504-3 and 504-4, which serve as photo conductors on which electrostatic images are formed, respectively correspond to the four optical scanning means 500-1, 500-2, 500-3 and 500-4.

Images of respective colors are formed on the photo conductor drums 504-1, 504-2, 504-3 and 504-4 by means of the optical scanning means 500-1, 500-2, 500-3 and 500-4, respectively. A transfer belt 501 is arranged underneath the photo conductor drums 504-1, 504-2, 504-3 and 504-4 such that the transfer belt 501 contacts in common with each of the photo conductor drums 504-1, 504-2, 504-3 and 504-4. In the embodiment shown in FIG. 38, each of the optical scanning means 500-1, 500-2, 500-3 and 500-4 is arranged such that the exiting direction of an optical beam is in a downward direction.

The transfer belt 501 is supported by a driving roller R1 and two supporting rollers R2 and R3. The photo conductor drums 504-1, 504-2, 504-3 and 504-4 are arranged along the moving direction of the transfer belt 501, which direction is indicated by an arrow in FIG. 38, at even intervals.

Charger 503-1, 503-2, 503-3 and 503-4; developing apparatuses 502-1, 502-2, 502-3 and 502-4 that perform developing by means of toners corresponding to respective colors, i.e., yellow, magenta, cyan, and black; and cleaning apparatuses 508-1, 508-2, 508-3 and 508-4 that wipe away and stock residual toners after transferring are arranged around the photo conductor drums 504-1, 504-2, 504-3 and 504-4, respectively.

In each of the photo conductor drums 504-1, 504-2, 504-3 and 504-4, a laser beam for scanning is directed from the optical scanning means to a position between the corresponding charger (503-1, 503-2, 503-3 and 503-4) and the developing apparatus (502-1, 502-2, 502-3 and 502-4), thereby forming an electrostatic image in accordance with image information of a color corresponding to the optical scanning means.

In order to form overlapping images at the same position on the transfer belt 501, the timings of starting image writing by the optical scanning means 500-1, 500-2, 500-3 and 500-4 by means of laser beams for forming latent images are shifted to each other. A sensor 505 detects a resist mark formed on the transfer belt 501 for setting the shifting timings.

In the aforementioned manner, writing of an image is performed by each of the optical scanning means 500-1, 500-2, 500-3 and 500-4 at a timing shifted to each other by a predetermined amount while using a detection signal detected by the sensor 505 as a trigger.

Electrostatic latent images formed on the photo conductor drums 504-1, 504-2, 504-3 and 504-4 are made visible by toner developing by means of the developing apparatuses 502-1, 502-2, 502-3 and 502-4 arranged in the downstream side of the rotational direction of the photo conductor drums 504-1, 504-2, 504-3 and 504-4, respectively. Then, the images are consecutively transferred from the photo conductor drums 504-1, 504-2, 504-3 and 504-4 onto the same image region of the transfer belt 501. Consequently, an overlapping color toner image is formed.

The overlapping color toner image is transferred, by means of a secondary transfer part in which a driven roller R2 and a transcriber are arranged in an opposing manner, onto a paper S that is fed from a paper feed tray 509 by means of a paper feed roller 506 and further fed after adjusting the timing at the region of a resist roller 510. The paper S on which the overlapping color toner image is transferred is fed to a fixing apparatus 512 by a transfer belt 511, and then fed to a paper delivery tray 514 by means of delivering rollers 513.

After the toner images are transferred onto the transfer belt 501, residual toners on the photo conductor drums 504-1, 504-2, 504-3 and 504-4 are removed by the respective cleaning apparatuses 508-1, 508-2, 508-3 and 508-4, thereby preparing for the next image formation.

In the aforementioned manner, in an image forming apparatus (laser printer) including: photo conductors (the photo conductor drums 504-1, 504-2, 504-3 and 504-4) on which electrostatic images are formed by means of the optical scanning means having the optical scanning apparatus; developing means (the developing apparatuses 502-1, 502-2, 502-3 and 502-4) developing the electrostatic images by toners; and transfer means (the transcriber 515 and the driven roller R2) for transferring the developed toner images onto a recording paper (the paper S), by using the optical scanning apparatuses (vibration mirror modules 130B) forming the optical scanning means (500-1, 500-2, 500-3 and 500-4), it is possible to reduce degradation of image quality due to dynamic deformation of the vibration mirrors. Particularly, it is possible to improve image quality in color image forming apparatuses that form color images.

The present invention is not limited to the specifically disclosed embodiments, and variations and modifications may be made without departing from the scope of the present invention.

The present application is based on Japanese priority applications No. 2003-138964 filed on May 16, 2003 and No. 2003-172797 filed on Jun. 18, 2003, the entire contents of which are hereby incorporated by reference.

What is claimed is:

1. An optical scanning apparatus, comprising:
   a vibration mirror including driving electrodes; and
   a driving part that applies a driving pulse to the driving electrodes of said vibration mirror,
   said vibration mirror including:
      a mirror substrate having free ends;
      two beams swingably supporting said mirror substrate; and
      movable electrodes formed on the free ends of said mirror substrate; and
      wherein the driving electrodes are provided at positions corresponding to said movable electrodes so as to generate an electrostatic torque for vibrating said mirror substrate, and
   wherein a cycle of the driving pulse is set such that said mirror substrate is vibrated at a frequency that is higher than a resonance point of a resonance frequency band of said vibration mirror.

2. The optical scanning apparatus as claimed in claim 1, wherein the movable electrodes and the driving electrodes have comb-like shapes and face each other via minute gaps.

3. The optical scanning apparatus as claimed in claim 1, wherein the vibration mirror further includes a sealing part that seals a vibration space in a depressurized state, and wherein the mirror substrate is vibrated within the vibration space.

4. An optical scanning apparatus, comprising:
   a vibration mirror; and
   a driving part,
   said vibration mirror including:
      a mirror substrate having free ends;
      two beams swingably supporting said mirror substrate;
      movable electrodes formed on the free ends of said mirror substrate;
      two first driving electrodes that generate an electrostatic torque for vibrating said mirror substrate; and
      two second driving electrodes that are provided to overlap with said respective first driving electrodes in a vibration direction of said mirror substrate and that generate an electrostatic torque for vibrating said mirror substrate,
   said driving part being adapted to apply a first driving pulse to said first driving electrodes, a second driving pulse to one of said second driving electrodes, and a third driving pulse to the other of said second driving electrodes,
   wherein cycles and phases of the first, second and third driving pulses are set such that said mirror substrate is vibrated at a frequency that is higher than a resonance point of a resonance frequency zone of said vibration mirror.

5. The optical scanning apparatus as claimed in claim 4, wherein, when a swing angle of the mirror substrate exceeds a predetermined angle θo, one of the second driving pulse and the third driving pulse is applied, and
   when the swing angle of the mirror substrate is equal to or less than the predetermined angle θo, the first driving pulse is applied.

6. The optical scanning apparatus as claimed in claim 5, wherein, by applying the second and third driving pulses before an extreme value of a vibration waveform of the mirror substrate, the second driving electrodes generate an electrostatic torque in a direction in which the mirror substrate approaches a neutral point of vibration.

7. The optical scanning apparatus as claimed in claim 6, wherein the driving part includes a voltage value varying part that varies voltage values of the second and third driving pulses.

8. The optical scanning apparatus as claimed in claim 6, wherein the driving part includes a phase varying part that varies phases of the second and third driving pulses.

9. The optical scanning apparatus as claimed in claim 5, wherein the second and third driving pulses are applied before and after an extreme value of a vibration waveform of the mirror substrate,
   the second and third driving pulses applied before the extreme value cause the second driving electrodes to generate an electrostatic torque that increases a speed of vibration of the mirror substrate in a direction in which the mirror substrate separates from a neutral point of vibration, and
   the second and third driving pulses applied after the extreme value cause the second driving electrodes to generate an electrostatic torque that increases the speed of vibration of the mirror substrate in a direction in which the mirror substrate approaches the neutral point of vibration.

10. The optical scanning apparatus as claimed in claim 9, wherein the driving part includes a voltage value varying part that varies voltage values of the second and third driving pulses.

11. The optical scanning apparatus as claimed in claim 5, wherein the driving part includes a voltage value varying part that varies voltage values of the second and third driving pulses.

12. The optical scanning apparatus as claimed in claim 5, wherein the driving part includes a phase varying part that varies phases of the second and third driving pulses.

13. The optical scanning apparatus as claimed in claim 4, wherein the movable electrodes and the first and second driving electrodes have comb-like shapes and face each other via minute gaps.

14. The optical scanning apparatus as claimed in claim 4, wherein the vibration mirror further includes a sealing part that seals a vibration space in a depressurized state, and wherein the mirror substrate is vibrated within the vibration space.

15. A method of driving a vibration mirror including: a mirror substrate having free ends; two beams swingably supporting said beams; movable electrodes formed on the free ends of said mirror substrate; and driving electrodes that are provided at positions corresponding to said movable electrodes and that generate an electrostatic torque for vibrating said mirror substrate, said method comprising the steps of:
 setting a cycle of a driving pulse such that said mirror substrate is vibrated at a frequency higher than a resonance point of a resonance frequency band; and
 applying the driving pulse to said driving electrodes.

16. A method of driving a vibration mirror including: a mirror substrate; two beams swingably supporting said mirror substrate; movable electrodes formed on free ends of said mirror substrate; two first driving electrodes that generate electrostatic torque for vibrating said mirror substrate; and two second driving electrodes that are provided to overlap with said respective first driving electrodes in a vibration direction of said mirror substrate and that generate an electrostatic torque for vibrating said mirror substrate, said method comprising the steps of:
 setting cycles and phases of a first driving pulse, a second driving pulse, and a third driving pulse such that the mirror substrate is vibrated at a frequency that higher than a resonance point of a resonance frequency band of said mirror substrate; and
 applying the first driving pulse to the first driving electrodes, the second driving pulse to one of the second driving electrodes, and the third driving pulse to the other of the second electrodes.

17. The method as claimed in claim 16, wherein the step of applying includes the steps of:
 when a swing angle of the mirror substrate exceeds a predetermined angle θo, applying the second and third driving pulses; and
 when the swing angle of the mirror substrate is equal to or less than the predetermined angle θo, applying the first driving pulse.

18. The method as claimed in claim 17, wherein the second and third driving pulses are applied before an extreme value of a vibration waveform of the mirror substrate, thereby causing the second driving electrodes to generate an electrostatic torque in a direction in which the mirror substrate approaches a neutral point of vibration.

19. The method as claimed in claim 17, wherein the second and third driving pulses are applied before and after an extreme value of a waveform of the mirror substrate,
 whereby, by applying the second and third driving pulses before the extreme value, the second driving electrodes generate an electrostatic torque that increases a speed of vibration of the mirror substrate in a direction in which the mirror substrate separates from a neutral point of vibration, and
 whereby, by applying the second and third driving pulses after the extreme value, the second driving electrodes generate an electrostatic torque that increases the speed of vibration of the mirror substrate in a direction in which the mirror substrate approaches the neutral point of vibration.

20. An optical writing apparatus for scanning an image carrier with an optical light beam modulated with a recording signal, said optical writing apparatus comprising:
 an optical scanning apparatus; and
 an incident part,
 said optical scanning apparatus including:
  a vibration mirror including driving electrodes; and
  a driving part that applies a driving pulse to the driving electrodes of said vibration mirror,
 said vibration mirror including:
  a mirror substrate having a mirror surface and free ends;
  two beams swingably supporting said mirror substrate; and
  movable electrodes formed on the free ends of said mirror substrate;
 wherein the driving electrodes are provided at positions corresponding to said movable electrodes so as to generate an electrostatic torque for vibrating said mirror substrate, and
 wherein a cycle of the driving pulse is set such that said mirror substrate is vibrated at a frequency that is in a resonance frequency band of said vibration mirror and is higher than a resonance point, and
 said incident part being disposed to cause the optical light beam modulated with the recording signal to be incident on the mirror surface of the mirror substrate of the vibration mirror of the optical scanning apparatus.

21. An optical writing apparatus for scanning an image carrier with an optical light beam modulated with a recording signal, said optical writing apparatus comprising:
 an optical scanning apparatus; and
 an incident part,
 said optical apparatus including:
  a vibration mirror; and
  a driving part,
 said vibration mirror including:
  a mirror substrate having free ends and a mirror surface;
  two beams swingably supporting said mirror substrate;
  movable electrodes formed on the free ends of said mirror substrate;
  two first driving electrodes that generate an electrostatic torque for vibrating said mirror substrate; and
  two second driving electrodes that are provided to overlap with said respective first driving electrodes in a vibration direction of said mirror substrate and that generate an electrostatic torque for vibrating said mirror substrate,
 said driving part being adapted to apply a first driving pulse to said first driving electrodes, a second driving pulse to one of said second driving electrodes, and a third driving pulse to the other of said second driving electrodes,
 wherein cycles and phases of the first, second and third driving pulses are set such that said mirror substrate is vibrated at a frequency that is higher than a resonance point of a resonance frequency zone of said vibration mirror, and
 said incident part causing the optical light beam modulated with the recording signal to be incident on a mirror surface of the mirror substrate of the vibration mirror of the optical scanning apparatus.

22. An image forming apparatus, comprising:
 an image carrier;
 an optical writing apparatus that forms an electrostatic latent image on said image carrier by scanning said image carrier with an optical light beam modulated with a recording signal;
 a developing part that develops with toner the electrostatic latent image formed on said image carrier;

a transfer part that transfers a developed toner image on a transfer medium; and a fixing part that fixes a transferred toner image to the transfer medium, said optical writing apparatus including:

an optical scanning apparatus; and an incident part, said optical scanning apparatus including:

a vibration mirror including driving electrodes; and a driving part that applies a driving pulse to the driving electrodes of said vibration mirror, said vibration mirror including:

a mirror substrate having a mirror surface and fee ends;

two beams swingably supporting said mirror substrate; and movable electrodes formed on the free ends of said mirror substrate;

wherein the driving electrodes are provided at positions corresponding to said movable electrodes so as to generate an electrostatic torque for vibrating said mirror substrate, and wherein a cycle of the driving pulse is set such that said mirror substrate is vibrated at a frequency that is higher than a resonance point of a resonance frequency band of said vibration mirror, and said incident part being disposed to cause the optical light beam modulated with the recording signal to be incident on the mirror surface of the mirror substrate of the vibration mirror of the optical scanning apparatus.

23. An image forming apparatus, comprising:

an image carrier;

an optical writing apparatus that forms an electrostatic latent image on said image carrier by scanning said image carrier with an optical light beam modulated with a recording signal;

a developing part that develops with toner the electrostatic latent image formed on said image carrier;

a transfer part that transfers a developed toner image on a transfer medium; and a fixing part that fixes a transferred toner image to the transfer medium, said optical writing apparatus including:

an optical scanning apparatus; and an incident part, said optical apparatus including:

a vibration mirror; and a driving part, said vibration mirror including:

a mirror substrate having free ends and a mirror surface;

two beams swingably supporting said mirror substrate;

movable electrodes formed on the free ends of said mirror substrate;

two first driving electrodes that generate an electrostatic torque for vibrating said mirror substrate; and two second driving electrodes that are provided to overlap with said respective first driving electrodes in a vibration direction of said mirror substrate and that generate an electrostatic torque for vibrating said mirror substrate, said driving part being adapted to apply a first driving pulse to said first driving electrodes, a second driving pulse to one of said second driving electrodes, and a third driving pulse to the other of said second driving electrodes, wherein cycles and phases of the first, second and third driving pulses are set such that said mirror substrate is vibrated at a frequency that is higher than a resonance point of a resonance frequency zone of said vibration mirror, and said incident part being adapted to cause the optical light beam modulated with the recording signal to be incident on the mirror surface of the mirror substrate of the vibration mirror of the optical scanning apparatus.

* * * * *